United States Patent [19]

Naito

[11] Patent Number: 5,777,770
[45] Date of Patent: Jul. 7, 1998

[54] OPTICAL PHASE CONJUGATOR AND OPTICAL RECEPTION APPARATUS AND OPTICAL TRANSMISSION APPARATUS FOR USE WITH OPTICAL COMMUNICATION SYSTEM EMPLOYING THE OPTICAL PHASE CONJUGATOR

[75] Inventor: Takao Naito, Kawasaki, Japan

[73] Assignee: Fujitsu Limited, Kanagawa, Japan

[21] Appl. No.: 599,588

[22] Filed: Feb. 9, 1996

[30] Foreign Application Priority Data

Mar. 20, 1995 [JP] Japan .................................. 7-061224

[51] Int. Cl.$^6$ .................................................. H04B 10/18
[52] U.S. Cl. .......................... 359/179; 359/160; 359/161; 359/173; 359/338
[58] Field of Search .............................. 359/330, 338, 359/124, 160, 161, 173, 179

[56] References Cited

U.S. PATENT DOCUMENTS

| | | | |
|---|---|---|---|
| 5,365,362 | 11/1994 | Gnauck et al. | 359/174 |
| 5,596,667 | 1/1997 | Watanabe | 359/127 |
| 5,604,617 | 2/1997 | Mori et al. | 359/127 |

FOREIGN PATENT DOCUMENTS

| | | |
|---|---|---|
| 0 500 357 | 8/1992 | European Pat. Off. . |
| 0 703 680 | 9/1994 | European Pat. Off. . |
| 0 691 716 | 1/1996 | European Pat. Off. . |

| | | |
|---|---|---|
| 95/03653 | 2/1995 | WIPO . |

OTHER PUBLICATIONS

Watanabe S et al: "Compensation of Pulse Shape Distortion Due to Chromatic Dispersion and Kerr Effect by Optical Phase Conjugation" IEEE Photonics Technology Letters, vol. 5, No. 10, 1 Oct. 1993, pp. 1241–1243, XP000414224 *figure 2*.

*Primary Examiner*—Leslie Pascal
*Attorney, Agent, or Firm*—Helfgott & Karas, PC.

[57] ABSTRACT

The invention provides an optical phase conjugator suitable for use with a repeater, for example, for an optical communication system for a very long distance of up to several thousands kilometers across an ocean as well as an optical reception apparatus and an optical transmission apparatus for use with an optical communication system which employs the optical phase conjugator. The optical phase conjugator comprises an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section. The optical phase conjugation section and the frequency or wavelength conversion section are combined by a plural number so that a frequency or wavelength of output signal light of the optical phase conjugator coincides with a frequency or wavelength of input signal light to the optical phase conjugator.

40 Claims, 33 Drawing Sheets

F I G. 6
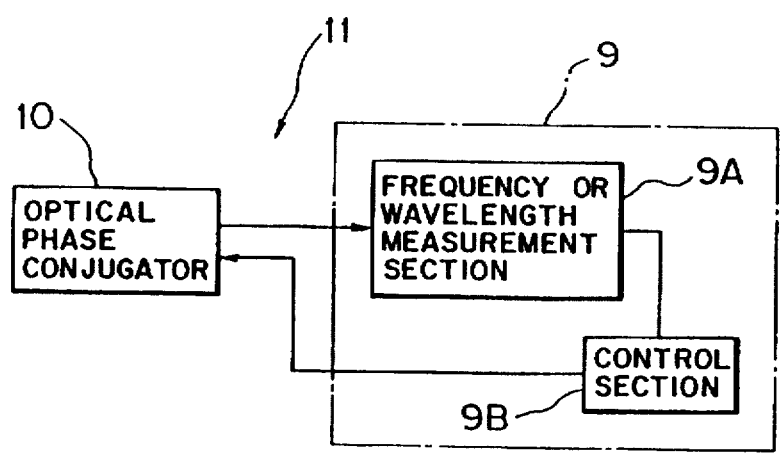

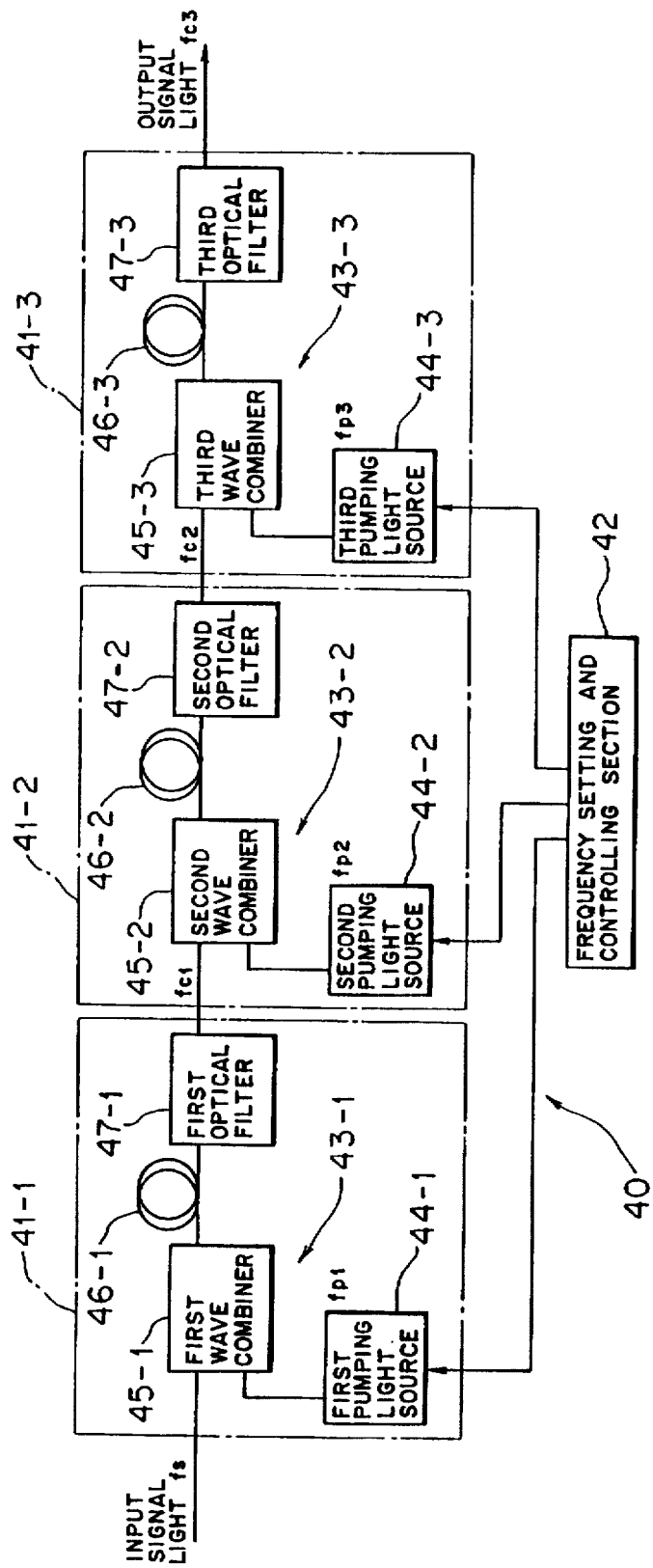

OPTICAL PHASE CONJUGATOR AND OPTICAL RECEPTION APPARATUS AND OPTICAL TRANSMISSION APPARATUS FOR USE WITH OPTICAL COMMUNICATION SYSTEM EMPLOYING THE OPTICAL PHASE CONJUGATOR

BACKGROUND OF THE INVENTION

1. Field of the Invention

This invention relates to an optical phase conjugator suitable for use with a repeater, for example, for an optical communication system for a very long distance of up to several thousands kilometers across an ocean as well as an optical reception apparatus and an optical transmission apparatus for use with an optical communication system which employs the optical phase conjugator.

2. Description of the Related Art

A regeneration repeater is usually applied to a very long haul transmission system across an ocean of up to several thousands kilometers. In these days, investigations are directed to application of a regeneration repeater to a repeating system wherein a plurality of optical amplifiers are connected at successive stages in a chain.

In particular, by replacing such regeneration repeater by an optical amplifier repeater, it is estimated that the number of parts in a repeater can be reduced remarkably and the reliability is secured while remarkable reduction in cost can be achieved. Further, since an optical amplifier for use with the optical amplification multi-stage repeating system has a function of optical amplification without relying upon the transmission rate, the transmission rate can be raised by improving the terminal station apparatus on the opposite sides of the optical amplifier in the future.

In order to further raise the transmission rate in an optical amplifier repeating transmission system of the type described above, it is required to suppress non-linear effects of the transmission line as one of factors which limit the transmission characteristic, particularly a Kerr effect (birefringence caused by an electric field).

Meanwhile, it is investigated to utilize, for an optical amplification repeating transmission system in which an optical repeater which has been employed usually and a transmission line are employed, optical phase conjugate which makes use of signal light spectrum inversion.

In particular, where the optical phase conjugate is utilized for an optical amplification repeating transmission system, a wavelength dispersion can be canceled together with a Kerr effect mentioned above.

Phase conjugate light with respect to input signal light can be extracted, for example, by such a phase conjugator as shown in FIG. 31.

Referring to FIG. 31, the phase conjugator shown includes an optical material 101 having an electro-optical effect, and an optical filter 102 for extracting phase conjugate light.

In the phase conjugator having the construction described above, when input signal light of a frequency fs and pumping light of another frequency fp are inputted to the optical material 101, four wave mixing is caused by an electro-optical effect of the optical material 101 so that, for example, such lights fc and fn having frequencies different from those of the input signal light fs and the pumping light fp as illustrated in FIG. 32 are generated by and outputted from the optical material 101.

The frequencies fc and fn of the lights different from those of the input signal light fs and the pumping light fp can be represented by the following equations (1) and (2), respectively:

$$fc = 2fp - fs \quad (1)$$

$$fn = 2fs - fp \quad (2)$$

Here, since the light having the frequency fc has a phase inverted with respect to that of the signal light, it is in a phase conjugate relationship with the signal light. However, the phase of the light having the frequency fn is twice that of the signal light and is not in an inverted relationship to that of the signal light. The phase in a non-inverted condition is hereinafter referred to as non-inverted phase.

The signal outputted from the optical material 101 is inputted to the optical filter 102. The optical filter 102 has, for example, such a characteristic as illustrated in FIG. 33 that it can extract phase conjugate light having the frequency fc described above. Or, where the optical filter 102 has another characteristic as illustrated in FIG. 34, it can extract phase conjugate light having the frequency fn described above.

It is to be noted that, in order for the optical filter 102 to stably extract only phase conjugate light having the frequency fc or fn, the absolute value of fp−fs must be set to a somewhat high value.

FIG. 35 shows in block diagram a general construction of an optical transmission system which employs the optical phase conjugator described above, and FIG. 36 shows a more detailed construction of such an optical transmission system as shown in FIG. 35.

Particularly, the optical transmission system shown in FIG. 36 is constructed as an optical amplification repeating transmission system to which an optical phase conjugator is applied. An optical transmission apparatus 103 is connected to an optical phase conjugator 104 via a first transmission line 106 while an optical reception apparatus 105 is connected to the optical phase conjugator 104 via a second transmission line 107.

The first transmission line 106 transmits signal light of a wavelength λs1 therethrough from the optical transmission apparatus 103 to the optical phase conjugator 104 and is formed from optical fibers 108 and optical amplifier-repeaters 109 connected at a plurality of stages to each other.

Meanwhile, the second transmission line 107 transmits signal light of another wavelength λs2 from the optical phase conjugator 104 to the optical reception apparatus 105 and is formed from optical fibers 110 and optical amplifier-repeaters 111 connected at a plurality of stages to each other.

In the optical transmission system having the construction described above, signal light of the wavelength λs1 from the optical transmission apparatus 103 is inputted to the optical phase conjugator 104 via the first transmission line 106. From the optical phase conjugator 104, phase conjugate light of the wavelength λs2 is outputted to the optical reception apparatus 105 via the second transmission line 107.

FIG. 37 shows another optical transmission system wherein an optical phase conjugator is applied to an optical amplification repeating transmission system which includes an ascending line and a descending line. Referring to FIG. 37, a downstream side terminal station apparatus 114 includes an optical transmission apparatus 112 for transmitting an optical signal of a wavelength λU1 and an optical reception apparatus 113 for receiving an optical signal of another wavelength λD2. An upstream side terminal station apparatus 122 includes an optical reception apparatus 120 for receiving an optical signal of a further wavelength λU2, and an optical transmission apparatus 121 for transmitting an optical signal of a still further wavelength λD1.

A first transmission line 123 transmits signal light of the wavelength λU1 therethrough from the optical transmission apparatus 112 to an optical phase conjugator 117 and transmits signal light of the wavelength λD2 therethrough from the optical phase conjugator 117 to the optical reception apparatus 113 as described above. The first transmission line 123 is formed from optical fibers 115, and an optical amplifier-repeater 116 capable of performing loop back pass.

A second transmission line 124 transmits signal light of the wavelength λD1 therethrough from the optical transmission apparatus 121 to the optical phase conjugator 117 and transmits signal light of the wavelength λU2 therethrough from the optical phase conjugator 117 to the optical reception apparatus 120. The second transmission line 124 is formed from optical fibers 119, and an optical amplifier-repeater 118 connected to the optical fibers 119 and capable of performing loop back pass.

In the optical transmission system having the construction described above, signal light can be communicated between the downstream side terminal station apparatus 114 and the upstream side terminal station apparatus 122 via the first transmission line 123, the optical phase conjugator 117 and the second transmission line 124. Further, loop back pass of signal light can be performed by the optical amplifier-repeaters 116 and 118.

Further, signal light of the wavelength λU1 of the ascending line from the optical transmission apparatus 112 is inputted to the optical phase conjugator 117 via the first transmission line 123. From the optical phase conjugator 117, phase conjugate light of the wavelength λU2 is outputted to the optical reception apparatus 120 via the second transmission line 124. Meanwhile, signal light of the wavelength λD1 of the descending line from the optical transmission apparatus 121 is inputted to the optical phase conjugator 117 via the second transmission line 124. From the optical phase conjugator 117, phase conjugate light of the wavelength λD2 is outputted to the optical reception apparatus 113 via the first transmission line 123.

By the way, in the optical transmission system employing an optical phase conjugator described hereinabove with reference to FIGS. 35 and 36, the wavelengths λs1 and λs2 of the signal lights in the first transmission line 106 and the second transmission line 107 can be represented as given by the following equations (3) and (4), respectively:

$$\lambda s1 = C/fs \quad (3)$$

$$\lambda s2 = C/(2fp-fs) \quad (4)$$

Accordingly, λs1≠λs2, and the wavelength characteristics required for the optical amplifier-repeaters 109 and 111 used for the first transmission line 106 and the second transmission line 107 must be different from each other.

Further, in order to design the wavelength dispersions of the transmission lines so that they may cancel each other, where the zero dispersion wavelength of the first transmission line 106 is represented by λf1 and the zero dispersion wavelength of the second transmission line 107 is represented by λf2, the following equation (5) must be satisfied:

$$dD/d\lambda \cdot (\lambda f1 - \lambda s1) = dD/d\lambda \cdot (\lambda f2 - \lambda s2) \quad (5)$$

Accordingly, the zero dispersion wavelength λf1 of the first transmission line 106 and the zero dispersion wavelength λf2 of the second transmission line 107 must be different from each other.

In other words, in order to construct an optical transmission system, for the transmission lines connected to the optical phase conjugator 117, transmission lines in which optical amplifiers and transmission lines of two different types which have different specifications with regard to the wavelength from each other, and also for the optical transmitters and optical receivers, those of two different types with regard to the wavelength from each other must be prepared. Consequently, the optical transmission system described above has a subject to be solved in that the system is complicated in specification and a high cost is required for construction of the system.

SUMMARY OF THE INVENTION

It is an object of the present invention to provide an optical phase conjugator wherein the frequency or the wavelength of output signal light coincides with the frequency or wavelength of input signal light and an optical reception apparatus and an optical transmission apparatus for use with an optical communication system in which the optical phase conjugator is employed.

In order to attain the object described above, according to an aspect of the present invention, there is provided an optical phase conjugator, comprising an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section, the optical phase conjugation section and the frequency or wavelength conversion section being combined by a plural number so that a frequency or wavelength of output signal light of the optical phase conjugator coincides with a frequency or wavelength of input signal light to the optical phase conjugator.

With the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

According to another aspect of the present invention, there is provided an optical phase conjugator, comprising a plurality of optical phase conjugation section-optical filter pairs each including an optical phase conjugation section including a pumping light source for outputting a pumping light of a frequency and an electro-optical effect member for receiving signal light and the pumping light from the pumping light source and causing four wave mixing by an electro-optical effect thereof, and an optical filter for extracting phase conjugate light or non-phase conjugate light outputted from the optical phase conjugation section, the optical phase conjugation section-optical filter pairs being connected so that output signal light to be outputted from one of the optical phase conjugation section-optical filter pairs at the last stage is phase conjugate light with input signal light to one of the optical phase conjugation section-optical filter pairs at the first stage, and a frequency setting and controlling section for setting or controlling a frequency of the pumping light of each of the pumping light sources so that a frequency or wavelength of the output signal light to be outputted as the phase conjugate light from the optical phase conjugation section-optical filter pair at the last stage coincides with a frequency or wavelength of the input signal light inputted to the optical phase conjugation section-optical filter pair at the first stage.

With the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

According to a further aspect of the present invention, there is provided an optical phase conjugator, comprising a plurality of optical phase conjugation section-optical filter pairs each including is an optical phase conjugation section including a pumping light source for outputting a pumping light of a frequency and an electro-optical effect member for receiving signal light and the pumping light from the pumping light source and causing four wave mixing by an electro-optical effect thereof, and an optical filter for extracting phase conjugate light or non-phase conjugate light outputted from the optical phase conjugation section, the optical phase conjugation section-optical filter pairs being connected so that output signal light to be outputted from one of the optical phase conjugation section-optical filter pairs at the last stage is non-phase conjugate light with input signal light to one of the optical phase conjugation section-optical filter pairs at the first stage, and a frequency setting and controlling section for setting or controlling a frequency of the pumping light of each of the pumping light sources so that a frequency or wavelength of the output signal light to be outputted as the non-phase conjugate light from the optical phase conjugation section-optical filter pair at the last stage coincides with a frequency or wavelength of the input signal light inputted to the optical phase conjugation section-optical filter pair at the first stage.

With the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

According to a still further aspect of the present invention, there is provided an optical phase conjugator, comprising a first optical phase conjugation section-optical filter pair including a first optical phase conjugation section including a first pumping light source for outputting first pumping light of a frequency $fp1$ and a first electro-optical effect member for receiving signal light of another frequency $fs$ and the first pumping light from the first pumping light source and causing four wave mixing by an electro-optical effect thereof, and a first optical filter for extracting phase conjugate light of a further frequency $fc1$, which is equal to $2fp1-fs$, outputted from the first optical phase conjugation section, a second optical phase conjugation section-optical filter pair including a second optical phase conjugation section including a second pumping light source for outputting second pumping light of a still further frequency $fp2$ and a second electro-optical effect member for receiving the signal light of the frequency $fc1$ from the first optical phase conjugation section-optical filter pair and the second pumping light from the second pumping light source and causing four wave mixing by an electro-optical effect thereof, and a second optical filter for extracting phase conjugate light of a yet further frequency $fc2$, which is equal to $2fp2-fc1$, outputted from the second optical phase conjugation section, a third optical phase conjugation section-optical filter pair including a third optical phase conjugation section including a third pumping light source for outputting third pumping light of a yet further frequency $fp3$ and a third electro-optical effect member for receiving the signal light of the frequency $fc2$ from the second optical phase conjugation section-optical filter pair and the third pumping light from the third pumping light source and causing four wave mixing by an electro-optical effect thereof, and a third optical filter for extracting phase conjugate light of a yet further frequency $fc3$, which is equal to $2fp3-fc2$, outputted from the third optical phase conjugation section, and a frequency setting and controlling section for setting or controlling frequencies of output lights outputted from the first pumping light source, the second pumping light source and the third pumping light source so that a frequency or wavelength of output signal light outputted as phase conjugate light from the third optical phase conjugation section-optical filter pair coincides with a frequency or wavelength of input signal light inputted to the first optical phase conjugation section-optical filter pair.

With the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

According to a yet further aspect of the present invention, there is provided an optical phase conjugator, comprising a first optical phase conjugation section-optical filter pair including a first optical phase conjugation section including a first pumping light source for outputting first pumping light of a frequency fp1 and a first electro-optical effect member for receiving signal light of another frequency fs and the first pumping light from the first pumping light source and causing four wave mixing by an electro-optical effect thereof, and a first optical filter for extracting phase conjugate light of a further frequency fc1, which is equal to 2fp1–fs, outputted from the first optical phase conjugation section, a second optical phase conjugation section-optical filter pair including a second optical phase conjugation section including a second pumping light source for outputting second pumping light of a still further frequency fp2 and a second electro-optical effect member for receiving the signal light of the frequency fc1 from the first optical phase conjugation section-optical filter pair and the second pumping light from the second pumping light source and causing four wave mixing by an electro-optical effect thereof, and a second optical filter for extracting non-phase conjugate light of a yet further frequency fn2, which is equal to 2fc1–fp2, outputted from the second optical phase conjugation section, and a frequency setting and controlling section for setting or controlling frequencies of output lights outputted from the first pumping light source and the second pumping light source so that a frequency or wavelength of output signal light outputted as non-phase conjugate light from the second optical phase conjugation section-optical filter pair coincides with a frequency or wavelength of input signal light inputted to the first optical phase conjugation section-optical filter pair.

With the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Furthermore, with the optical phase conjugator, since it can be formed from a pair of optical phase conjugation section-optical filter pairs and a frequency setting and controlling section, a comparatively small number of optical phase conjugation section-optical filter pairs are required. Consequently, the optical phase conjugator can be produced with a comparatively small number of parts and with a comparatively low cost.

According to a yet further aspect of the present invention, there is provided an optical phase conjugator, comprising a first optical phase conjugation section-optical filter pair including a first optical phase conjugation section including a first pumping light source for outputting first pumping light of a frequency fp1 and a first electro-optical effect member for receiving signal light of another frequency fs and the first pumping light from the first pumping light source and causing four wave mixing by an electro-optical effect thereof, and a first optical filter for extracting non-phase conjugate light of a further frequency fn1, which is equal to 2fs–fp1, outputted from the first optical phase conjugation section, a second optical phase conjugation section-optical filter pair including a second optical phase conjugation section including a second pumping light source for outputting second pumping light of a still further frequency fp2 and a second electro-optical effect member is for receiving the signal light of the frequency fn1 from the first optical phase conjugation section-optical filter pair and the second pumping light from the second pumping light source and causing four wave mixing by an electro-optical effect thereof, and a second optical filter for extracting phase conjugate light of a yet further frequency fc2, which is equal to 2fp2–fc1, outputted from the second optical phase conjugation section, and a frequency setting and controlling section for setting or controlling frequencies of output lights outputted from the first pumping light source and the second pumping light source so that a frequency or wavelength of output signal light outputted as phase conjugate light from the second optical phase conjugation section-optical filter pair coincides with a frequency or wavelength of input signal light inputted to the first optical phase conjugation section-optical filter pair.

With the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Furthermore, with the optical phase conjugator, since it can be formed from a pair of optical phase conjugation section-optical filter pairs and a frequency setting and controlling section, a comparatively small number of optical phase conjugation section-optical filter pairs are required. Consequently, the optical phase conjugator can be produced with a comparatively small number of parts and with a comparatively low cost.

According to a yet further aspect of the present invention, there is provided an optical reception apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and wherein the optical phase conjugation section and the frequency or wavelength conversion section are combined by a plural number so that a frequency or wavelength of output signal light of the optical phase conjugator coincides with a frequency or wavelength of input signal light to the optical phase conjugator, the optical reception apparatus being disposed on an output side of the optical phase conjugator, the optical reception apparatus comprising a frequency or wavelength measurement section for measuring a frequency or wavelength of the output signal light of the optical phase conjugator, and a control section for outputting a control signal to the optical phase conjugator so that the frequency or wavelength of the output signal light measured by the frequency or wavelength measurement section may have a fixed value.

With the optical reception apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical reception apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical reception apparatus is advantageous also in that the system is simplified in specification and the cost for construction of the system can be suppressed.

Furthermore, with the optical reception apparatus, since the frequency or wavelength of the signal light on the transmission line can be controlled from the optical reception apparatus side by the control section, there is an advantage in that the optical phase conjugator connected to the transmission line can be formed with a simple construction and also the control system of the optical phase conjugator can be maintained readily.

According to a yet further aspect of the present invention, there is provided an optical reception apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and wherein the optical phase conjugation section and the frequency or wavelength conversion section are combined by a plural number so that a frequency or wavelength of output signal light of the optical phase conjugator coincides with a frequency or wavelength of input signal light to the optical phase conjugator, the optical reception apparatus being disposed on an output side of the optical phase conjugator, the optical reception apparatus comprising a frequency or wavelength measurement section for measuring a frequency or wavelength of the output signal light of the optical phase conjugator, and a control section for outputting a control signal to an optical transmission apparatus disposed on an input side of the optical phase conjugator based on the frequency or wavelength of the output signal light measured by the frequency or wavelength measurement section so that the frequency or wavelength of the input signal light to the optical phase conjugator may have a fixed value.

With the optical reception apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical reception apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical reception apparatus is advantageous also in that the system is simplified in specification and the cost for construction of the system can be suppressed.

Furthermore, with the optical reception apparatus, since the frequency or wavelength of the signal light on the transmission line can be controlled from the optical reception apparatus side by the control section, there is an advantage in that the optical phase conjugator connected to the transmission line can be formed with a simple construction and also the control system of the optical phase conjugator can be maintained readily.

According to a yet further aspect of the present invention, there is provided an optical transmission apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and wherein the optical phase conjugation section and the frequency or wavelength conversion section are combined by a plural number so that a frequency or wavelength of output signal light of the optical phase conjugator coincides with a frequency or wavelength of input signal light to the optical phase conjugator, the optical transmission apparatus being disposed on an input side of the optical phase conjugator, the optical transmission apparatus comprising a control section for controlling the input signal light to the optical phase conjugator based on a frequency or wavelength of the output signal light measured by an optical reception apparatus side disposed on an output side of the optical phase conjugator so that a frequency or wavelength of the input signal light may have a fixed value.

With the optical transmission apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical transmission apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical transmission apparatus is advantageous also in that the system is simplified in specification and the cost for construction of the system can be suppressed.

Furthermore, with the optical transmission apparatus, since the frequency or wavelength of the signal light on the transmission line can be controlled from the optical transmission apparatus side by the control section, there is an advantage in that the optical phase conjugator connected to the transmission line can be formed with a simple construction and also the control system of the optical phase conjugator can be maintained readily.

According to a yet further aspect of the present invention, there is provided an optical transmission apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and wherein the optical phase conjugation section and the frequency or wavelength conversion section are combined by a plural number so that a frequency or wavelength of output signal light of the optical phase conjugator coincides with a frequency or wavelength of input signal light to the optical phase conjugator, the optical transmission apparatus being disposed on an input side of the optical phase conjugator, the optical transmission apparatus comprising a frequency or wavelength measurement section for measuring a frequency or wavelength of the output signal light of the optical phase conjugator, and a control section for controlling the input signal light to the optical phase conjugator based on the frequency or wavelength of the output signal light measured by the frequency or wavelength measurement section so that a frequency or wavelength of the input signal light may have a fixed value.

With the optical transmission apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical transmission apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical transmission apparatus is advantageous also in that the system is simplified in specification and the cost for construction of the system can be suppressed.

Furthermore, with the optical transmission apparatus, since the frequency or wavelength of the signal light on the transmission line can be controlled from the optical transmission apparatus side by the control section, there is an advantage in that the optical phase conjugator connected to the transmission line can be formed with a simple construction and also the control system of the optical phase conjugator can be maintained readily.

According to a yet further aspect of the present invention, there is provided an optical transmission apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and wherein the optical phase conjugation section and the frequency or wavelength conversion section are combined by a plural number so that a frequency or wavelength of output signal light of the optical phase conjugator coincides with a frequency or wavelength of input signal light to the optical phase conjugator, the optical transmission apparatus being disposed on an input side of the optical phase conjugator, the optical transmission apparatus comprising a frequency or wavelength measurement section for measuring a frequency or wavelength of the output signal light of the optical phase conjugator, and a control section for controlling the output signal light from the optical phase conjugator based on the frequency or wavelength of the output signal light measured by the frequency or wavelength measurement section so that a frequency or wavelength of the output signal light may have a fixed value.

With the optical transmission apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical transmission apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical transmission apparatus is advantageous also in that the system is simplified in specification and the cost for construction of the system can be suppressed.

Furthermore, with the optical transmission apparatus, since the frequency or wavelength of the signal light on the transmission line can be controlled from the optical transmission apparatus side by the control section, there is an advantage in that the optical phase conjugator connected to the transmission line can be formed with a simple construction and also the control system of the optical phase conjugator can be maintained readily.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 1 to 10 are block diagrams illustrating different aspects of the present invention;

FIG. 12 is a block diagram of an optical phase conjugator showing a preferred embodiment of the present invention;

DESCRIPTION OF THE PREFERRED EMBODIMENTS a. Aspects of the Invention

Several aspects of the present invention will first be described with reference to the drawings.

Figure 1:
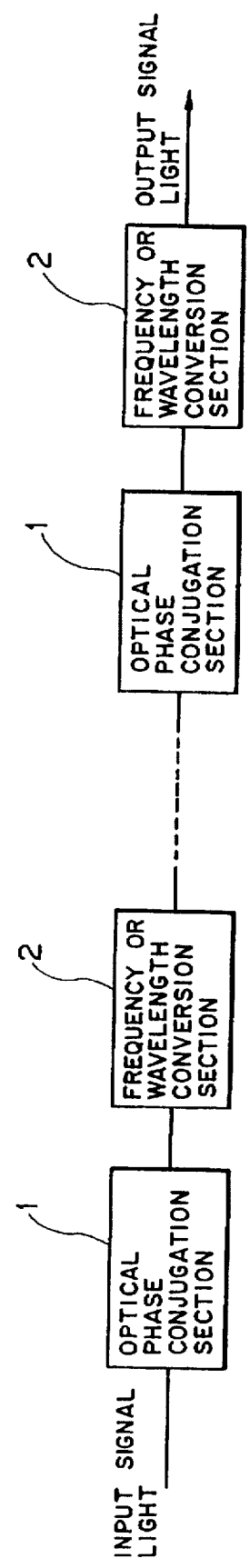

Referring first to FIG. 1, there is shown an optical phase conjugator according to an aspect of the present invention. The optical phase conjugator includes an optical phase conjugation section 1 for outputting signal light having a frequency or spectrum inverted from that of input signal light thereto, and a frequency or wavelength conversion section 2 for outputting signal light having a frequency or wavelength converted from that of the signal light inputted thereto from the optical phase conjugation section 1.

The optical phase conjugation section 1 and the frequency or wavelength conversion section 2 are combined by a plural number so that a frequency or wavelength of output signal light of the optical phase conjugator coincides with a frequency or wavelength of input signal light to the optical phase conjugator.

In the optical phase conjugator, the optical phase conjugator includes a combination of the optical phase conjugation sections each of which outputs signal light having a frequency or spectrum inverted from that of input signal light thereto and the frequency or wavelength conversion sections 2 each of which outputs signal light having a frequency or wavelength converted from that of the signal light inputted thereto from the optical phase conjugation section 1 so that that frequency or wavelength of the output signal light of the optical phase conjugator coincides with the frequency or wavelength of the input signal light to the optical phase conjugator.

Accordingly, with the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Figure 2:
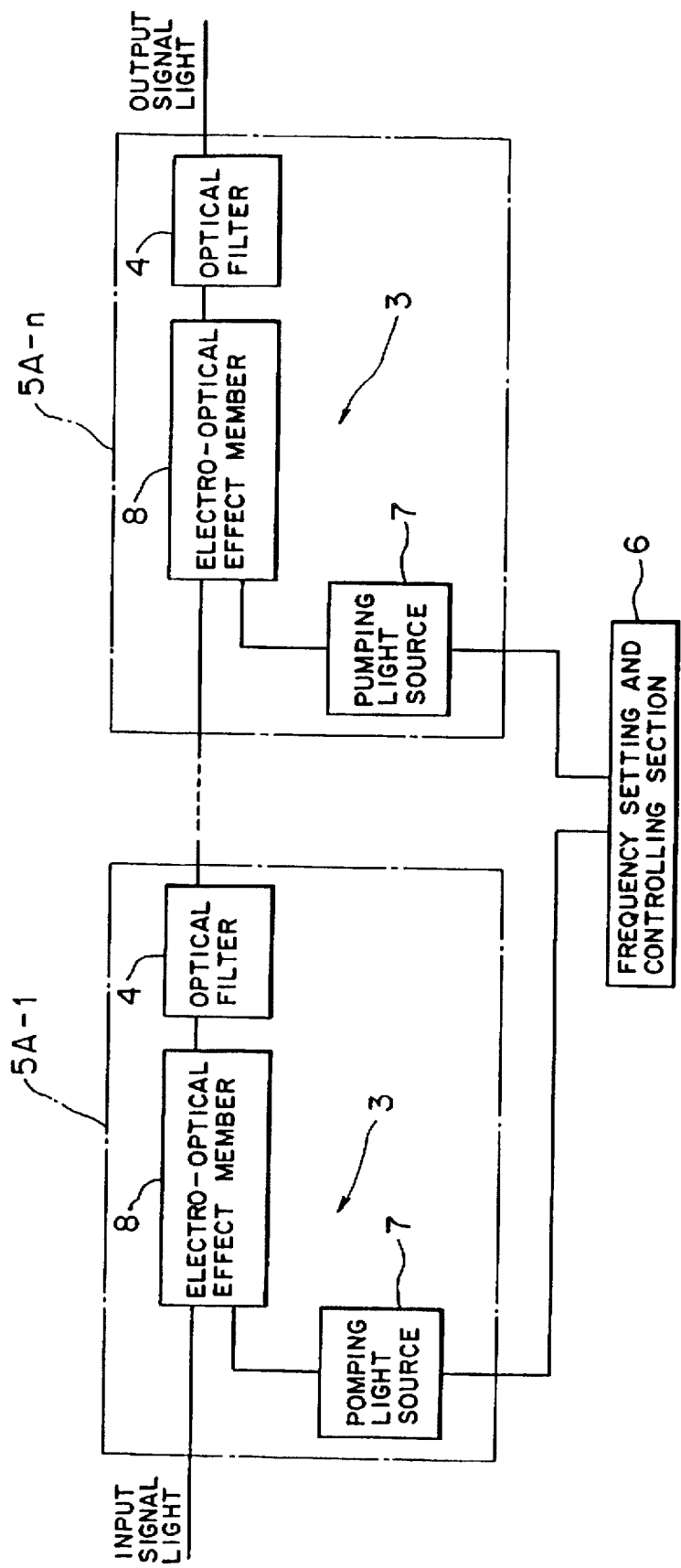

Referring now to FIG. 2, there is shown an optical phase conjugator according to an another aspect of the present invention. The optical phase conjugator includes a plurality of optical phase conjugation section-optical filter pairs 5A-1 to 5A-n each including an optical phase conjugation section 3 and an optical filter 4.

The optical phase conjugation section 3 includes a pumping light source 7 for outputting a pumping light of a frequency, and an electro-optical effect member 8 for receiving signal light and the pumping light from the pumping light source 7 and causing four wave mixing by an electro-optical effect thereof. The optical filter 4 extracts phase conjugate light or non-phase conjugate light outputted from the optical phase conjugation section 3.

The optical phase conjugation section-optical filter pairs 5A-1 to 5A-n are connected so that phase conjugate light or non-phase conjugate light is outputted from the last stage one 5A-n of the optical phase conjugation section-optical filter pairs 5A-1 to 5A-n.

The optical phase conjugator further includes a frequency setting and controlling section 6. The frequency setting and controlling section 6 sets or controls the frequency of the pumping light of each of the pumping light sources 7 so that the frequency or wavelength of the output signal light to be outputted as the phase conjugate light or non-phase conjugate light from the optical phase conjugation section-optical filter pair 5A-n at the last stage coincides with the frequency or wavelength of the input signal light inputted to the optical phase conjugation section-optical filter pair 5A-1 at the first stage.

In the optical phase conjugator of the aspect of the present invention illustrated in FIG. 2, the electro-optical effect member 8 of the optical phase conjugation section 3 of each of the plurality of optical phase conjugation section-optical filter pairs 5A-1 to 5A-n receives signal light and the pumping light from the pumping light source 7 and causes four wave mixing by an electro-optical effect thereof. The optical filter 4 extracts phase conjugate light or non-phase conjugate light outputted from the optical phase conjugation section 3.

Then, phase conjugate light or non-phase conjugate light is outputted from the optical phase conjugation section-optical filter pair 5A-n at the last stage.

The frequency setting and controlling section 6 sets or controls the frequency of the pumping light of each of the pumping light sources 7 so that the frequency or wavelength of the output signal light to be outputted as the phase conjugate light or non-phase conjugate light from the optical phase conjugation section-optical filter pair 5A-n at the last stage coincides with the frequency or wavelength of the input signal light inputted to the optical phase conjugation section-optical filter pair 5A-1 at the first stage.

Accordingly, with the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Figure 3:
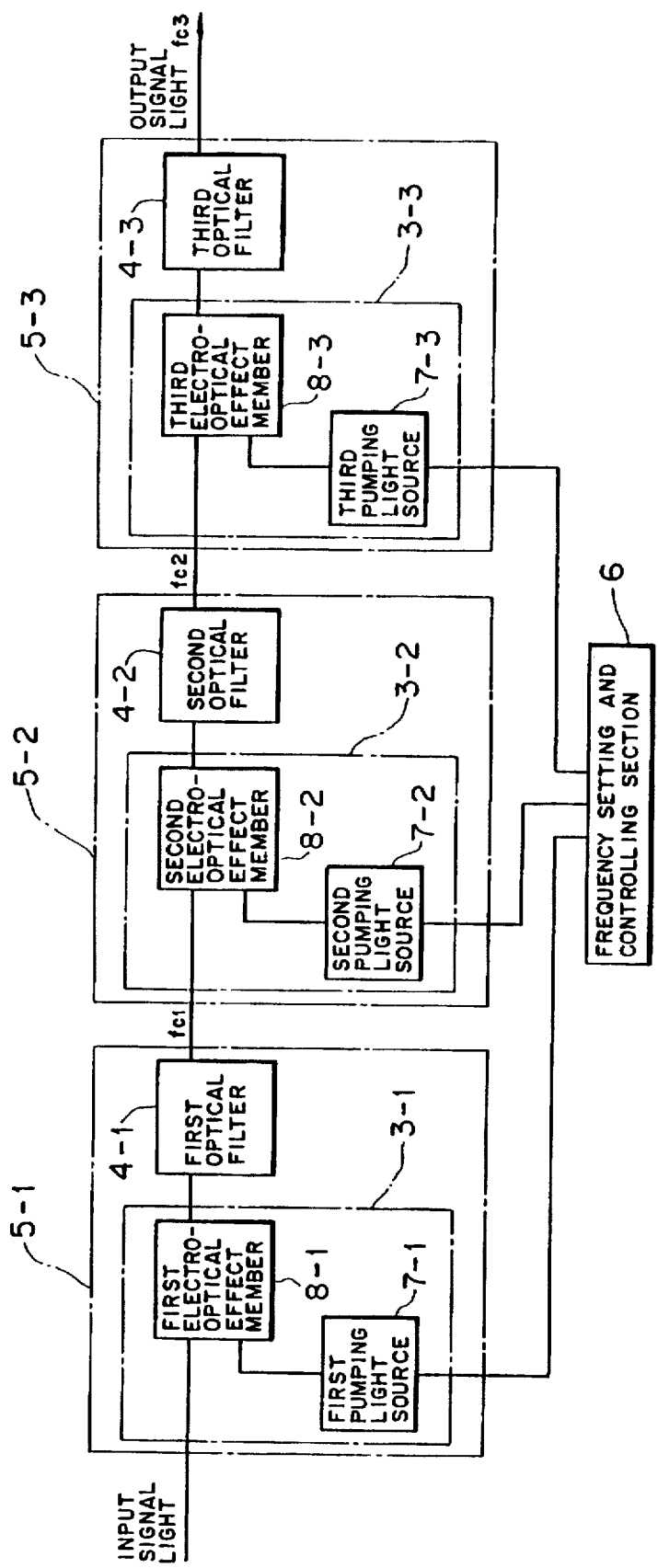

Referring now to FIG. 3, there is shown an optical phase conjugator according to a further aspect of the present invention. The optical phase conjugator includes a first optical phase conjugation section-optical filter pair 5-1 including a first optical phase conjugation section 3-1 and a first optical filter 4-1.

The first optical phase conjugation section 3-1 includes a first pumping light source 7-1 for outputting first pumping light of a frequency fp1 and a first electro-optical effect member 8-1 for receiving signal light of another frequency fs and the first pumping light from the first pumping light source 7-1 and causing four wave mixing by an electro-optical effect thereof.

The first optical filter 4-1 extracts phase conjugate light of a further frequency fc1 (=2fp1−fs) outputted from the first optical phase conjugation section 3-1.

The optical phase conjugator further includes a second optical phase conjugation section-optical filter pair 5-2 including a second optical phase conjugation section 3-2 and a second optical filter 4-2.

The second optical phase conjugation section 3-2 includes a second pumping light source 7-2 for outputting second pumping light of a still further frequency fp2, and a second electro-optical effect member 8-2 for receiving the signal light of the frequency fc1 from the first optical phase conjugation section-optical filter pair 5-1 and the second pumping light from the second pumping light source 7-2 and causing four wave mixing by an electro-optical effect thereof.

The second optical filter 4-2 extracts phase conjugate light of a yet further frequency fc2 (=2fp2−fc1) outputted from the second optical phase conjugation section 3-2.

The optical phase conjugator further includes a third optical phase conjugation section-optical filter pair 5-3 including a third optical phase conjugation section 3-3 and a third optical filter 4-3.

The third optical phase conjugation section 3-3 includes a third pumping light source 7-3 for outputting third pumping light of a yet further frequency fp3, and a third electro-optical effect member 8-3 for receiving the signal light of the frequency fc2 from the second optical phase conjugation section-optical filter pair 5-2 and the third pumping light from the third pumping light source 7-3 and causing four wave mixing by an electro-optical effect thereof.

The third optical filter 4-3 extracts phase conjugate light of a yet further frequency fc3 (=2fp3−fc2) outputted from the third optical phase conjugation section 3-3.

The optical phase conjugator further includes a frequency setting and controlling section 6. The frequency setting and controlling section 6 sets or controls the frequencies of output lights outputted from the first pumping light source 7-1, the second pumping light source 7-2 and the third pumping light source 7-3 so that the frequency or wavelength of output signal light outputted as phase conjugate light from the third optical phase conjugation section-optical filter pair 5-3 coincides with the frequency or wavelength of input signal light inputted to the first optical phase conjugation section-optical filter pair 5-1.

The frequency setting and controlling section 6 may be constructed such that it sets or controls the frequencies of the output lights of the first pumping light source 7-1, the second pumping light source 7-2 and the third pumping light source 7-3 so that the relationship of fs=fp3−fp2+fp1 is satisfied.

Or, the frequency setting and controlling section 6 may be constructed such that it controls the first pumping light source 7-1 and the second pumping light source 7-2 so that the frequency difference (fp1−fp2) between the frequency fp1 of the first pumping light and the frequency fp2 of the second pumping light may be constant, and performs stabilization control for the third pumping light source 7-3.

In this instance, the frequency setting and controlling section 6 may include a Fabry-Perot resonator having an oscillation period which is set so that a multiple thereof is equal to the frequency difference fp1−fp2 between the frequency fp1 of the first pumping light and the frequency fp2 of the second pumping light, or may further comprise a temperature control section for performing temperature controls of the first pumping light source 7-1 and the second pumping light source 7-2 simultaneously.

Or else, the frequency setting and controlling section 6 may be constructed such that it controls the second pumping light source 7-2 and the third pumping light source 7-3 so that the frequency difference (fp3−fp2) between the frequency fp3 of the third pumping light and the frequency fp2 of the second pumping light may be constant, and performs stabilization control for the first pumping light source 7-1.

In this instance, the frequency setting and controlling section 6 may include a Fabry-Perot resonator having an oscillation period which is set so that a multiple thereof is equal to the frequency difference (fp3−fp2) between the frequency fp3 of the third pumping light and the frequency fp2 of the second pumping light, or may further comprise a temperature control section for performing temperature controls of the second pumping light source 7-2 and the third pumping light source 7-3 simultaneously.

In the optical phase conjugator of the aspect of the present invention illustrated in FIG. 3, the first electro-optical effect member 8-1 of the first optical phase conjugation section 3-1 of the first optical phase conjugation section-optical filter pair 5-1 receives signal light of the frequency fs and the first pumping light of the frequency fp1 from the first pumping light source 7-1 and causes four wave mixing by an electro-optical effect thereof. The first optical filter 4-1 extracts phase conjugate light of the frequency fc1 (=2fp1−fs) outputted from the first optical phase conjugation section 3-1.

Meanwhile, the second electro-optical effect member 8-2 of the second optical phase conjugation section 3-2 of the second optical phase conjugation section-optical filter pair 5-2 receives the signal light of the frequency fc1 from the first optical phase conjugation section-optical filter pair 5-1 and the second pumping light of the frequency fp2 from the second pumping light source 7-2 and causes four wave mixing by an electro-optical effect thereof. The second optical filter 4-2 extracts phase conjugate light of the frequency fc2 (=2fp2−fc1) outputted from the second optical phase conjugation section 3-2.

Further, the third electro-optical effect member 8-3 of the third optical phase conjugation section 3-3 of the third optical phase conjugation section-optical filter pair 5-3 receives the signal light of the frequency fc2 from the second optical phase conjugation section-optical filter pair 5-2 and the third pumping light from the third pumping light source 7-3 and causes four wave mixing by an electro-optical effect thereof. The third optical filter 4-3 extracts phase conjugate light of the frequency fc3 (=2fp3−fc2) outputted from the third optical phase conjugation section 3-3.

The frequency setting and controlling section 6 sets or controls the frequencies of the output lights outputted from the first pumping light source 7-1, the second pumping light source 7-2 and the third pumping light source 7-3 so that the frequency or wavelength of the output signal light outputted as phase conjugate light from the third optical phase conjugation section-optical filter pair 5-3 coincides with the frequency or wavelength of the input signal light inputted to the first optical phase conjugation section-optical filter pair 5-1.

Further, where the frequency setting and controlling section 6 sets or controls the frequencies of the output lights of the first pumping light source 7-1, the second pumping light source 7-2 and the third pumping light source 7-3 so that the relationship of fs=fp3−fp2+fp1 is satisfied, the frequency or wavelength of the output signal light can be made coincide with the frequency or wavelength of the input signal light.

Also where the frequency setting and controlling section 6 controls the first pumping light source 7-1 and the second pumping light source 7-2 so that the frequency difference (fp1−fp2) between the frequency fp1 of the first pumping light and the frequency fp2 of the second pumping light may be constant and performs stabilization control for the third pumping light source 7-3, the frequency or wavelength of the output signal light can be made coincide with the frequency or wavelength of the input signal light.

In this instance, where the oscillation period of the Fabry-Perot resonator of the frequency setting and controlling section 6 is set so that a multiple thereof is equal to the frequency difference (fp1−fp2) between the frequency fp1 of the first pumping light and the frequency fp2 of the second pumping light or the temperature control section performs temperature controls of the first pumping light source 7-1 and the second pumping light source 7-2 simultaneously, the frequency or wavelength of the output signal light can be made coincide with the frequency or wavelength of the input signal light.

Meanwhile, where the frequency setting and controlling section 6 controls the second pumping light source 7-2 and the third pumping light source 7-3 so that the frequency difference (fp3−fp2) between the frequency fp3 of the third pumping light and the frequency fp2 of the second pumping light may be constant and performs stabilization control for the first pumping light source 7-1, the frequency or wavelength of the output signal light can be made coincide with the frequency or wavelength of the input signal light.

In this instance, where the oscillation period of the Fabry-Perot resonator of the frequency setting and controlling section 6 is set so that a multiple thereof is equal to the frequency difference (fp3–fp2) between the frequency fp3 of the third pumping light and the frequency fp2 of the second pumping light or the temperature control section performs temperature controls of the second pumping light source 7-2 and the third pumping light source 7-3 simultaneously, the frequency or wavelength of the output signal light can be made coincide with the frequency or wavelength of the input signal light.

Accordingly, with the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Figure 4:
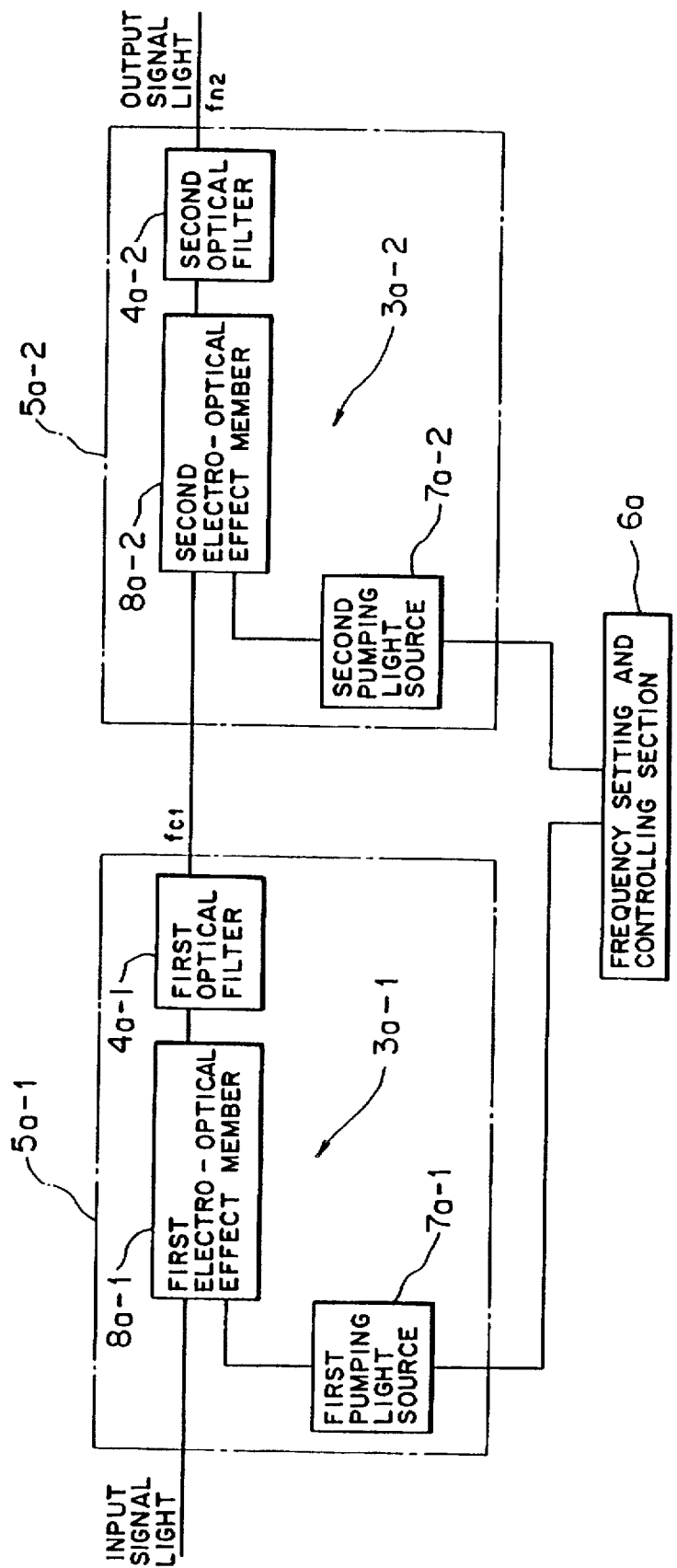

Referring now to FIG. 4, there is shown an optical phase conjugator according to a still further aspect of the present invention. The optical phase conjugator includes a first optical phase conjugation section-optical filter pair 5a-1 including a first optical phase conjugation section 3a-1 and a first optical filter 4a-1.

The first optical phase conjugation section 3a-1 includes a first pumping light source 7a-1 for outputting first pumping light of a frequency fp1 and a first electro-optical effect member 8a-1 for receiving signal light of another frequency fs and the first pumping light from the first pumping light source 7a-1 and causing four wave mixing by an electro-optical effect thereof.

The first optical filter 4a-1 extracts phase conjugate light of a further frequency fc1 (=2fp1−fs) outputted from the first optical phase conjugation section 3a-1.

The optical phase conjugator further includes a second optical phase conjugation section-optical filter pair 5a-2 including a second optical phase conjugation section 3a-2 and a second optical filter 4a-2.

The second optical phase conjugation section 3a-2 includes a second pumping light source 7a-2 for outputting second pumping light of a still further frequency fp2, and a second electro-optical effect member 8a-2 for receiving the signal light of the frequency fc1 from the first optical phase conjugation section-optical filter pair 5a-1 and the second pumping light from the second pumping light source 7a-2 and causing four wave mixing by an electro-optical effect thereof.

The second optical filter 4a-2 extracts non-phase conjugate light of a yet further frequency fn2 (=2fc1−fp2) outputted from the second optical phase conjugation section 3a-2.

The optical phase conjugator further includes a frequency setting and controlling section 6a. The frequency setting and controlling section 6a sets or controls the frequencies of output lights outputted from the first pumping light source 7a-1 and the second pumping light source 7a-2 so that the frequency or wavelength of output signal light outputted as non-phase conjugate light from the second optical phase conjugation section-optical filter pair 5a-2 coincides with the frequency or wavelength of input signal light inputted to the first optical phase conjugation section-optical filter pair 5a-1.

In this instance, the frequency setting and controlling section 6 can be constructed such that it sets or controls the frequencies of the output lights of the first pumping light source 7a-1 and the second pumping light source 7a-2 so that a relationship of fs=(4fp1−fp2)/3 is satisfied.

In the optical phase conjugator of the aspect of the present invention illustrated in FIG. 4, the first electro-optical effect member 8a-1 of the first optical phase conjugation section 3a-1 of the first optical phase conjugation section-optical filter pair 5a-1 receives the signal light of the frequency fs and the first pumping light of the frequency fp1 from the first pumping light source 7a-1 and causes four wave mixing by an electro-optical effect thereof. The first optical filter 4a-1 extracts phase conjugate light of the frequency fc1 (=2fp1−fs) outputted from the first optical phase conjugation section 3a-1.

Meanwhile, the second electro-optical effect member 8a-2 of the second optical phase conjugation section 3a-2 of the second optical phase conjugation section-optical filter pair 5a-2 receives the signal light of the frequency fc1 from the first optical phase conjugation section-optical filter pair 5a-1 and the second pumping light of the frequency fp2 from the second pumping light source 7a-2 and causes four wave mixing by an electro-optical effect thereof. The second optical filter 4a-2 extracts non-phase conjugate light of the frequency fn2 (=2fc1−fp2) outputted from the second optical phase conjugation section 3a-2.

Further, the frequency setting and controlling section 6a sets or controls the frequencies of the output lights outputted from the first pumping light source 7a-1 and the second pumping light source 7a-2 so that the frequency or wavelength of output signal light outputted as non-phase conjugate light from the second optical phase conjugation section-optical filter pair 5a-2 coincides with the frequency or wavelength of the input signal light inputted to the first optical phase conjugation section-optical filter pair 5a-1.

In this instance, where the frequency setting and controlling section 6 sets or controls the frequencies of the output lights of the first pumping light source 7a-1 and the second pumping light source 7a-2 so that the relationship of fs=(4fp1−fp2)/3 is satisfied, the frequency or wavelength of the output signal light can be made coincide with the frequency or wavelength of the input signal light.

Accordingly, with the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Furthermore, with the optical phase conjugator, since it can be formed from a pair of optical phase conjugation section-optical filter pairs and a frequency setting and controlling section, a comparatively small number of optical phase conjugation section-optical filter pairs are required. Consequently, the optical phase conjugator can be produced with a comparatively small number of parts and with a comparatively low cost.

Figure 5:
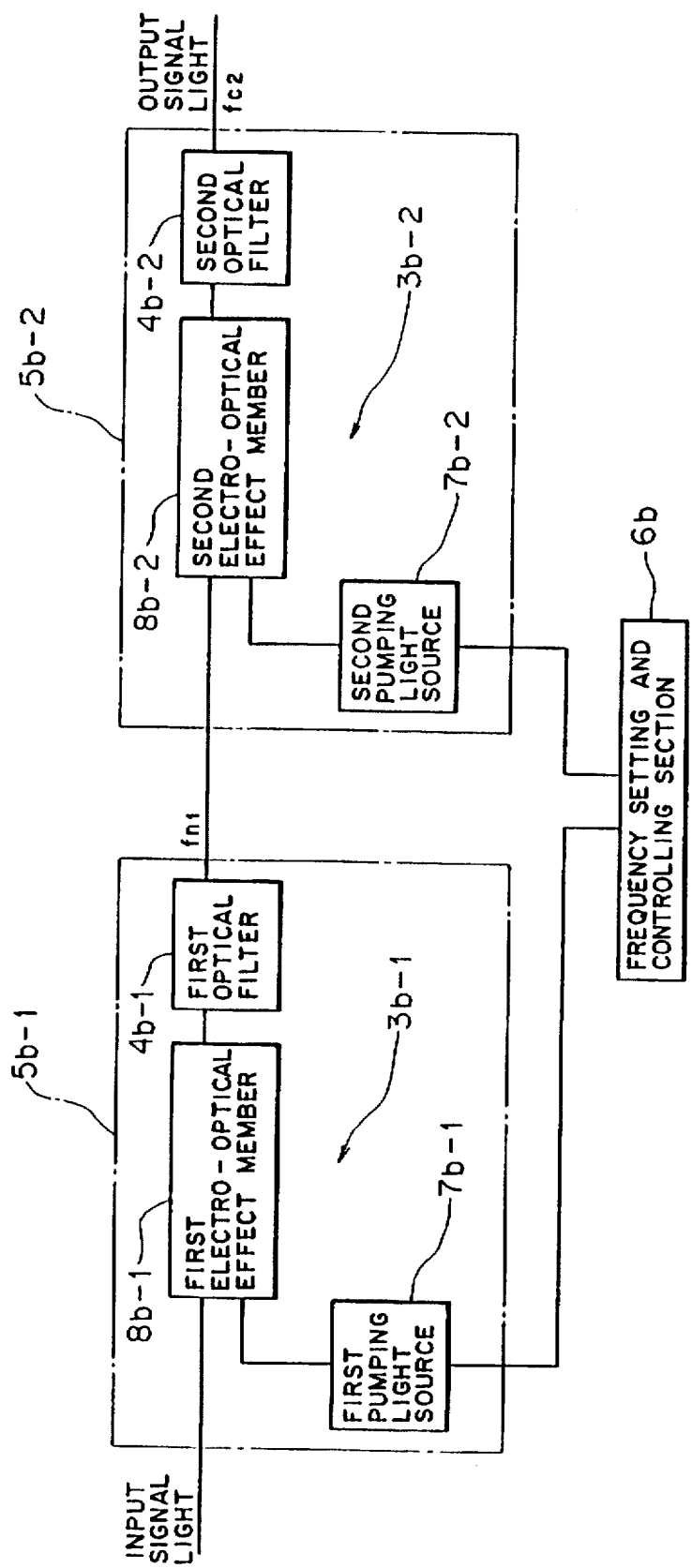

Referring now to FIG. 5, there is shown an optical phase conjugator according to a still further aspect of the present invention. The optical phase conjugator includes a first optical phase conjugation section-optical filter pair $5b$-1 including a first optical phase conjugation section $3b$-1 and a first optical filter $4b$-1.

The first optical phase conjugation section $3b$-1 includes a first pumping light source $7b$-1 for outputting first pumping light of a frequency fp1, and a first electro-optical effect member $8b$-1 for receiving signal light of another frequency fs and the first pumping light from the first pumping light source $7b$-1 and causing four wave mixing by an electro-optical effect thereof.

The first optical filter $4b$-1 extracts non-phase conjugate light of a further frequency fn1 (=2fs−fp1) outputted from the first optical phase conjugation section $3b$-1.

The optical phase conjugator further includes a second optical phase conjugation section-optical filter pair $5b$-2 including a second optical phase conjugation section $3b$-2 and a second optical filter $4b$-2.

The second optical phase conjugation section $3b$-2 includes a second pumping light source $7b$-2 for outputting second pumping light of a still further frequency fp2 and a second electro-optical effect member $8b$-2 for receiving the signal light of the frequency fn1 from the first optical phase conjugation section-optical filter pair $5b$-1 and the second pumping light from the second pumping light source $7b$-2 and causing four wave mixing by an electro-optical effect thereof.

The second optical filter $4b$-2 extracts phase conjugate light of a yet further frequency fc2 (=2fp2−fc1) outputted from the second optical phase conjugation section $3b$-2.

The optical phase conjugator further includes a frequency setting and controlling section $6b$. The frequency setting and controlling section $6b$ sets or controls the frequencies of the output lights outputted from the first pumping light source $7b$-1 and the second pumping light source $7b$-2 so that the frequency or wavelength of the output signal light outputted as phase conjugate light from the second optical phase conjugation section-optical filter pair $5b$-2 coincides with the frequency or wavelength of the input signal light inputted to the first optical phase conjugation section-optical filter pair $5b$-1.

In this instance, the frequency setting and controlling section $6b$ may be constructed such that it sets or controls the frequencies of the output lights of the first pumping light source $7b$-1 and the second pumping light source $7b$-2 so that a relationship of fs=(2fp1+fp2)/3 is satisfied.

It is to be noted that the optical phase conjugator of each of the aspects of the present invention described hereinabove with reference to FIGS. 1 to 5 may further comprise an optical frequency or wavelength measurement section for measuring frequencies or wavelengths of the pumping lights from all or some of the pumping light sources or a temperature control section for controlling temperatures of all or some of the pumping light sources, or may be constructed such that the electro-optical effect material or materials are formed from an optical fiber or a semiconductor or it further comprises an optical amplifier interposed between each adjacent ones of the optical phase conjugation section-optical filter pairs for correcting a power of light communicated between the adjacent optical phase conjugation section-optical filter pairs.

In the optical phase conjugator of the aspect of the present invention illustrated in FIG. 5, the first electro-optical effect member $8b$-1 of the first optical phase conjugation section $3b$-1 of the first optical phase conjugation section-optical filter pair $5b$-1 receives the signal light of the frequency fs and the first pumping light of the frequency fp1 from the first pumping light source $7b$-1 and causes four wave mixing by an electro-optical effect thereof. The first optical filter $4b$-1 extracts non-phase conjugate light of the frequency fn1 (=2fs−fp1) outputted from the first optical phase conjugation section $3b$-1.

The second electro-optical effect member $8b$-2 of the second optical phase conjugation section $3b$-2 of the second optical phase conjugation section-optical filter pair $5b$-2 receives the signal light of the frequency fn1 from the first optical phase conjugation section-optical filter pair $5b$-1 and the second pumping light of the frequency fp2 from the second pumping light source $7b$-2 and causes four wave mixing by an electro-optical effect thereof. The second optical filter $4b$-2 extracts phase conjugate light of the frequency fc2 (=2fp2−fc1) outputted from the second optical phase conjugation section $3b$-2.

The frequency setting and controlling section $6b$ sets or controls the frequencies of the output lights outputted from the first pumping light source $7b$-1 and the second pumping light source $7b$-2 so that the frequency or wavelength of the output signal light outputted as phase conjugate light from the second optical phase conjugation section-optical filter pair $5b$-2 coincides with the frequency or wavelength of the input signal light inputted to the first optical phase conjugation section-optical filter pair $5b$-1.

In this instance, where the frequency setting and controlling section $6b$ sets or controls the frequencies of the output lights of the first pumping light source $7b$-1 and the second pumping light source $7b$-2 so that the relationship of fs=(2fp1+fp2)/3 is satisfied, the frequency or wavelength of the output signal light can be made coincide with the frequency or wavelength of the input signal light.

It is to be noted that, in the optical phase conjugator of each of the aspects of the present invention described hereinabove with reference to FIGS. 1 to 5, the optical frequency or wavelength measurement section may measure the frequencies or wavelengths of the pumping lights from all or some of the pumping light sources, or the temperature control section may control the temperatures of all or some of the pumping light sources.

Further, the electro-optical effect materials may be formed from an optical fiber or a semiconductor, or the optical amplifier may be interposed between each adjacent ones of the optical phase conjugation section-optical filter pairs such that it corrects the power of light communicated between the adjacent optical phase conjugation section-optical filter pairs.

Accordingly, with the optical phase conjugator, since the frequency or wavelength of the output signal light can be made coincide with the frequency or wavelength of the input signal light, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Furthermore, with the optical phase conjugator, since it can be formed from a pair of optical phase conjugation section-optical filter pairs and a frequency setting and controlling section, a comparatively small number of optical phase conjugation section-optical filter pairs are required. Consequently, the optical phase conjugator can be produced with a comparatively small number of parts and with a comparatively low cost.

Referring now to FIG. 6, there is shown an optical reception apparatus according to a yet further aspect of the present invention. The optical reception apparatus is generally denoted at 9 and is applied to an optical communication system 11 which includes an optical phase conjugator 10.

Though not shown, the optical phase conjugator 10 is constructed such that it includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and that the optical phase conjugation section and the frequency or wavelength conversion section are combined by a plural number so that a frequency or wavelength of output signal light of the optical phase conjugator coincides with a frequency or wavelength of input signal light to the optical phase conjugator. The optical reception apparatus 9 is disposed on an output side of the optical phase conjugator 10.

The optical reception apparatus 9 includes a frequency or wavelength measurement section 9A for measuring the frequency or wavelength of the output signal light of the optical phase conjugator 10, and a control section 9B for outputting a control signal to the optical phase conjugator 10 so that the frequency or wavelength of the output signal light measured by the frequency or wavelength measurement section 9A may have a fixed value.

In the optical reception apparatus according to the aspect of the present invention illustrated in FIG. 6, the frequency or wavelength measurement section 9A measures the frequency or wavelength of the output signal light of the optical phase conjugator 10, and the control section 9B outputs a control signal to the optical phase conjugator 10 so that the frequency or wavelength of the output signal light measured by the frequency or wavelength measurement section 9A may have a fixed value.

Accordingly, with the optical reception apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical reception apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical reception apparatus is advantageous also in that the system is simplified in specification and the cost for construction of the system can be suppressed.

Furthermore, with the optical reception apparatus, since the frequency or wavelength of the signal light on the transmission line can be controlled from the optical reception apparatus side by the control section, there is an advantage in that the optical phase conjugator connected to the transmission line can be formed with a simple construction and also the control system of the optical phase conjugator can be maintained readily.

Figure 7:
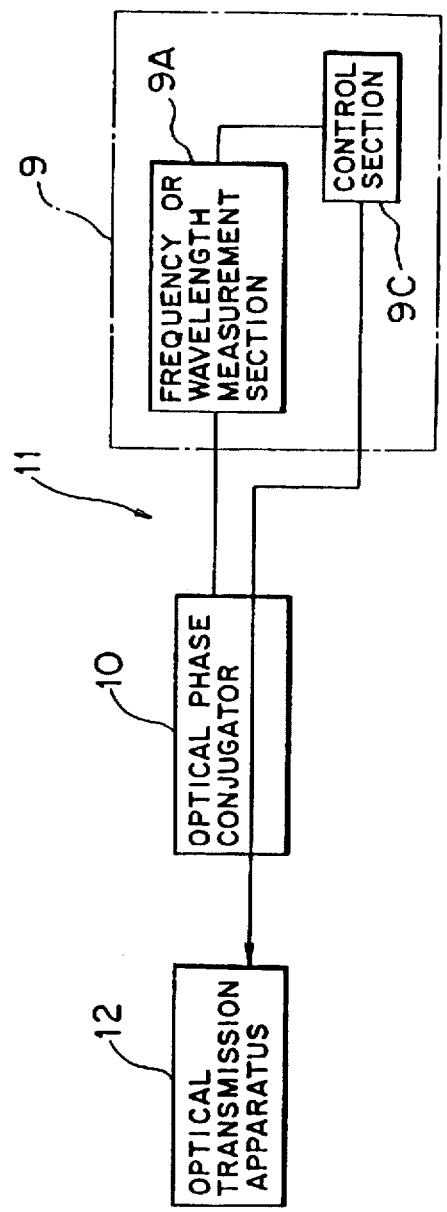

Referring now to FIG. 7, there is shown an optical reception apparatus according to a yet further aspect of the present invention. The optical reception apparatus is generally denoted at 9 and is applied to an optical communication system 11 which includes an optical phase conjugator 10.

Though not shown, the optical phase conjugator 10 is constructed such that it includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and that the optical phase conjugation section and the frequency or wavelength conversion section are combined by a plural number so that a frequency or wavelength of output signal light of the optical phase conjugator coincides with a frequency or wavelength of input signal light to the optical phase conjugator. The optical reception apparatus 9 is disposed on an output side of the optical phase conjugator 10.

The optical reception apparatus 9 includes a frequency or wavelength measurement section 9A for measuring the frequency or wavelength of the output signal light of the optical phase conjugator 10, and a control section 9C for outputting a control signal to an optical transmission apparatus 12 disposed on an input side of the optical phase conjugator 10 based on the frequency or wavelength of the output signal light measured by the frequency or wavelength measurement section 9A so that the frequency or wavelength of the input signal light to the optical phase conjugator 10 may have a fixed value.

In the optical reception apparatus according to the aspect of the present invention illustrated in FIG. 7, the frequency or wavelength measurement section 9A measures the frequency or wavelength of the output signal light of the optical phase conjugator 10, and the control section 9C outputs a control signal to the optical transmission apparatus 12 disposed on the input side of the optical phase conjugator 10 based on the frequency or wavelength of the output signal light measured by the frequency or wavelength measurement section 9A so that the frequency or wavelength of the input signal light to the optical phase conjugator 10 may have a fixed value.

Accordingly, with the optical reception apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical reception apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical reception apparatus is advantageous also in that the system is simplified in specification and the cost for construction of the system can be suppressed.

Furthermore, with the optical reception apparatus, since the frequency or wavelength of the signal light on the transmission line can be controlled from the optical reception apparatus side by the control section, there is an advantage in that the optical phase conjugator connected to the transmission line can be formed with a simple construction and also the control system of the optical phase conjugator can be maintained readily.

Figure 8:
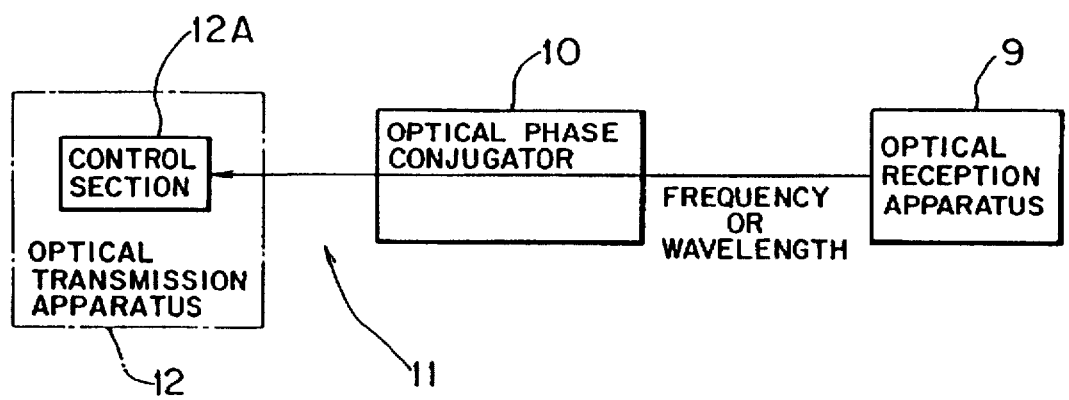

Referring now to FIG. 8, there is shown an optical transmission apparatus according to a yet further aspect of the present invention. The optical transmission apparatus is generally denoted at 12 and is applied to an optical communication system 11 which includes an optical phase conjugator 10. Though not shown, the optical phase conjugator 10 is constructed such that it includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and that the optical phase conjugation section and the frequency or wavelength conversion section are combined by a plural number so that a frequency or wavelength of output signal light of the optical phase conjugator coincides with a frequency or wavelength of input signal light to the optical phase conjugator. The optical transmission apparatus 12 is disposed on an input side of the optical phase conjugator 10.

The optical transmission apparatus 12 includes a control section 12A for controlling the input signal light to the optical phase conjugator 10 based on a frequency or wavelength of the output signal light measured by an optical reception apparatus 9 disposed on an output side of the optical phase conjugator 10 so that a frequency or wavelength of the input signal light may have a fixed value.

In the optical transmission apparatus according to the aspect of the present invention illustrated in FIG. 8, the frequency or wavelength measurement section 9A measures the frequency or wavelength of the output signal light of the optical phase conjugator 10, and the control section 9C outputs a control signal to the optical transmission apparatus 12 disposed on the input side of the optical phase conjugator 10 based on the frequency or wavelength of the output signal light measured by the frequency or wavelength measurement section 9A so that the frequency or wavelength of the input signal light to the optical phase conjugator 10 may have a fixed value.

Accordingly, with the optical transmission apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical transmission apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical transmission apparatus is advantageous also in that the system is simplified in specification and the cost for construction of the system can be suppressed.

Furthermore, with the optical transmission apparatus, since the frequency or wavelength of the signal light on the transmission line can be controlled from the optical transmission apparatus side by the control section, there is an advantage in that the optical phase conjugator connected to the transmission line can be formed with a simple construction and also the control system of the optical phase conjugator can be maintained readily.

Figure 9:
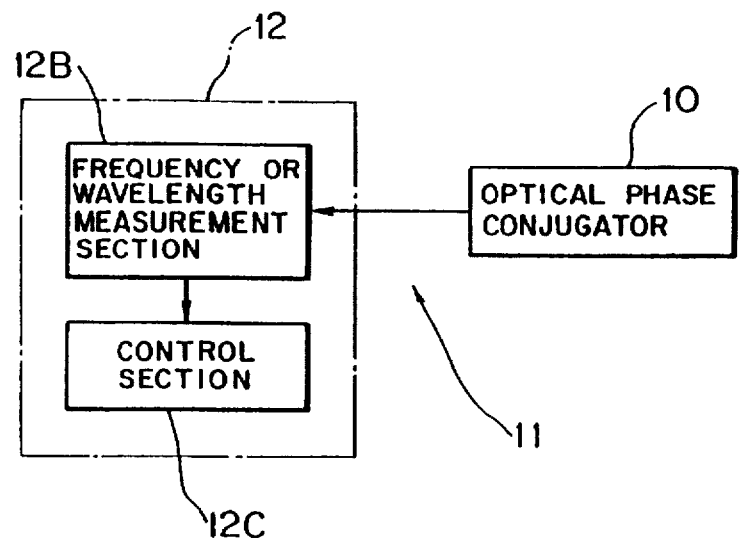

Referring now to FIG. 9, there is shown an optical transmission apparatus according to a yet further aspect of the present invention. The optical transmission apparatus is generally denoted at 12 and is applied to an optical communication system 11 which includes an optical phase conjugator 10.

Though not shown, the optical phase conjugator 10 is constructed such that it includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and that the optical phase conjugation section and the frequency or wavelength conversion section are combined by a plural number so that a frequency or wavelength of output signal light of the optical phase conjugator coincides with a frequency or wavelength of input signal light to the optical phase conjugator. The optical transmission apparatus 12 is disposed on an input side of the optical phase conjugator 10.

The optical transmission apparatus 12 includes a frequency or wavelength measurement section 12B for measuring a frequency or wavelength of the output signal light of the optical phase conjugator 10, and a control section 12C for controlling the input signal light to the optical phase conjugator 10 based on the frequency or wavelength of the output signal light measured by the frequency or wavelength measurement section 12B so that a frequency or wavelength of the input signal light may have a fixed value.

In the optical transmission apparatus according to the aspect of the present invention illustrated in FIG. 9, the frequency or wavelength measurement section 12B measures the frequency or wavelength of the output signal light of the optical phase conjugator 10, and the control section 12C controls the input signal light to the optical phase conjugator 10 based on the frequency or wavelength of the output signal light measured by the frequency or wavelength measurement section 12B so that the frequency or wavelength of the input signal light may have a fixed value.

Accordingly, with the optical transmission apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical transmission apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical transmission apparatus is advantageous also in that the system is simplified in specification and the cost for construction of the system can be suppressed.

Furthermore, with the optical transmission apparatus, since the frequency or wavelength of the signal light on the transmission line can be controlled from the optical transmission apparatus side by the control section, there is an advantage in that the optical phase conjugator connected to the transmission line can be formed with a simple construction and also the control system of the optical phase conjugator can be maintained readily.

Figure 10:
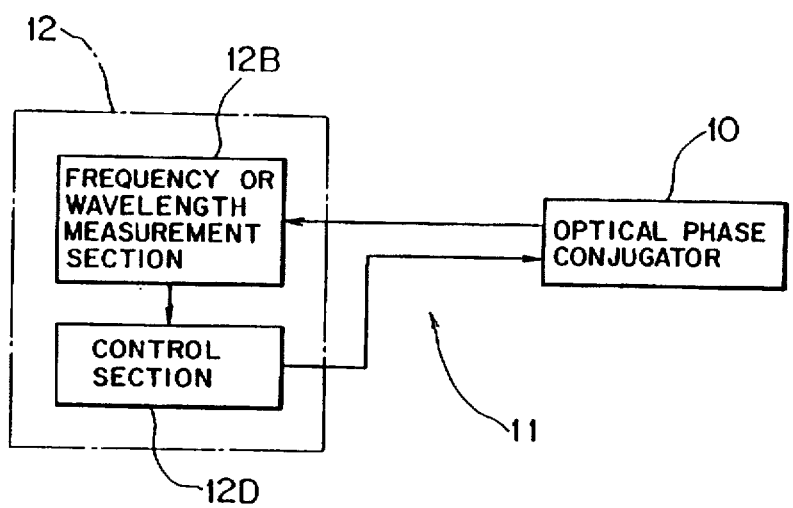

Referring now to FIG. 10, there is shown an optical transmission apparatus according to a yet further aspect of the present invention. The optical transmission apparatus is generally denoted at 12 and is applied to an optical communication system 11 which includes an optical phase conjugator 10.

Though not shown, the optical phase conjugator 10 is constructed such that it includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from the optical phase conjugation section and that the optical phase conjugation section and the frequency or wavelength conversion section are combined by a plural number so that a frequency or wavelength of output signal light of the optical phase conjugator coincides with a frequency or wavelength of input signal light to the optical phase conjugator. The optical transmission apparatus 12 is disposed on an input side of the optical phase conjugator 10.

The optical transmission apparatus 12 includes a frequency or wavelength measurement section 12B for measuring a frequency or wavelength of the output signal light of the optical phase conjugator 10, and a control section 12D for controlling the output signal light of the optical phase conjugator 10 based on the frequency or wavelength of the output signal light measured by the frequency or wavelength measurement section 12B so that a frequency or wavelength of the output signal light may have a fixed value.

In the optical transmission apparatus according to the aspect of the present invention illustrated in FIG. 10, the frequency or wavelength measurement section 12B measures the frequency or wavelength of the output signal light of the optical phase conjugator 10, and the control section 12D controls the output signal light of the optical phase conjugator 10 based on the frequency or wavelength of the output signal light measured by the frequency or wavelength measurement section 12B so that the frequency or wavelength of the output signal light may have a fixed value.

Accordingly, with the optical transmission apparatus, since the frequency or wavelength of the output signal light of the optical phase conjugator can be made coincide with the frequency or wavelength of the input signal light to the optical phase conjugator, where the optical phase conjugator is applied to an optical transmission system which includes an optical transmission apparatus, a transmission line and an optical reception apparatus such that it is interposed on the transmission line, optical amplifiers and transmission lines which have the same specifications with regard to the wavelength can be connected to the opposite front and rear ends of the optical phase conjugator. Consequently, the optical transmission apparatus is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical transmission apparatus is advantageous also in that the system is simplified in specification and the cost for construction of the system can be suppressed.

Furthermore, with the optical transmission apparatus, since the frequency or wavelength of the signal light on the transmission line can be controlled from the optical transmission apparatus side by the control section, there is an advantage in that the optical phase conjugator connected to the transmission line can be formed with a simple construction and also the control system of the optical phase conjugator can be maintained readily.

b. First Embodiment

Referring now to FIG. 12, there is shown in block diagram an optical phase conjugator according to a first preferred embodiment of the present invention. The optical phase conjugator shown is generally denoted at 40 and can be applied to, for example, such an optical communication system as shown in FIG. 11.

Figure 11:
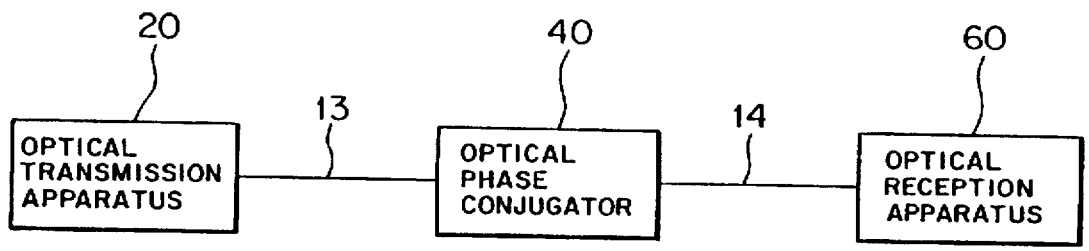
FIG. 11 is a block diagram showing an optical communication system to which an optical phase conjugator according to the present invention is applied.

Referring to FIG. 11, the optical communication system shown includes an optical transmission apparatus 20 and an optical reception apparatus 60 connected to each other via a transmission line 13, the optical phase conjugator 40 and another transmission line 14 such that signal light transmitted from the optical transmission apparatus 20 is received by the optical reception apparatus 60.

The transmission lines 13 and 14 are each formed from optical fibers or the like of a very long distance across an ocean of up to several thousands kilometers and have the same specifications with regard to the wavelength and equal transmission line lengths to each other. Consequently, the optical transmission system is constructed as a very long haul transmission system.

The optical phase conjugator 40 is connected between the transmission line 13 and the transmission line 14 and outputs to the optical reception apparatus 60 output signal light of a frequency (or wavelength) equal to the frequency (or wavelength) of input signal light received from the optical transmission apparatus 20.

Referring back to FIG. 12, the optical phase conjugator 40 particularly includes three optical phase conjugation section-optical filter pairs connected in tandem including a first optical phase conjugation section-optical filter pair 41-1, a second optical phase conjugation section-optical filter pair 41-2 and a third optical phase conjugation section-optical filter pair 41-3.

The first optical phase conjugation section-optical filter pair 41-1 includes a first optical phase conjugation section 43-1 and a first optical filter 47-1.

The first optical phase conjugation section 43-1 includes a first pumping light source 44-1 for outputting first pumping light of a frequency fp1, a first wave combiner 45-1 for combining input signal light (signal light) of another frequency fs and the first pumping light from the first pumping light source 44-1, and a first optical fiber (first electro-optical effect material) 46-1 for receiving the combined signal light from the first wave combiner 45-1 and causing four wave mixing by an electro-optical effect thereof.

Figure 33:
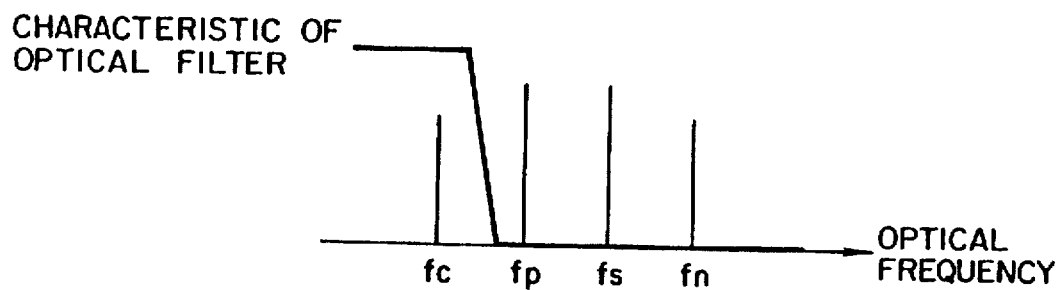
FIGS. 33 and 34 are diagrams illustrating different frequency characteristics of an optical filter.

The first optical filter 47-1 extracts phase conjugate light of a frequency fc1 (=2fp1−fs) from signal light outputted from the first optical phase conjugation section 43-1 and outputs the phase conjugate light as an output signal of the first optical phase conjugation section-optical filter pair 41-1 to the second optical phase conjugation section-optical filter pair 41-2. An optical filter having such a filter characteristic as described hereinabove with reference to FIG. 33 can be used for the first optical filter 47-1.

The second optical phase conjugation section-optical filter pair 41-2 includes a second optical phase conjugation section 43-2 and a second optical filter 47-2.

The second optical phase conjugation section 43-2 includes a second pumping light source 44-2 for outputting second pumping light of a frequency fp2, a second wave combiner 45-2 for combining signal light of the frequency fc1 from the first optical phase conjugation section-optical filter pair 41-1 and the second pumping light from the second pumping light source 44-2, and a second optical fiber (second electro-optical effect material) 46-2 for receiving the combined signal light from the second wave combiner 45-2 and causing four wave mixing by an electro-optical effect thereof.

The second optical filter 47-2 extracts phase conjugate light of a frequency fc2 (=2fp2−fc1) from signal light outputted from the second optical phase conjugation section 43-2 and outputs the phase conjugate light as an output signal of the second optical phase conjugation section-optical filter pair 41-2 to the third optical phase conjugation section-optical filter pair 41-3. An optical filter having such a filter characteristic as described hereinabove with reference to FIG. 33 can be used for the second optical filter 47-2 similarly to that for the first optical filter 47-1.

The third optical phase conjugation section-optical filter pair 41-3 includes a third optical phase conjugation section 43-3 and a third optical filter 47-3.

The third optical phase conjugation section 43-3 includes a third pumping light source 44-3 for outputting third pumping light of a frequency fp3, a third wave combiner 45-3 for combining signal light of the frequency fc2 from the second optical phase conjugation section-optical filter pair 41-2 and the third pumping light from the third pumping light source 44-3, and a third optical fiber (third electro-optical effect material) 46-3 for receiving the combined signal light from the third wave combiner 45-3 and causing four wave mixing by an electro-optical effect thereof.

The third optical filter 47-3 extracts phase conjugate light of a frequency fc3 (=2fp3−fc2) from signal light outputted from the third optical phase conjugation section 43-3 and outputs the phase conjugate light as output signal light of the optical phase conjugator 40. Similarly for the first and second optical filters 47-1 and 47-2, an optical filter having such a filter characteristic as described hereinabove with reference to FIG. 33 can be used for the third optical filter 47-3.

The optical phase conjugator 40 further includes a frequency setting and controlling section 42 which sets or controls the frequencies of pumping lights to be outputted from the first pumping light source 44-1, the second pumping light source 44-2 and the third pumping light source 44-3 so that the frequency or wavelength of output signal light outputted as phase conjugate light from the third optical phase conjugation section-optical filter pair 41-3 may coincide with the frequency or wavelength of input signal light inputted to the first optical phase conjugation section-optical filter pair 41-1.

More particularly, the frequency setting and controlling section 42 performs ambient temperature control or excitation power supply control for the first pumping light source 44-1, the second pumping light source 44-2 and the third pumping light source 44-3 to set or control the frequencies of pumping lights to be outputted from the first to third pumping light sources 44-1 to 44-3.

Where the frequency setting and controlling section 42 performs setting and control of the frequencies of pumping light by the ambient temperature control of the first to third pumping light sources 44-1 to 44-3, it may include several elements necessary to control the ambient temperatures of the first to third pumping light sources 44-1 to 44-3 such as, for example, temperature sensors for detecting the ambient temperatures and heaters for adjusting the ambient temperatures.

Operation of the optical phase conjugator of the first embodiment of the present invention having the construction described above will be described below with reference to FIGS. 13(a) to 13(f).

In the optical communication system as a very long haul transmission system shown in FIG. 11, signal light is communicated between the optical transmission apparatus 20 and the optical reception apparatus 60 which is connected to the optical transmission apparatus 20 via the transmission lines 13 and 14 formed from optical fibers or the like extending across an ocean of up to several thousands kilometers. In the communications, the optical phase conjugator 40 which interconnects the transmission line 13 and the transmission line 14 outputs signal light fc3 coincident with transmission signal light fs from the transmission line 13 to the transmission line 14.

In particular, when the signal light fs is inputted to the first optical phase conjugation section-optical filter pair 41-1, the first wave combiner 45-1 combines the signal light fs and pumping light fp1 from the first pumping light source 44-1 and inputs the combined signal light to the first optical fiber 46-1.

In response to the combined signal light, four wave mixing is caused in the first optical fiber 46-1 by an electro-optical effect. Then, the first optical filter 47-1 extracts phase conjugate light of the frequency fc1 (=2fp1−fs) (refer to the signal spectrum of FIG. 13(b)) from the signal light from the first optical fiber 46-1 (refer to the signal spectrum of FIG. 13(a)) and outputs the thus extracted phase conjugate light.

Similarly, when the signal light fc1 from the first optical phase conjugation section-optical filter pair 41-1 is inputted to the second optical phase conjugation section-optical filter pair 41-2, the signal light fc1 and pumping light fp2 from the second pumping light source 44-2 are combined by the second wave combiner 45-2 and inputted to the second optical fiber 46-2.

In response to the inputted combined signal light, four wave mixing is caused in the second optical fiber 46-2 by an electro-optical effect. Then, the second optical filter 47-2 extracts phase conjugate light of the frequency fc2 (=2fp2−fc1) (refer to the signal spectrum of FIG. 13(d)) from the signal light from the second optical fiber 46-2 (refer to the signal spectrum of FIG. 13(c)) and outputs the extracted phase conjugate light.

Further, when the signal light fc2 from the second optical phase conjugation section-optical filter pair 41-2 is inputted to the third optical phase conjugation section-optical filter pair 41-3, the signal light fc2 and pumping light fp3 from the third pumping light source 44-3 are combined by the third wave combiner 45-3 and inputted to the third optical fiber 46-3.

In response to the inputted combined signal light, four wave mixing is caused in the third optical fiber 46-3 by an electro-optical effect. Then, the third optical filter 47-3 extracts phase conjugate light of the frequency fc3 (=2fp3−fc2) (refer to the signal spectrum of FIG. 13(f)) from the signal light from the third optical fiber 46-3 (refer to the signal spectrum of FIG. 13(e)) and outputs the thus extracted signal light.

Accordingly, the frequency fc3 of the output signal light can be represented as given by the following equation (6):

$$fc3=2fp3-fc2 =2fp3-(2fp2+fc1) =2fp3-2fp2+(2fp1-fs) =2fp3-2fp2+2fp1-fs \quad (6)$$

Consequently, the output signal light fc3 outputted from the third optical phase conjugation section-optical filter pair 41-3 is phase conjugate light with respect to the input signal light fs.

Here, the frequency setting and controlling section 42 sets or controls the frequencies of the pumping lights to be outputted from the first pumping light source 44-1, the second pumping light source 44-2 and the third pumping light source 44-3 so that the frequency fc3 (or wavelength) of the output signal light outputted as phase conjugate light from the third optical phase conjugation section-optical filter pair 41-3 may be coincident with the frequency fs (or wavelength) of the input signal light inputted to the first optical phase conjugation section-optical filter pair 41-1.

Consequently, since the input signal light fs and the output signal light fc3 coincide with each other, the frequencies of the pumping lights to be outputted from the first to third pumping light sources 44-1 to 44-3 are set or controlled by the frequency setting and controlling section 42 so that the following equations (7) and (8) may be satisfied:

$$fs=fc3=2fp3-2fp2+2fp1-fs \quad (7)$$

$$fs=fp3-fp2+fp1 \quad (8)$$

In this manner, with the optical phase conjugator according to the first embodiment of the present invention, since the frequency or wavelength of output signal light to be outputted as phase conjugate light from the third optical phase conjugation section-optical filter pair 41-3 can be made coincide with the frequency or wavelength of input signal light inputted to the first optical phase conjugation section-optical filter pair 41-1 by setting or controlling the frequencies of pumping lights to be outputted from the first to third pumping light sources 44-1 to 44-3 by the frequency setting and controlling section 42, optical amplifiers and transmission lines which have the same specifications with regard to the wavelength can be connected to the opposite front and rear ends of the optical phase conjugator (refer to the equation (5) above). Consequently, the optical phase conjugator is advantageous in that very long haul high speed optical transmission over approximately 10,000 km can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

b1. First Modification to the First Embodiment

Figure 14:
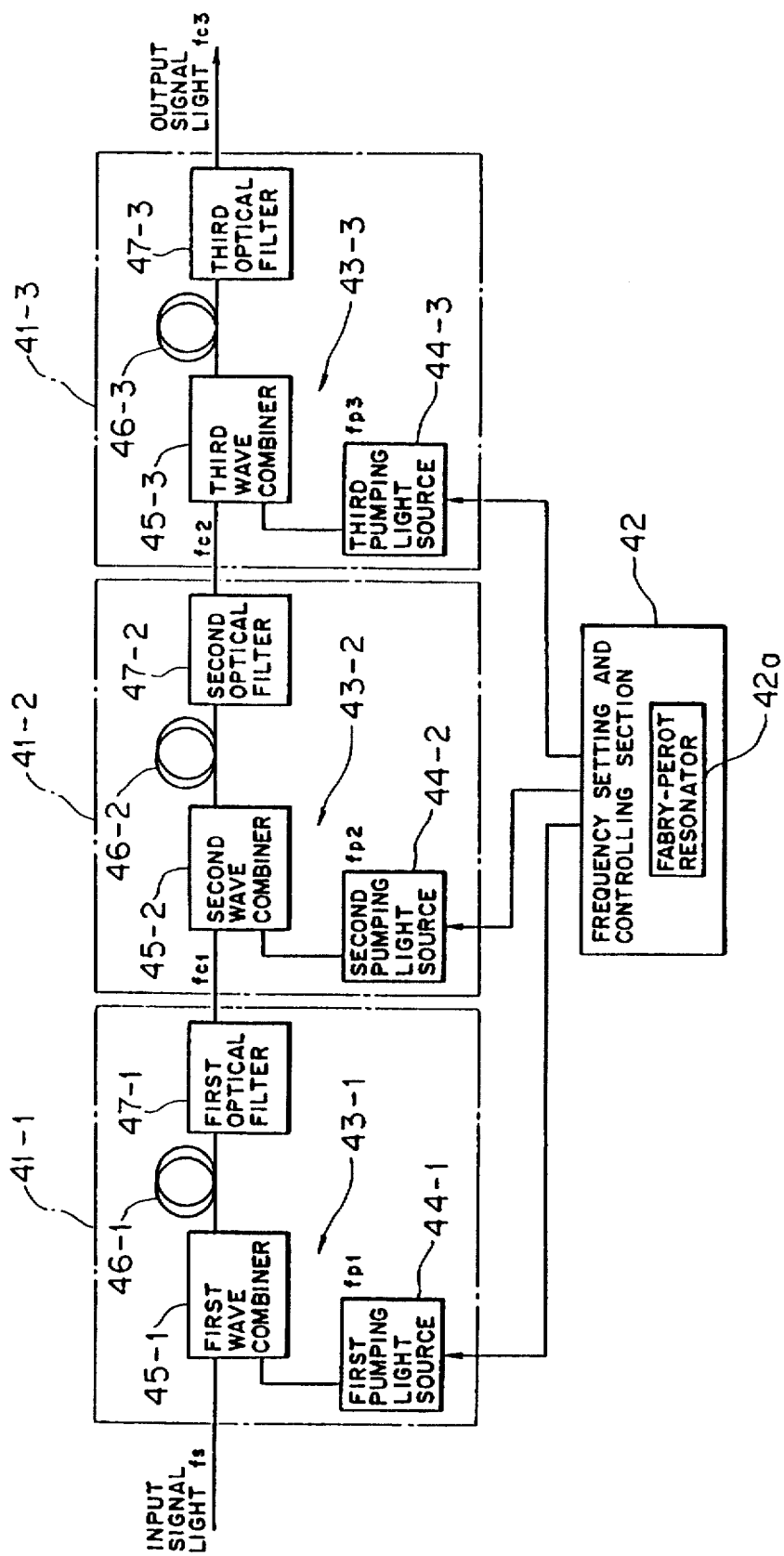
FIG. 14 is a block diagram showing a modification to the optical phase conjugator of FIG. 12.

FIG. 14 shows in block diagram a first modification to the optical phase conjugator of the first embodiment of the present invention. Referring to FIG. 14, the modified optical phase conjugator has a basically same constructed as but is different from the optical phase conjugator of the first embodiment described above in that the frequency setting and controlling section 42 includes a Fabry-Perot resonator 42a.

In particular, also in the present modified phase conjugator, the three optical phase conjugation section-optical filter pairs including the first optical phase conjugation section-optical filter pair 41-1, the second optical phase conjugation section-optical filter pair 41-2 and the third optical phase conjugation section-optical filter pair 41-3 having similar functions to those of the first embodiment described above are connected in tandem.

Further, the frequency setting and controlling section 42 in the modified optical phase conjugator controls the first pumping light source 44-1 and the second pumping light source 44-2 so that a multiple of an oscillation period of the Fabry-Perot resonator 42a may be equal to a frequency difference (fp1–fp2) between the frequency fp1 of first pumping light and the frequency fp2 of second pumping light whereas it performs stabilization control for the third pumping light source 44-3 so that the frequency fc3 of output signal light may be equal to the frequency fs of input signal light.

In particular, by transforming the equation (8) as a condition for establishing the coincidence between the frequency fs of the input signal light and the frequency fc3 of the output signal light, the following equation (9) is obtained:

$$fs = (fp1-fp2) + fp3 \tag{9}$$

Therefore, if the frequency difference (fp1–fp2) between the frequency fp1 of the first pumping light and the frequency fp2 of the second pumping light is controlled to a fixed value and the third pumping light is controlled for stabilization, then the frequency fc3 of the output signal light can be made coincide with the frequency fs of the input signal light.

It is to be noted that, when the frequency setting and controlling section 42 performs setting or control of the frequencies of pumping lights by ambient temperature control of the first to third pumping light sources 44-1 to 44-3, it controls the first pumping light source 44-1 and the second pumping light source 44-2 simultaneously.

Operation of the modified phase conjugator having the construction described above will be described with reference to FIGS. 15(a) to 15(f).

Figure 15A:
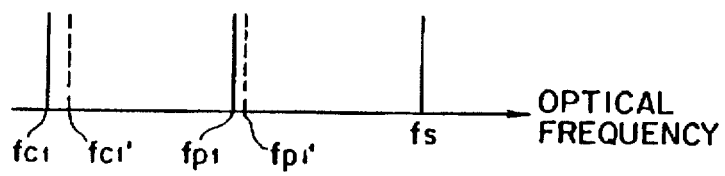
FIGS. 15(a)–15(f) are diagrams of signal spectrums illustrating operation of the modified optical phase conjugator of FIG. 14.
Figure 15B:
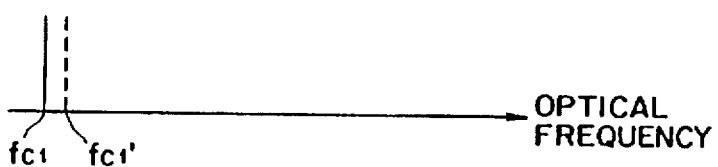

In particular, if the frequency fp1 of the first pumping light varies to fp1' as seen in FIG. 15(a), then also the frequency of phase conjugate light of signal light outputted from the first optical fiber 46-1 of the first optical phase conjugation section-optical filter pair 41-1 varies from fc1 to fc1' (=2fp1'–fs). The first optical filter 47-1 extracts the phase conjugate light of the frequency fc1' (refer to the signal spectrum of FIG. 15(b)) from the signal light from the first optical fiber 46-1 (refer to the signal spectrum of FIG. 15(a)) and outputs the phase conjugate light.

Figure 15C:
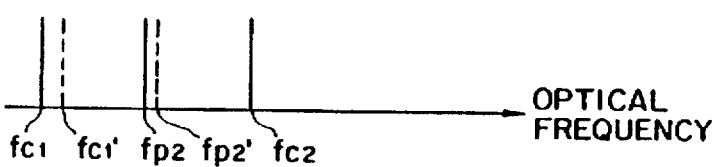

The second optical fiber 46-2 of the second optical phase conjugation section-optical filter pair 41-2 causes four wave mixing by an electro-optical effect thereof with the varying signal light fc1' from the first optical phase conjugation section-optical filter pair 41-1 and the pumping light fp2' from the second pumping light source 44-2 so that such signal light as seen in FIG. 15(c) is produced.

Figure 15D:

The second optical filter 47-2 extracts phase conjugate light of the frequency fc2 (=2fp2'–fc1') (refer to the signal spectrum of FIG. 15(d)) from the signal light from the second optical fiber 46-2 (refer to the signal spectrum of FIG. 15(a)).

In particular, since the difference between the frequencies of the pumping lights from the first and second pumping light sources 44-1 and 44-2 is set and controlled to a fixed value by the Fabry-Perot resonator 42a, the frequency of the signal light extracted from the second optical filter 47-2 is fc2 as given by the following equation (10) in a similar manner as in the first embodiment described above:

$$\begin{aligned} 2fp2' - fc1' &= 2fp2' - (2fp1' - fs) \\ &= 2(fp2' - fp1') + fs \\ &= 2(fp2 - fp1) + fs \\ &= 2fp2 - (2fp1 - fs) \\ &= 2fp2 - fc1 \\ &= fc2 \end{aligned} \tag{10}$$

Figure 15E:
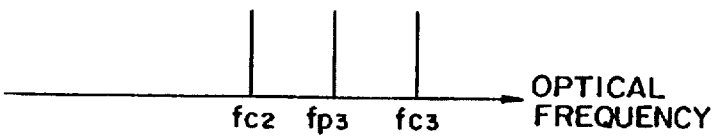

Further, the third optical fiber 46-3 of the third optical phase conjugation section-optical filter pair 41-3 causes four wave mixing by an electro-optical effect thereof with the signal light fc2 from the second optical phase conjugation section-optical filter pair 41-2 and stabilized pumping light fp3 from the third pumping light source 44-3 so that such signal light as illustrated in FIG. 15(e) is produced.

Figure 15F:
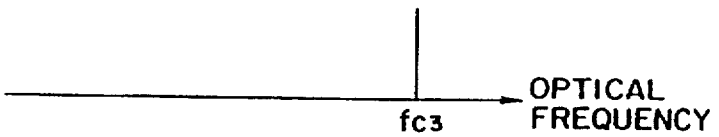

Then, the third optical filter 47-3 extracts phase conjugate light of the frequency fc3 (=2fp3–fc2) (refer to the signal spectrum of FIG. 15(f)) from the signal light inputted from the third optical fiber 46-3 (refer to the signal spectrum of FIG. 15(e)) and outputs output signal light (refer to the equation (6) above) fc3 which is phase conjugate light with respect to the input signal light.

Consequently, the frequency (wavelength) of the output signal light outputted as phase conjugate light from the third optical phase conjugation section-optical filter pair 41-3 coincides with the frequency (wavelength) of the input signal light inputted to the first optical phase conjugation section-optical filter pair 41-1.

In this manner, with the optical phase conjugator of the first modification to the first embodiment of the present invention, since the frequency setting and controlling section 42 which includes the Fabry-Perot resonator 42a sets the oscillation period of the Fabry-Perot resonator 42a so that a multiple of the oscillation period may be equal to the frequency difference (fp1–fp2) between the frequency fp1 of the first pumping light and the frequency fp2 of the second pumping light and controls the third pumping light source 44-3 for stabilization, the frequency or wavelength of output signal light outputted as phase conjugate light from the third optical phase conjugation section-optical filter pair 41-3 can be made coincide with the frequency or wavelength of input signal light inputted to the first optical phase conjugation section-optical filter pair 41-1. Consequently, similar advantages to those obtained by the first embodiment described above can be obtained.

b2. Second Modification to the First Embodiment

A phase conjugator according to a second modification to the first embodiment of the present invention is a modification and has a similar construction to that of the first modification described above with reference to FIG. 14 except that the frequency setting and controlling section 42 sets the oscillation period of the Fabry-Perot resonator 42a thereof so that a multiple of the oscillation period may be equal to the frequency difference (fp3–fp2) between the frequency fp2 of second pumping light and the frequency fp3 of third pumping light and controls the third pumping light source 44-3 for stabilization.

In particular, if the equation (8) as a condition for establishing coincidence between the frequency fs of input signal light and the frequency fc3 of output signal light given above is deformed, then the following equation (11) is obtained:

$$fs = (fp3-fp2) + fp1 \tag{11}$$

Accordingly, if the frequency setting and controlling section 42 controls the frequency fp2 of the second pumping light and the frequency fp3 of the third pumping light so that the frequency difference (fp3–fp2) between them may be fixed and controls the first pumping light for stabilization, then the frequency fc3 of the output signal light can be made coincide with the frequency fs of the input signal light.

It is to be noted that, when the frequency setting and controlling section 42 performs setting or control of the frequencies of pumping lights by the ambient temperature control of the first to third pumping light sources 44-1 to 44-3, it controls the second pumping light source 44-2 and the third pumping light source 44-3 simultaneously.

The present modified optical phase conjugator having the construction described above outputs the output signal light fc3 which is phase conjugate light with respect of the input signal light as described below.

Figure 16A:
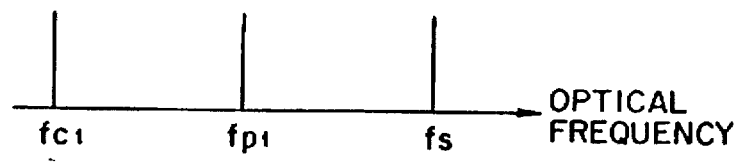
FIG. 16 is a diagram of signal spectrums illustrating operation of another modification to the optical phase conjugator of FIG. 12.

In particular, the first optical fiber 46-1 of the first optical phase conjugation section-optical filter pair 41-1 causes four wave mixing by an electro-optical effect thereof with the input signal light fs and the stabilized pumping light fp1 from the first pumping light source 44-1 so that such signal light as seen from FIG. 16(a) is produced.

Figure 13A:
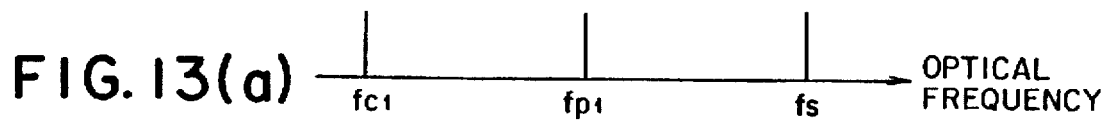
FIGS. 13(a)–13(f) are diagrams of signal spectrums illustrating operation of the optical phase conjugator of FIG. 12.
Figure 13B:
Figure 13C:
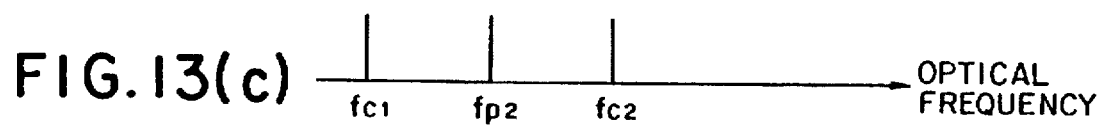
Figure 13D:
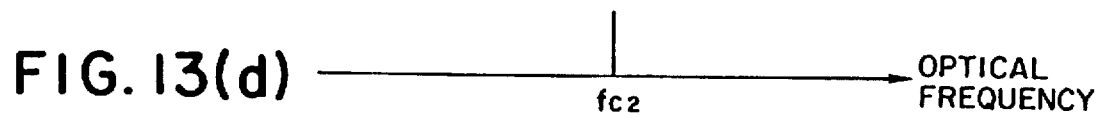
Figure 13E:
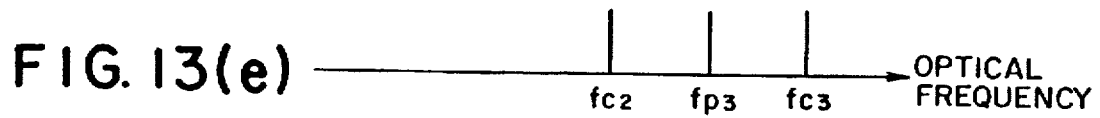
Figure 13F:
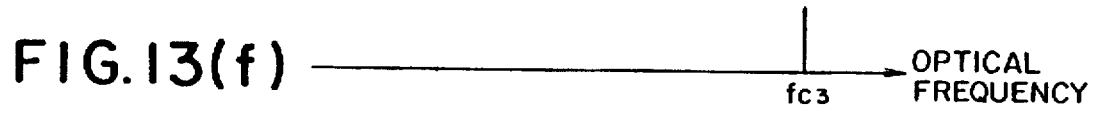
Figure 16B:
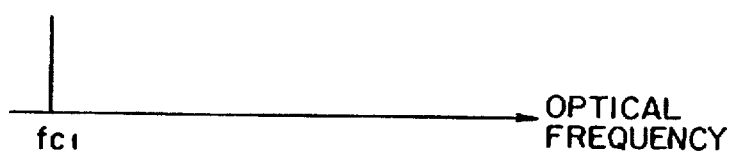

Then, the first optical filter 47-1 extracts phase conjugate light of the frequency fc1 (=2fp1−fs) (refer to the signal spectrum of FIG. 16(b)) from the signal light inputted thereto from the first optical fiber 46-1 (refer to the signal spectrum of FIG. 13(a)).

Figure 16C:
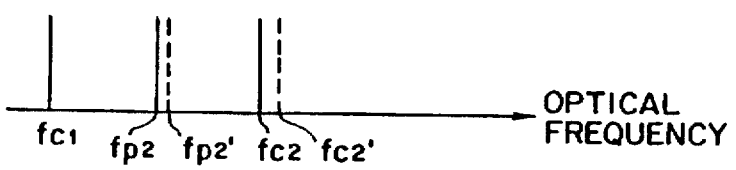
Figure 16D:
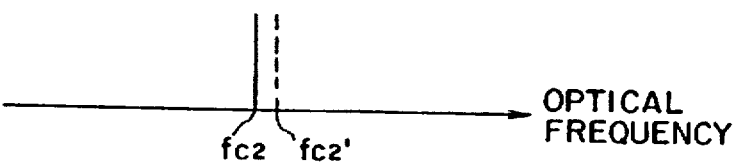

Further, if the frequency fp2 of the second pumping light varies to fp2' as seen in FIG. 16(c), then also the frequency of phase conjugate light of signal light outputted from the second optical fiber 46-2 of the second optical phase conjugation section-optical filter pair 41-2 varies from fc2 to fc2' (=2fp2'−fc1). The second optical filter 47-2 extracts phase conjugate light of the frequency fc2' (refer to the signal spectrum of FIG. 16(d)) from the signal light from the second optical fiber 46-2 (refer to the signal spectrum of FIG. 16(c)) and outputs the thus extracted phase conjugate light.

The third optical fiber 46-3 of the third optical phase conjugation section-optical filter pair 41-3 causes four wave mixing by an electro-optical effect thereof with the varying signal light fc2' from the second optical phase conjugation section-optical filter pair 41-2 and pumping light fp3' from the third pumping light source 44-3 so that such signal light as seen from 16(e)) is produced.

Figure 16E:
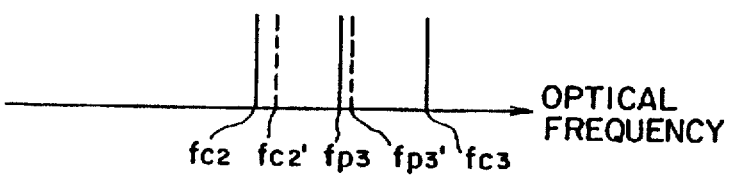
Figure 16F:
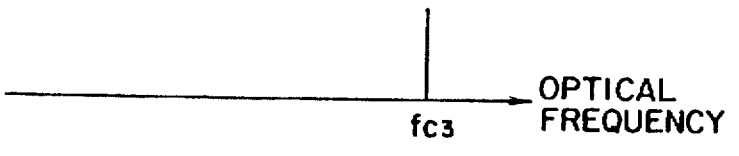

The third optical filter 47-3 extracts phase conjugate light of the frequency fc3 (=2fp3'−fc2') (refer to the signal spectrum of FIG. 16(f)) from the signal light from the third optical fiber 46-3 (refer to the signal spectrum of FIG. 16(e)) and outputs the thus extracted phase conjugate light.

In particular, since the difference between the frequencies of the pumping lights from the second and third pumping light sources 44-2 and 44-3 is set and controlled to a fixed value by the Fabry-Perot resonator 42a, the frequency of the signal light extracted from the third optical filter 47-3 is fc3 as given by the following equation (12) in a similar manner as in the first embodiment described above:

$$
\begin{aligned}
2fp3' - fc2' &= 2fp3' - (2fp2' - fc1) \\
&= 2(fp3' - fp2') + fc1 \\
&= 2(fp3 - fp2) + fc1 \\
&= 2fp3 - (2fp2 - fc1) \\
&= 2fp3 - fc2 \\
&= fc3
\end{aligned}
\quad (12)
$$

b3. Third Modification to the First Embodiment

Figure 17:
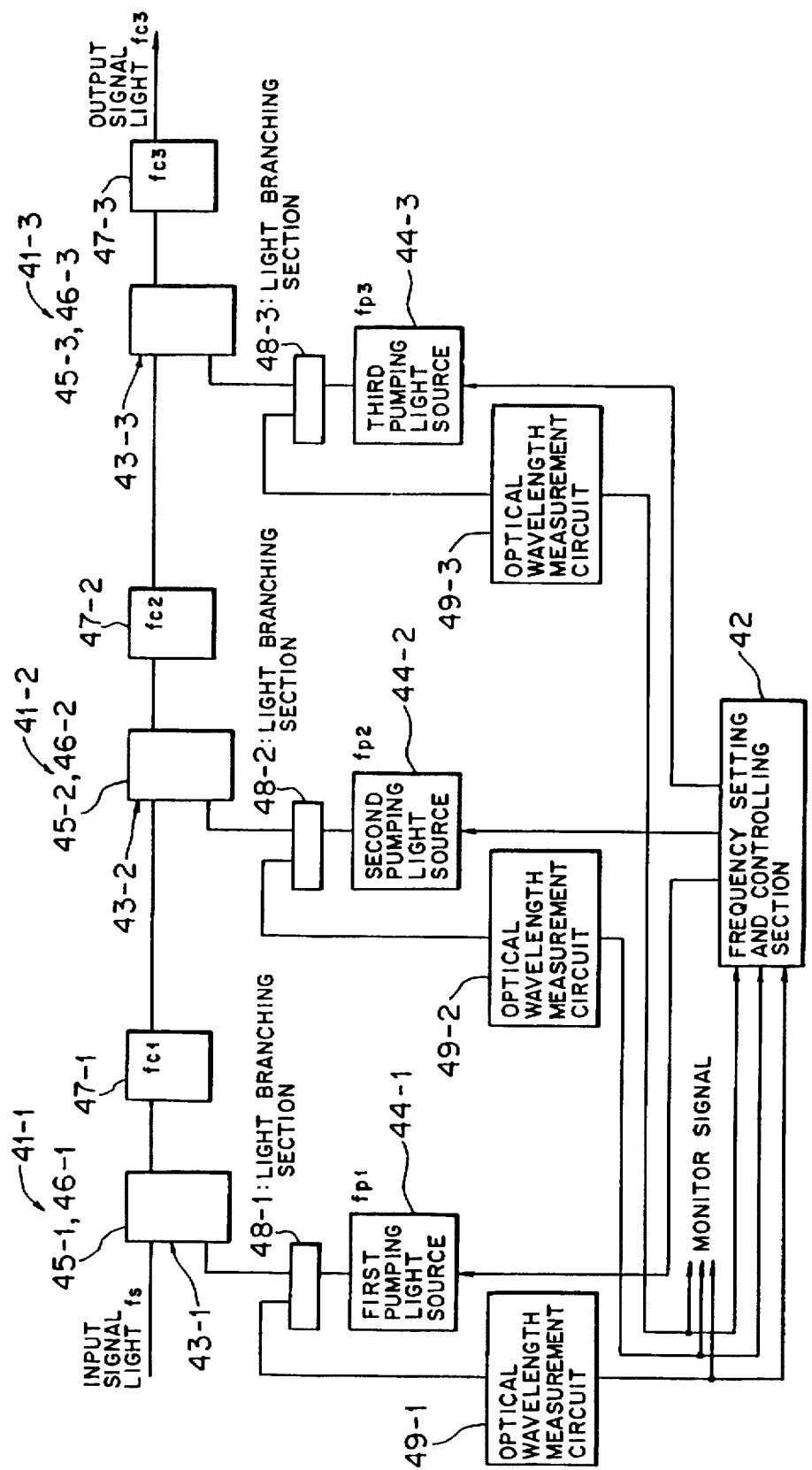
FIGS. 17 to 19 are block diagrams showing different modifications to the optical phase conjugator of FIG. 12.

FIG. 17 shows in block diagram a phase conjugator of a third modification to the first embodiment of the present invention. The modified phase conjugator is similar in construction to but different from the phase conjugator of the embodiment described above with reference to FIG. 12 in that it additionally includes first to third light branching sections 48-1 to 48-3 and first to third optical wavelength measurement circuits 49-1 to 49-3.

The light branching sections 48-1 to 48-3 branch the first to third pumping lights fp1 to fp3 from the first to third pumping light sources 44-1 to 44-3, respectively, and are each formed from, for example, an optical coupler or the like.

The optical wavelength measurement circuits (optical frequency and wavelength measurement sections) 49-1 to 49-3 receive the first to third pumping lights fp1 to fp3 from the light branching sections 48-1 to 48-3 and measure the wavelengths of the pumping lights fp1 to fp3, respectively.

Thus, the frequency setting and controlling section 42 performs feedback control of the first to third pumping light sources 44-1 to 44-3 based on the wavelengths of the first to third pumping lights fp1 to fp3 from the optical wavelength measurement circuits 49-1 to 49-3 so that the pumping lights may be outputted stably.

It is to be noted that, by outputting the output signals of the optical wavelength measurement circuits 49-1 to 49-3 described above as monitor signals from the optical phase conjugator, they can be used as control parameters for other than the feedback control of the first to third pumping light sources 44-1 to 44-3.

Accordingly, since the optical wavelength measurement circuits 49-1 to 49-3 for measuring the wavelengths of pumping lights from the first to third pumping light sources 44-1 to 44-3 are provided, the pumping lights can be outputted stably. Consequently, the modified optical phase conjugator is advantageous in that stabilized output signal can be outputted.

b4. Fourth Modification to the First Embodiment

Figure 18:
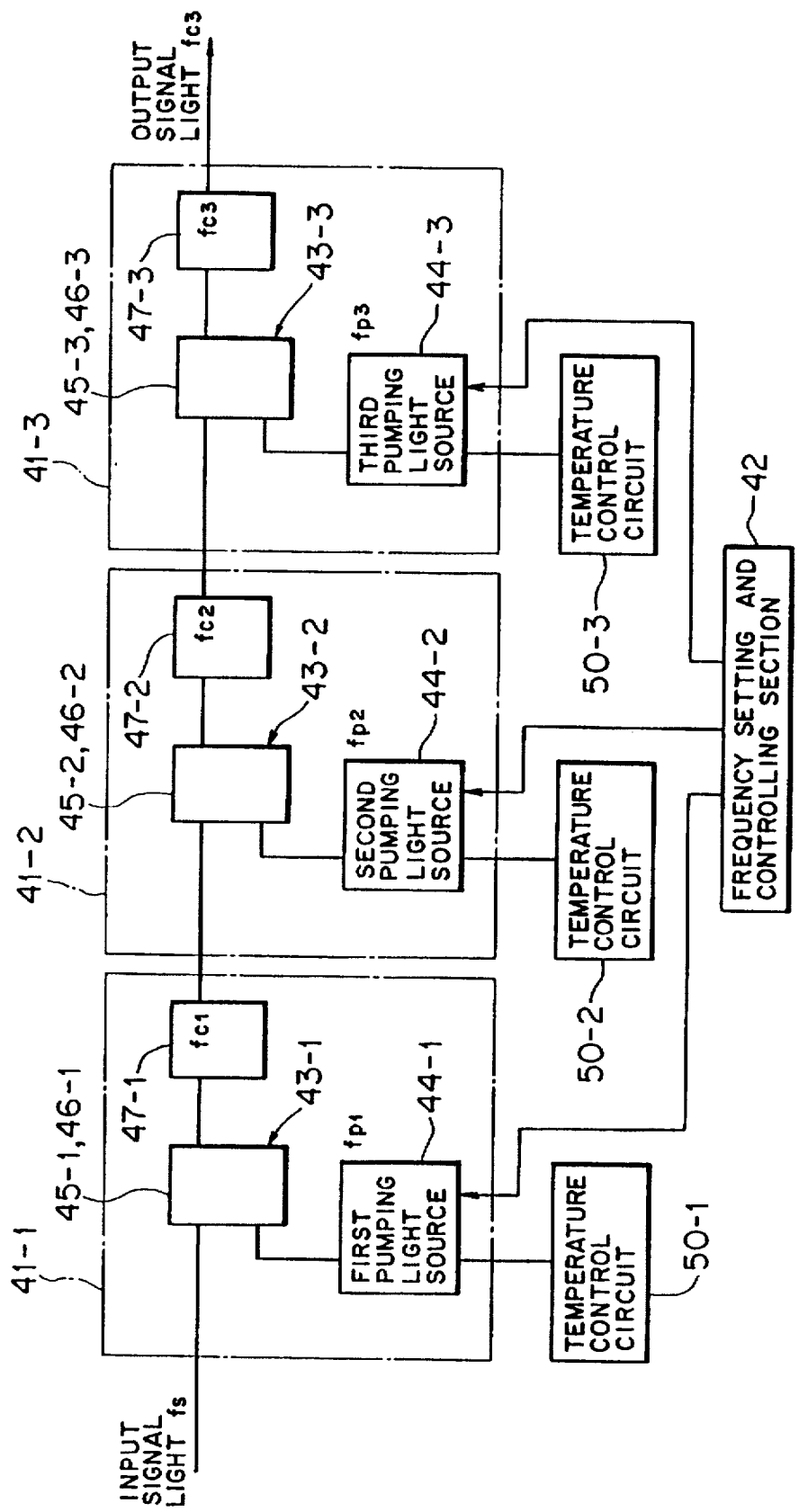

FIG. 18 shows in block diagram a phase conjugator of a fourth modification to the first embodiment of the present invention. The modified phase conjugator is similar in construction to but different from the optical phase conjugator of the embodiment described hereinabove with reference to FIG. 12 in that it additionally includes temperature control circuits 50-1 to 50-3.

The temperature control circuits 50-1 to 50-3 perform temperature control of the first to third pumping light sources 44-1 to 44-3, respectively, or more particularly, perform stabilization control of ambient temperatures of the first to third pumping light sources 44-1 to 44-3, respectively. Each of the temperature control circuits 50-1 to 50-3 may include, for example, a temperature sensor, a heater and so forth.

In the optical phase conjugator of the present modification having the construction described above, while the temperature control circuits 50-1 to 50-3 perform stabilization control of the ambient temperatures of the first to third pumping light sources 44-1 to 44-3, respectively, the frequency setting and controlling section 42 controls the first to third pumping light sources 44-1 to 44-3 in a similar manner as in the optical phase conjugator of the first embodiment described above so that the frequency fc3 (or wavelength) of output signal light outputted as phase conjugate light from the third optical phase conjugation section-optical filter pair 41-3 is made coincide with the frequency fs (or wavelength) of input signal light inputted to the first optical phase conjugation section-optical filter pair 41-1.

Since the temperature control circuits 50-1 to 50-3 for controlling the temperatures of the first to third pumping light sources 44-1 to 44-3, respectively, are provided, the first to third pumping lights can be outputted stably by stabilization control of the ambient temperatures of the first to third pumping light sources 44-1 to 44-3. Consequently, the optical phase conjugator of the present modification is advantageous in that stabilized output signal light can be outputted.

b5. Fifth Modification to the First Embodiment

Figure 19:
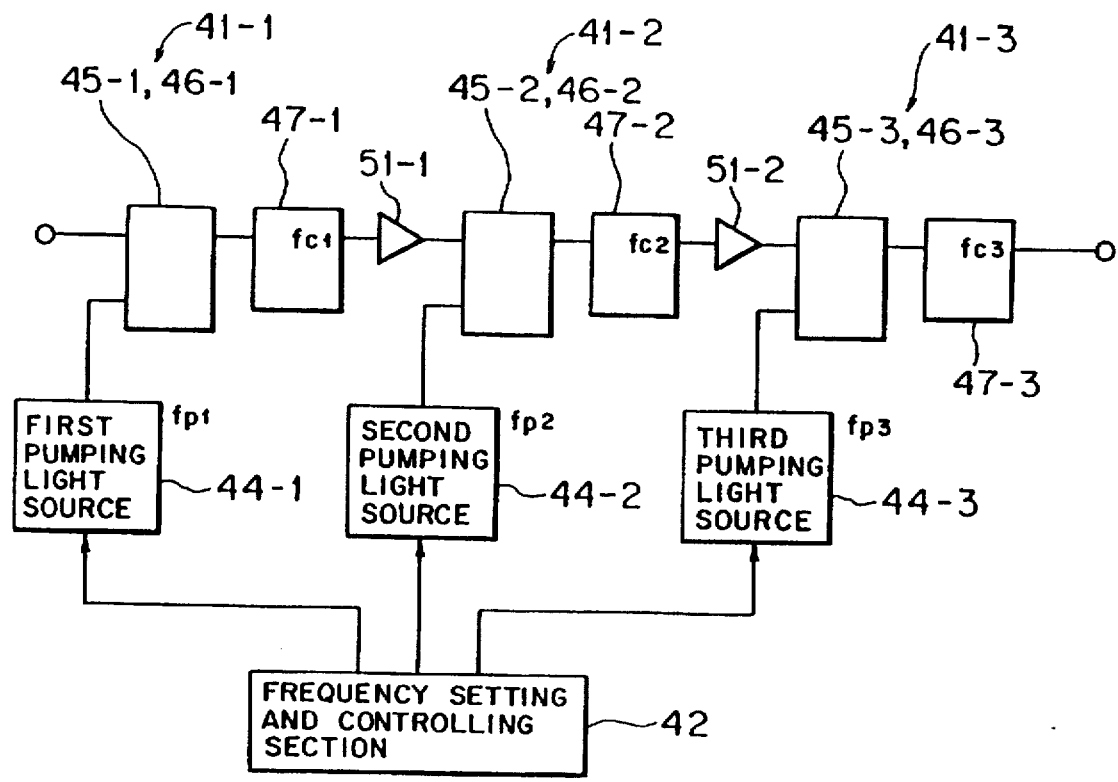

FIG. 19 shows in block diagram an optical phase conjugator of a fifth modification to the first embodiment of the present invention. The phase conjugator shown is similar in construction to but different from the optical phase conjugator of the first embodiment described hereinabove with reference to FIG. 12 in that it additionally includes a pair of optical amplifiers 51-1 and 51-2.

The optical amplifier 51-1 is interposed between the first optical phase conjugation section-optical filter pair 41-1 and the second optical phase conjugation section-optical filter pair 41-2 and corrects the power of signal light outputted from the first optical phase conjugation section-optical filter pair 41-1.

The optical amplifier 51-2 is interposed between the second optical phase conjugation section-optical filter pair 41-2 and the third optical phase conjugation section-optical filter pair 41-3 and corrects the power of signal light outputted from the second optical phase conjugation section-optical filter pair 41-2.

In the optical phase conjugator of the present modification having the construction described above, the optical amplifiers 51-1 and 51-2 correct the powers of signal light outputted from the first optical phase conjugation section-optical filter pair 41-1 and signal light outputted from the second optical phase conjugation section-optical filter pair 41-2 to stabilize output signal light to be outputted from the third optical phase conjugation section-optical filter pair 41-3.

Further, the frequency setting and controlling section 42 controls the first to third pumping light sources 44-1 to 44-3 in a similar manner as in the optical phase conjugator of the first embodiment described above so that the frequency fc3 (or wavelength) of output signal light to be outputted as phase conjugate light from the third optical phase conjugation section-optical filter pair 41-3 is made coincide with the frequency fs (or wavelength) of input signal light inputted to the first optical phase conjugation section-optical filter pair 41-1.

Accordingly, since the optical amplifiers 51-1 and 51-2 for correcting optical powers are provided between the first optical phase conjugation section-optical filter pair 41-1 and the second optical phase conjugation section-optical filter pair 41-2 and between the second optical phase conjugation section-optical filter pair 41-2 and the third optical phase conjugation section-optical filter pair 41-3, respectively, the optical phase conjugator of the present modification is advantageous in that output signal light to be outputted from the third optical phase conjugation section-optical filter pair 41-3 can be stabilized.

b6. Others

While the three optical phase conjugation section-optical filter pairs 41-1 to 41-3 in the first embodiment and the modifications to the first embodiment described above are connected in tandem, the connection is not limited to the particular connection, and an arbitrary plural number of optical phase conjugation section-optical filter pairs may be connected in tandem. In this instance, the frequency setting and controlling section 42 controls the pumping light sources so that the frequency or wavelength of output signal light to be outputted as phase conjugate light from the optical phase conjugation section-optical filter pair at the last stage is made coincide with the frequency or wavelength of input signal light inputted to the optical phase conjugation section-optical filter pair at the first stage. Also in this instance, similar advantages to those of the optical phase conjugator can be obtained.

Meanwhile, the forms of the optical phase conjugators of the third to fifth modifications described above (FIGS. 17, 18 and 19) may be combined in arbitrary combination with the forms of the optical phase conjugators of the first embodiment and the first and second modifications (FIGS. 12 to 16). In this instance, the advantages obtained by the individual forms of the combination can be obtained.

It is to be noted that, where the form of the fourth modification is applied to the form of the first modification, control by the temperature control circuit 50-1 and the temperature control circuit 50-2 is preferably performed simultaneously. Also where the form of the fourth modification is applied to the form of the second modification, control by the temperature control circuit 50-2 and the temperature control circuit 50-3 is preferably performed simultaneously.

c. Second Embodiment

Figure 20:
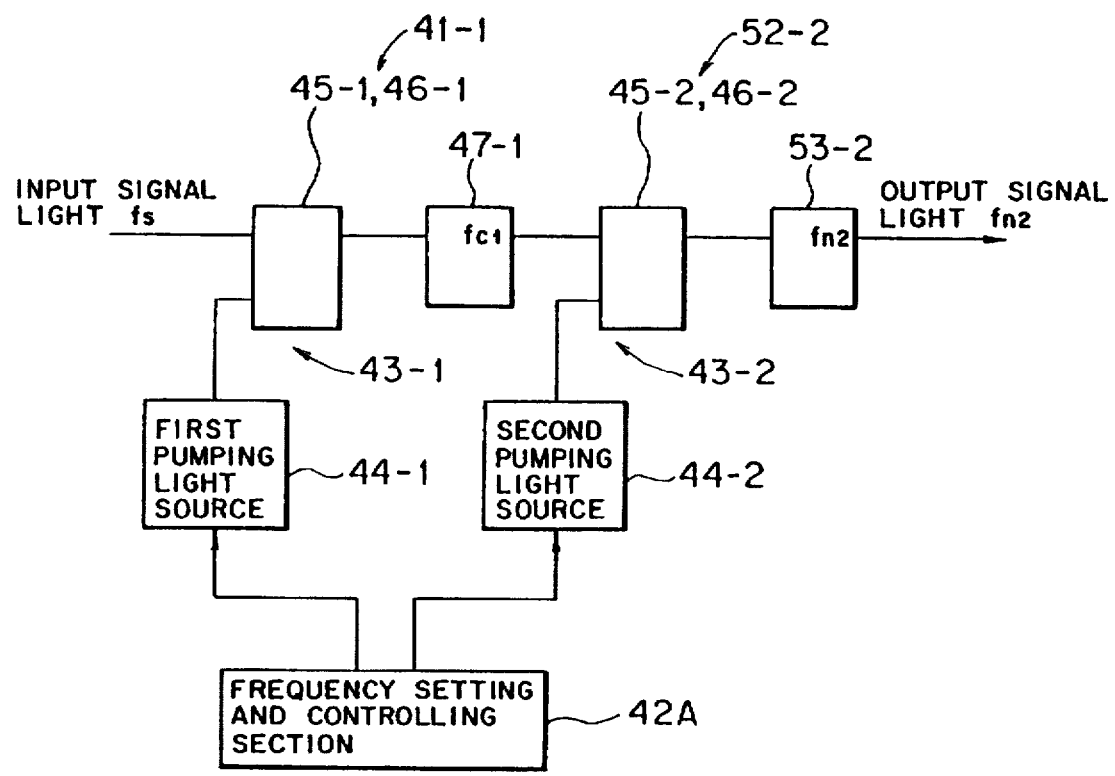
FIG. 20 is a block diagram of another optical phase conjugator showing a second preferred embodiment of the present invention.

FIG. 20 shows in block diagram an optical phase conjugator according to a second preferred embodiment of the present invention. Also the present optical phase conjugator can be applied to such an optical communication system as described hereinabove with reference to FIG. 11 (refer to reference numeral 40).

While the optical phase conjugator of the first embodiment described above includes three optical phase conjugation section-optical filter pairs connected in tandem, the optical phase conjugator of the present embodiment includes a pair of optical phase conjugation section-optical filter pairs of a first optical phase conjugation section-optical filter pair 41-1 and a second optical phase conjugation section-optical filter pair 52-2 connected in tandem.

The first optical phase conjugation section-optical filter pair 41-1 is similar to that in the first embodiment described above and outputs phase conjugate light of the frequency fc1 (=2fp1−fs).

The second optical phase conjugation section-optical filter pair 52-2 includes a second optical phase conjugation section 43-2 having a similar function to that in the first embodiment described hereinabove, and a second optical filter 53-2 having a different function from that in the first embodiment described hereinabove (refer to reference numeral 47-2).

Figure 34:
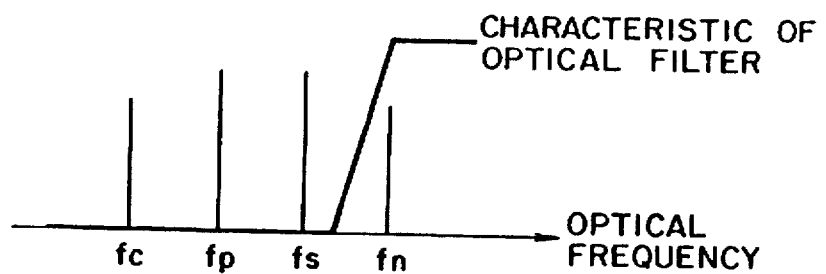
Figure 35:
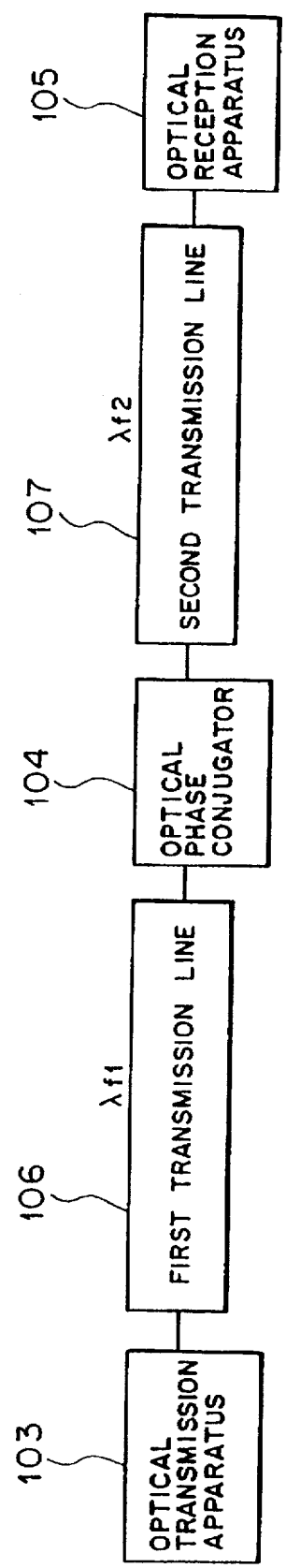
FIGS. 35 to 37 are block diagrams showing different optical transmission systems which employ an optical phase conjugator.
Figure 36:
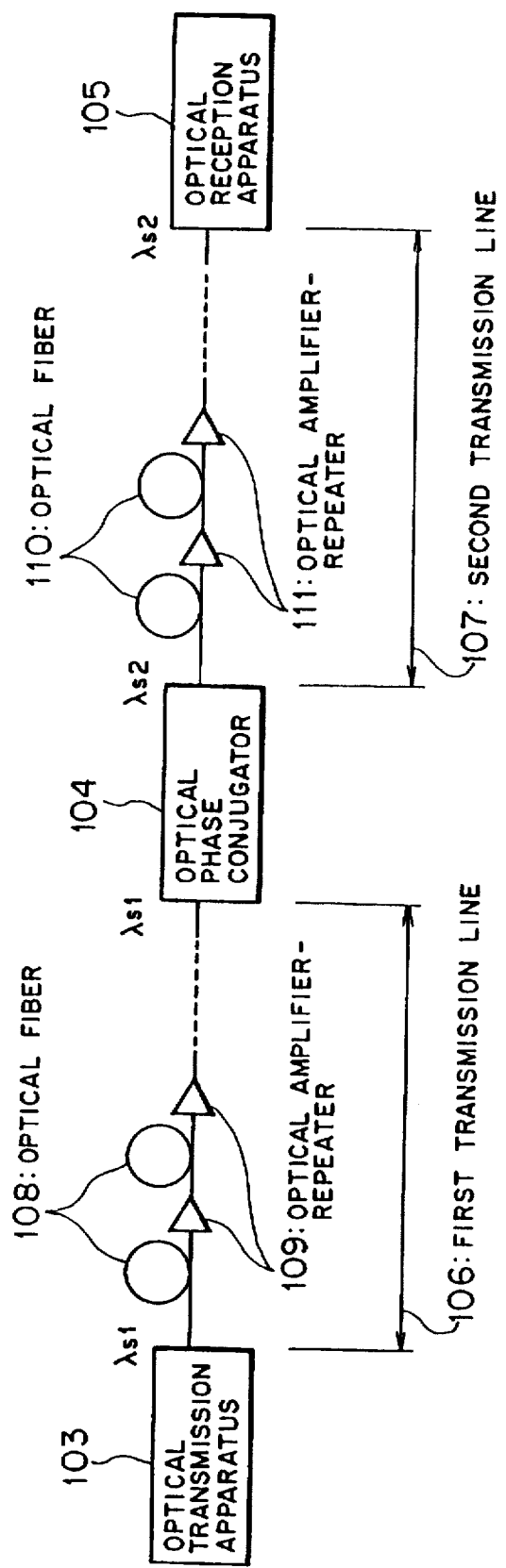
Figure 37:
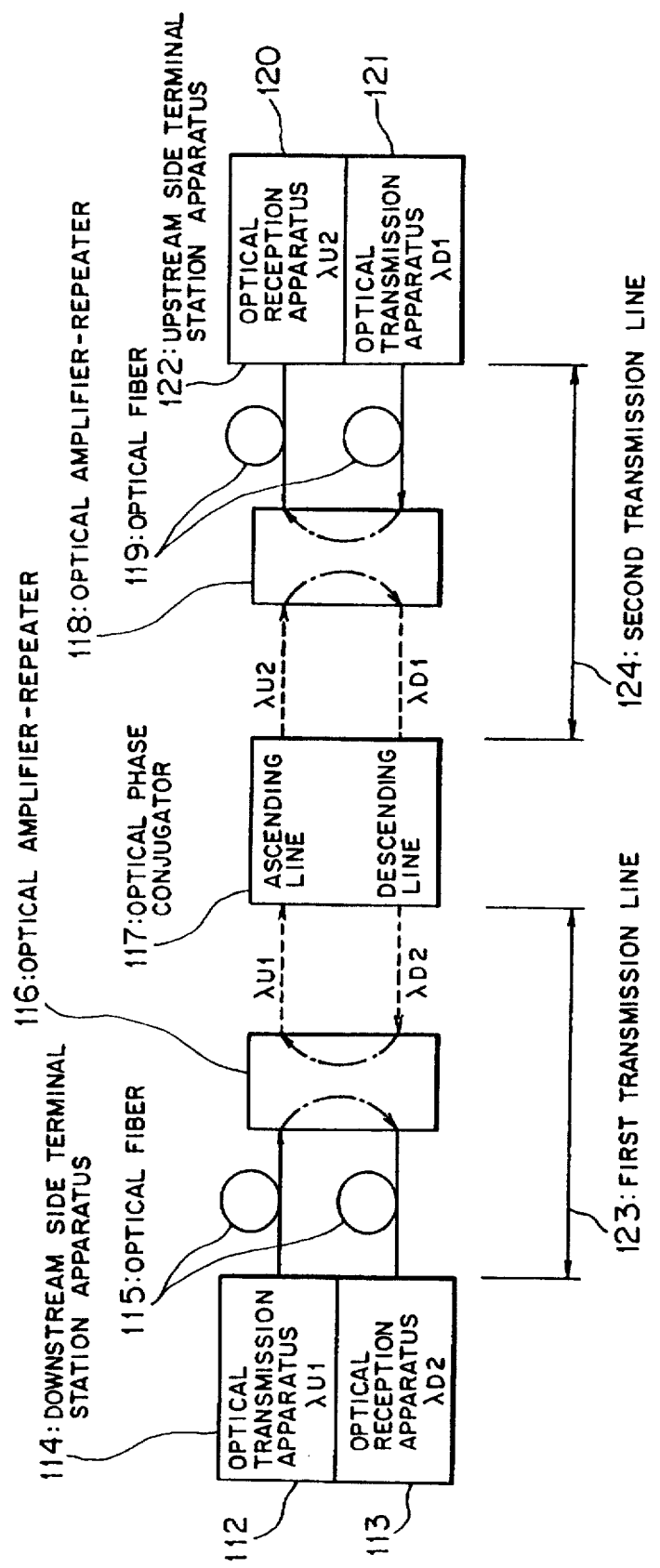

In particular, the second optical filter 53-2 extracts non-phase conjugate light of a frequency fn2 (=2fc1−fp2) with respect to input light from signal light outputted from the second optical phase conjugation section 43-2 and outputs the thus extracted non-phase conjugate light as output signal light. An optical filter having, for example, such a filter characteristic as seen in FIG. 34 can be used for the second optical filter 53-2.

A frequency setting and controlling section 42A sets or controls the frequencies of pumping lights to be outputted from the first pumping light source 44-1 and the second pumping light source 44-2 so that the frequency fn2 (or wavelength) of output signal light to be outputted as non-phase conjugate light from the second optical phase conjugation section-optical filter pair 52-2 may coincide with the frequency fs (or wavelength) of input signal light inputted to the first optical phase conjugation section-optical filter pair 41-1.

Also in the present embodiment, the frequency setting and controlling section 42A performs ambient temperature control or excitation power supply control of the first pumping light source 44-1 and the second pumping light source 44-2 to set or control the frequencies of pumping lights to be outputted from the first and second pumping light sources 44-1 and 44-2.

It is to be noted that, when the frequency setting and controlling section 42A performs setting or control of the frequencies of pumping lights by the ambient temperature control of the first and second pumping light sources 44-1 and 44-2, it may include several elements necessary to control the ambient temperatures of the first and second pumping light sources 44-1 and 44-2 such as, for example, temperature sensors, heaters and so forth.

Operation of the optical phase conjugator of the second embodiment of the present invention having the construction described above will be described below with reference to FIGS. 21(a) to 21(d).

Where the optical phase conjugator of the present embodiment is applied, for example, to the optical communication system as a very long haul transmission system shown in FIG. 11, while signal light is communicated between the optical transmission apparatus 20 and the optical reception apparatus 60 which is connected to the optical transmission apparatus 20 via the transmission lines 13 and 14 each formed from optical fibers or the like extending across an ocean of up to approximately several thousands kilometers, the optical phase conjugator 40 which interconnects the transmission line 13 and the transmission line 14 outputs signal light fn2 coincident with transmission signal light fs from the transmission line 13 to the transmission line 14 as described below.

Figure 21A:
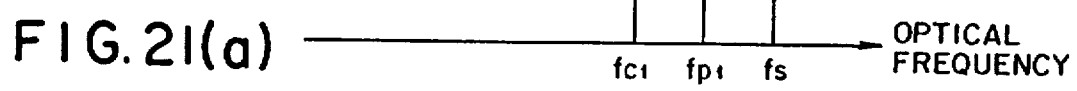
FIG. 21 is a diagram of signal spectrums illustrating operation of the optical phase conjugator of FIG. 20.

In particular, when the signal light fs is inputted to the first optical phase conjugation section-optical filter pair 41-1, the first optical fiber 46-1 causes four wave mixing by an electro-optical effect thereof in a similar manner as in the optical phase conjugator of the first embodiment and outputs phase conjugate light to the first optical filter 47-1 (refer to the signal spectrum of FIG. 21(a)).

Figure 21B:
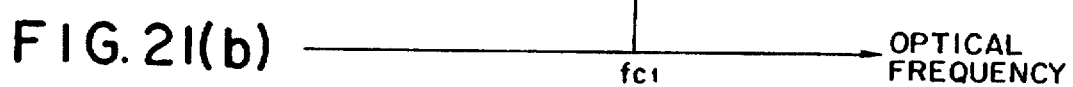

Then, the first optical filter 47-1 extracts phase conjugate light of the frequency fc1 (=2fp1−fs) (refer to the signal spectrum of FIG. 21(b)) from the signal light from the first optical fiber 46-1 (refer to the signal spectrum of FIG. 21(a)).

Further, when the signal light fc1 from the first optical phase conjugation section-optical filter pair 41-1 is inputted to the second optical phase conjugation section-optical filter pair 52-2, the signal light fc1 and pumping light fp2 from the second pumping light source 44-2 are combined by the second wave combiner 45-2 and inputted to the second optical fiber 46-2. In response to the inputted combined signal light, four wave mixing is caused in the second optical fiber 46-2 by an electro-optical effect, and resulted light is outputted to the second optical filter 53-2 (refer to the signal spectrum of FIG. 21(c)).

Figure 21C:
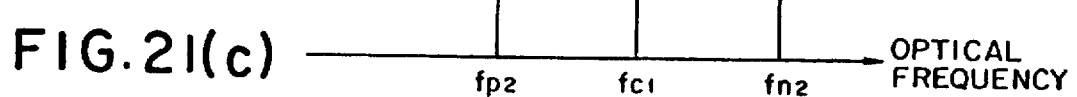
Figure 21D:

The second optical filter 53-2 extracts phase conjugate light of the frequency fn2 (=2fc1−fp2) (refer to the signal spectrum of FIG. 21(d)) from the signal light from the second optical fiber 46-2 (refer to the signal spectrum of FIG. 21(c)) and outputs the extracted phase conjugate light as output signal light.

Accordingly, the frequency fn2 of the output signal light can be represented as given by the following equation (13):

$$\begin{aligned} fn2 &= 2fc1 - fp2 \\ &= 2(2fp1 - fs) - fp2 \\ &= 4fp1 - fp2 - 2fs \end{aligned} \tag{13}$$

Consequently, the output signal light fn2 outputted from the second optical phase conjugation section-optical filter pair 52-2 is non-phase conjugate light with respect to the input signal light fs.

Further, the frequency setting and controlling section 42A sets or controls the frequencies of the pumping lights to be outputted from the first pumping light source 44-1 and the second pumping light source 44-2 so that the frequency fn2 (or wavelength) of the output signal light outputted as non-phase conjugate light from the second optical phase conjugation section-optical filter pair 52-2 may be coincident with the frequency fs (or wavelength) of the input signal light inputted to the first optical phase conjugation section-optical filter pair 41-1.

Consequently, since the input signal light fs and the output signal light fn2 coincide with each other, the frequencies of the pumping lights to be outputted from the first to third pumping light sources 44-1 to 44-3 are set or controlled stably by the frequency setting and controlling section 42A so that the following equations (14) and (15) may be satisfied:

$$fs = fn2 = 4fp1 - fp2 - 2fs \tag{14}$$

$$fs = (4fp1 - fp2)/3 \tag{15}$$

In this manner, with the optical phase conjugator according to the second embodiment of the present invention, since the frequency or wavelength of output signal light to be outputted as phase conjugate light from the second optical phase conjugation section-optical filter pair 52-2 can be made coincide with the frequency or wavelength of input signal light inputted to the first optical phase conjugation section-optical filter pair 41-1 by setting or controlling the frequencies of pumping lights to be outputted from the first and second pumping light sources 44-1 and 44-2 by the frequency setting and controlling section 42A, optical amplifiers and transmission lines which have the same specifications with regard to the wavelength can be connected to the opposite front and rear ends of the optical phase conjugator. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those having the same specifications with each other with regard to the wavelength can be employed. Consequently, the optical phase conjugator is advantageous also in that the system is simplified in specification and the cost for construction of the system can be suppressed.

Further, since the optical phase conjugator of the present embodiment can be constructed with a reduced number of optical phase conjugation section-optical filter pairs connected therein comparing with that in the first embodiment, the number of parts can be reduced and the cost for construction of an apparatus can be further reduced.

While the two optical phase conjugation section-optical filter pairs 41-1 and 52-2 in the present embodiment described in detail above are connected, the connection is not limited to the particular connection, and the optical phase conjugator of the present embodiment may be modified such that it includes an arbitrary plural number of optical phase conjugation section-optical filter pairs connected such that the optical phase conjugation section-optical filter pair at the last stage may output phase conjugate light as output signal light so that the frequency or wavelength of the output signal light from the optical phase conjugation section-optical filter pair at the last stage may coincide with the frequency or wavelength of input light to the optical phase conjugation section-optical filter pair at the first stage.

d. Third Embodiment

Figure 22:
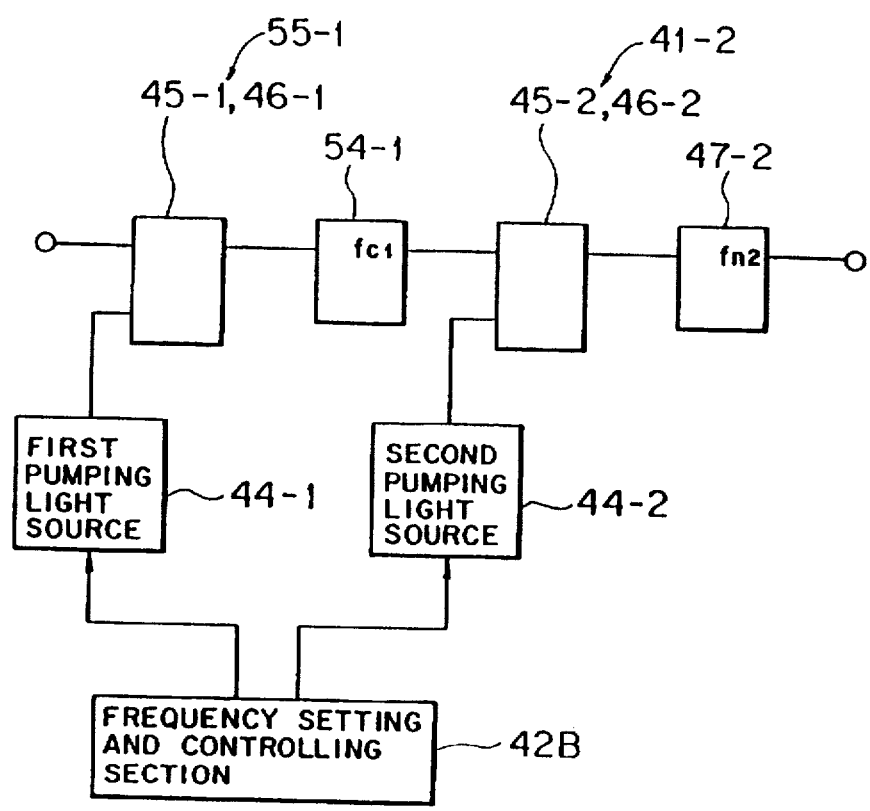
FIG. 22 is a block diagram of a further optical phase conjugator showing a third preferred embodiment of the present invention.

FIG. 22 shows in block diagram an optical phase conjugator according to a third preferred embodiment of the present invention. Also the optical phase conjugator shown in FIG. 22 can be applied to such an optical communication system as described hereinabove with reference to FIG. 11 (refer to reference numeral 40).

While the optical phase conjugator of the first embodiment described above includes three optical phase conjugation section-optical filter pairs connected in tandem, the optical phase conjugator of the present embodiment includes a pair of optical phase conjugation section-optical filter pairs of a first optical phase conjugation section-optical filter pair 55-1 and a second optical phase conjugation section-optical filter pair 41-2 connected in tandem.

The first optical phase conjugation section-optical filter pair 55-1 includes a first optical phase conjugation section 43-1 having a similar function to that in the first embodiment described above, and a first optical filter 54-1 having a different function from that in the first embodiment described hereinabove (refer to reference numeral 47-1).

In particular, the first optical filter 54-1 extracts non-phase conjugate light of a frequency fn1 (=2fs−fp1) with respect to input light from signal light outputted from the first optical phase conjugation section 43-1 and outputs the thus extracted non-phase conjugate light as output signal light. An optical filter having, for example, such a filter characteristic as seen in FIG. 34 can be used for the first optical filter 54-1.

Further, the second optical phase conjugation section-optical filter pair 41-2 is similar to that in the first embodiment described above and outputs phase conjugate light of the frequency fc2 (=2fp2−fc1).

A frequency setting and controlling section 42B sets or controls the frequencies of pumping lights to be outputted from the first pumping light source 44-1 and the second pumping light source 44-2 so that the frequency fc2 (or wavelength) of output signal light to be outputted as phase conjugate light from the second optical phase conjugation section-optical filter pair 41-2 may coincide with the frequency fs (or wavelength) of input signal light inputted to the first optical phase conjugation section-optical filter pair 55-1.

Also in the present embodiment, the frequency setting and controlling section 42B performs ambient temperature control or excitation power supply control of the first pumping light source 44-1 and the second pumping light source 44-2 to set or control the frequencies of pumping lights to be outputted from the first and second pumping light sources 44-1 and 44-2.

It is to be noted that, when the frequency setting and controlling section 42B performs setting or control of the frequencies of pumping lights by the ambient temperature control of the first and second pumping light sources 44-1 and 44-2, it may include several elements necessary to control the ambient temperatures of the first and second pumping light sources 44-1 and 44-2 such as, for example, temperature sensors, heaters and so forth.

Operation of the optical phase conjugator of the third embodiment of the present invention having the construction described above will be described below with reference to FIGS. 23(a) to 23(d).

Where the optical phase conjugator of the present embodiment is applied, for example, to the optical communication system as a very long haul transmission system shown in FIG. 11, while signal light is communicated between the optical transmission apparatus 20 and the optical reception apparatus 60 which is connected to the optical transmission apparatus 20 via the transmission lines 13 and 14 each formed from optical fibers or the like extending across an ocean of up to approximately several thousands km, the optical phase conjugator 40 which interconnects the transmission line 13 and the transmission line 14 outputs signal light fn2 coincident with transmission signal light fs from the transmission line 13 to the transmission line 14 as described below.

Figure 23A:
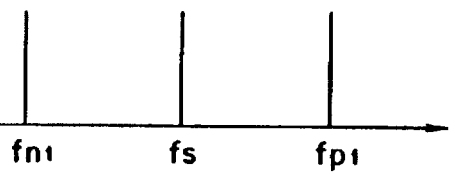
FIG. 23 is a diagram of signal spectrums illustrating operation of the optical phase conjugator of FIG. 22.

In particular, when the signal light fs is inputted to the first optical phase conjugation section-optical filter pair 55-1, the first optical fiber 46-1 causes four wave mixing by an electro-optical effect thereof and outputs resulted light to the first optical filter 54-1 (refer to the signal spectrum of FIG. 23(a)).

Figure 23B:

Then, the first optical filter 54-1 extracts non-phase conjugate light of the frequency fn1 (=2fs−fp1) fp1) (refer to the signal spectrum of FIG. 23(b)) from the signal light from the first optical fiber 46-1 (refer to the signal spectrum of FIG. 23(a)).

Further, when the signal light fn1 from the first optical phase conjugation section-optical filter pair 55-1 is inputted to the second optical phase conjugation section-optical filter pair 41-2, the signal light fn1 and pumping light fp2 from the second pumping light source 44-2 are combined by the second wave combiner 45-2 and inputted to the second optical fiber 46-2. In response to the inputted combined signal light, four wave mixing is caused in the second optical fiber 46-2 by an electro-optical effect, and resulted light is outputted to the second optical filter 47-2 (refer to the signal spectrum of FIG. 23(c)).

Figure 23C:
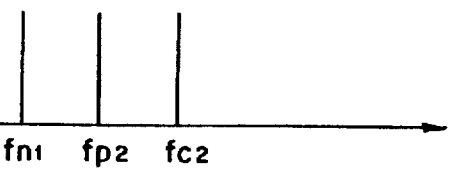
Figure 23D:
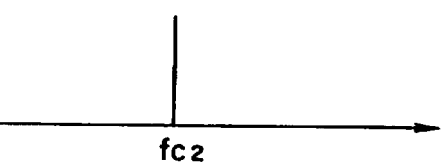

The second optical filter 47-2 extracts phase conjugate light of the frequency fc2 (=2fp2−fc1) (refer to the signal spectrum of FIG. 23(d)) from the signal light from the second optical fiber 46-2 (refer to the signal spectrum of FIG. 23(c)) and outputs the extracted phase conjugate light as output signal light.

Accordingly, the frequency fc2 of the output signal light can be represented as given by the following equation (16):

$$\begin{aligned} fc2 &= 2fp2 - fn1 \\ &= 2fp2 - (2fs - fp1) \\ &= 2fp2 + fp1 - 2fs \end{aligned} \quad (16)$$

Consequently, the output signal light fc2 outputted from the second optical phase conjugation section-optical filter pair 41-2 is non-phase conjugate light with respect to the input signal light fs.

Further, the frequency setting and controlling section 42B sets or controls the frequencies of the pumping lights to be outputted from the first pumping light source 44-1 and the second pumping light source 44-2 so that the frequency fn2 (or wavelength) of the output signal light to be outputted as non-phase conjugate light from the second optical phase conjugation section-optical filter pair 41-2 may be coincident with the frequency fs (or wavelength) of the input signal light inputted to the first optical phase conjugation section-optical filter pair 55-1.

Consequently, since the input signal light fs and the output signal light fn2 coincide with each other, the frequencies of the pumping lights to be outputted from the first and second pumping light sources 44-1 and 44-2 are set or controlled by the frequency setting and controlling section 42B so that the following equations (14) and (15) may be satisfied:

$$fs = fn2 = 4fp1 - fp2 - 2fs \quad (14)$$

$$fs = (4fp1 - fp2)/3 \quad (15)$$

In this manner, with the optical phase conjugator according to the third embodiment of the present invention, since the frequency or wavelength of output signal light to be outputted as non-phase conjugate light from the second optical phase conjugation section-optical filter pair 41-2 can be made coincide with the frequency or wavelength of input signal light inputted to the first optical phase conjugation section-optical filter pair 55-1 by setting or controlling the frequencies of pumping lights to be outputted from the first and second pumping light sources 44-1 and 44-2 by the frequency setting and controlling section 42B, optical amplifiers and transmission lines which have the same specifications with regard to the wavelength can be connected to the opposite front and rear ends of the optical phase conjugator similarly as in the first embodiment described hereinabove. Consequently, the optical phase conjugator is advantageous in that very long haul high speed optical transmission over approximately 10,000 kilometers can be realized while assuring a transmission rate of 20 to 40 Gb/s, for example, using existing transmission lines, optical amplifiers, optical transmission apparatus and optical reception apparatus each of one type.

Further, for the optical transmitters and the optical receivers, those which have the same specifications with each other with regard to the wavelength can be employed. Consequently, the optical phase conjugator is advantageous also in that the system is simplified in specification and the cost for construction of the system can be suppressed.

Further, since the optical phase conjugator of the present embodiment can be constructed with a reduced number of optical phase conjugation section-optical filter pairs connected therein comparing with that in the first embodiment, the number of parts can be reduced and the cost for construction of an apparatus can be further reduced.

While the two optical phase conjugation section-optical filter pairs 55-1 and 41-2 are connected in the present embodiment described in detail above, the connection is not limited to the particular connection, and the optical phase conjugator of the present embodiment may be modified such that it includes an arbitrary plural number of optical phase conjugation section-optical filter pairs connected such that the optical phase conjugation section-optical filter pair at the last stage may output phase conjugate light as output signal light so that the frequency or wavelength of the output signal light from the optical phase conjugation section-optical filter pair at the last stage may coincide with the frequency or wavelength of input light to the optical phase conjugation section-optical filter pair at the first stage.

e. Fourth Embodiment

Figure 24:
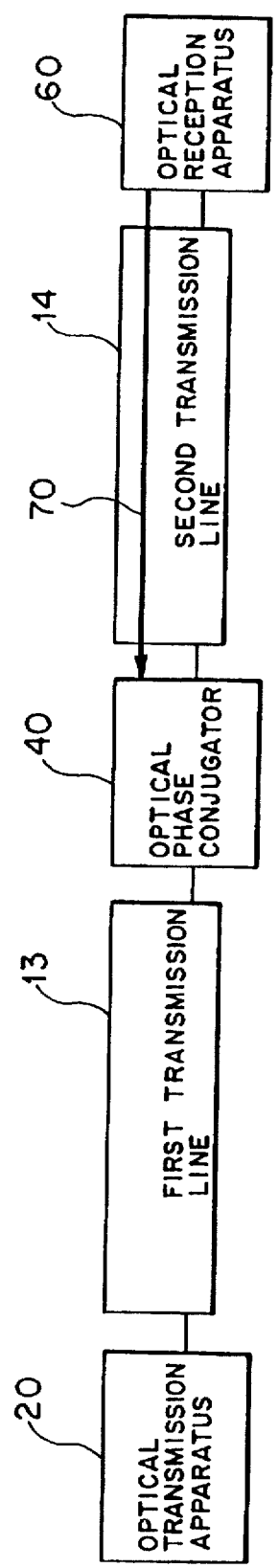
FIGS. 24 and 25 are block diagrams of an optical transmission system in which an optical reception apparatus according to the present invention is incorporated.
Figure 25:
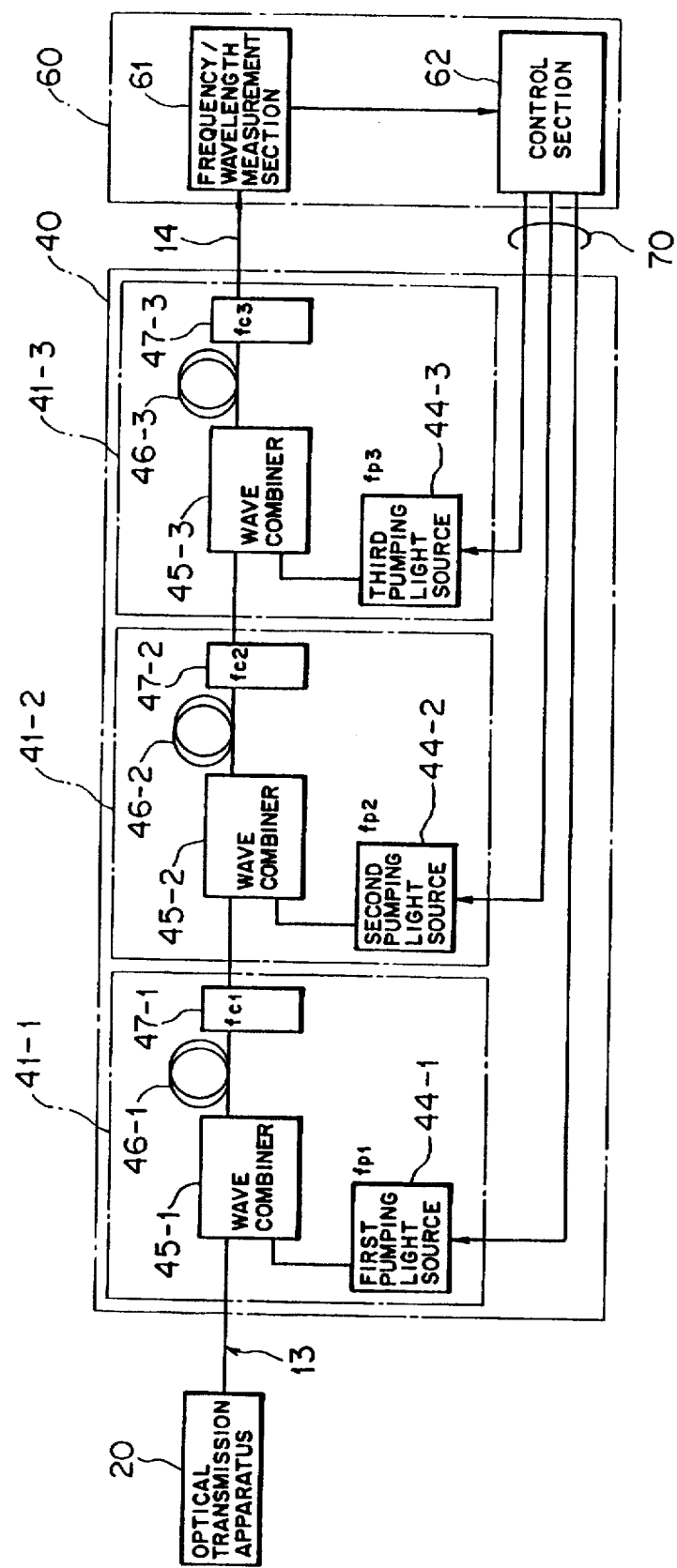

FIGS. 24 and 25 show in block diagrams an optical reception apparatus according to a fourth preferred embodiment of the present invention. Referring to FIGS. 24 and 25, the optical reception apparatus is generally denoted at 60 and is applied to such a very long haul transmission system wherein the optical reception apparatus 60 is connected to an optical transmission apparatus 20 via a pair of transmission lines 13 and 14 each formed from optical fibers or the like extending, for example, across an ocean of up to several thousands kilometers such that it communicates signal light with the optical transmission apparatus 20.

The transmission line 13 and the transmission line 14 are connected to each other via an optical phase conjugator 40. The optical phase conjugator 40 is formed from three first to third optical phase conjugation section-optical filter pairs 41-1 to 41-3, which are similar, for example, to those of the first embodiment shown in FIG. 12, connected in tandem as seen in FIG. 25.

The optical reception apparatus 60 includes a frequency/wavelength measurement section 61 for measuring the frequency or wavelength of output signal light of the optical phase conjugator 40, and a control section 62 for outputting a monitor control signal (control signal) 70 to the optical phase conjugator 40 so that the frequency or wavelength of output signal light of the optical phase conjugator 40 measured by the frequency/wavelength measurement section 61 may have a predetermined value.

It is to be noted that, similarly as in the optical phase conjugator of the first embodiment, the ambient temperatures or the excitation powers of the first to third pumping light sources 44-1 to 44-3 are controlled by the monitor control signal 70.

The optical reception apparatus according to the fourth embodiment of the present invention having the construction described above communicates signal light with the optical transmission apparatus 20 to which it is connected via the transmission lines 13 and 14 formed from optical fibers or the like extending across an ocean of up to several thousands kilometers.

In the optical reception apparatus 60, the frequency/wavelength measurement section 61 measures the frequency or wavelength of output signal light of the optical phase conjugator 40, and the control section 62 outputs a monitor control signal (control signal) 70 to the optical phase conjugator 40 to cause the frequency or wavelength of the output signal light measured by the frequency/wavelength measurement section 61 to have a predetermined value (for example, a value equal to the frequency or wavelength of input signal light to the optical phase conjugator 40).

In response to the monitor control signal 70, the optical phase conjugator 40 receives transmission signal light fs from the transmission line 13 as an input thereto and outputs output signal light fc3 of a frequency or wavelength of the predetermined value (for example, a value equal to the frequency or wavelength of the input signal light) to the transmission line 14.

In this manner, in the fourth embodiment of the present invention, since output signal light fc3 of a frequency or wavelength of a predetermined value can be outputted from the optical phase conjugator 40 to the transmission line 14 in response to the monitor control signal 70 from the control section 62 of the optical reception apparatus 60, the output signal light from the optical phase conjugator 40 can be made coincide with the input signal light to the optical phase conjugator 40. Consequently, optical amplifiers and transmission lines which have the same specifications with regard to the wavelength can be connected to the opposite front and rear ends of the optical phase conjugator similarly as in the first embodiment described hereinabove. Accordingly, the optical reception apparatus is advantageous in that very long haul high speed optical transmission over approximately 10,000 kilometer can be realized while assuring a transmission rate of 20 to 40 Gb/s, for example, using existing transmission lines, optical amplifiers, optical transmission apparatus and optical reception apparatus each of one type.

Further, since control of the frequencies or wavelengths of signal lights on the transmission lines 13 and 14 can be performed on the optical reception apparatus 60 side, the optical reception apparatus is advantageous in that the optical phase conjugator for interconnecting the transmission line 13 and the transmission line 14 can be formed in a simple construction and besides maintenance of the control system of the optical phase conjugator is facilitated.

f. Fifth Embodiment

Figure 26:
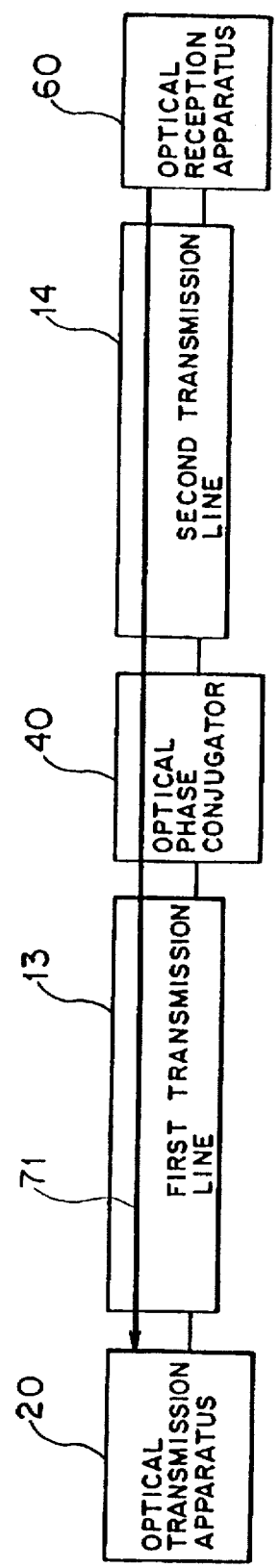
FIGS. 26 and 27 are block diagrams of an optical reception system in which another optical transmission apparatus according to the present invention is incorporated.
Figure 27:
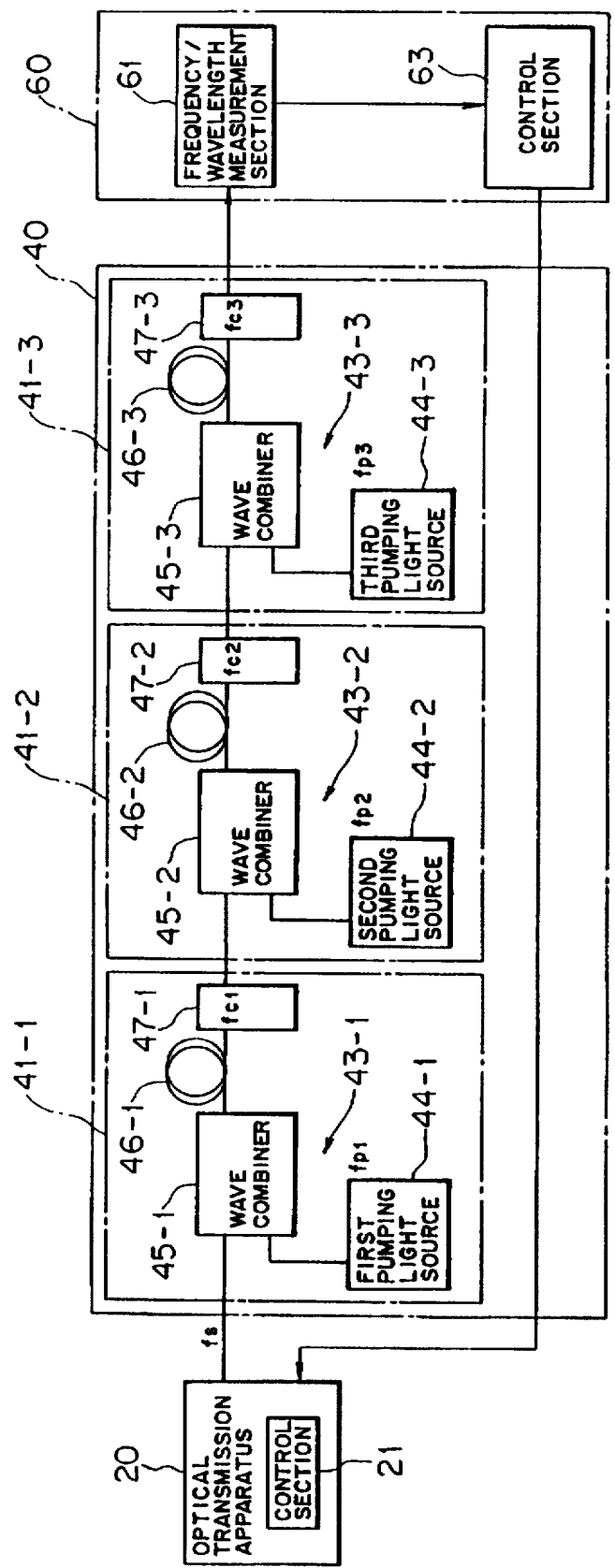

FIGS. 26 and 27 show in block diagrams an optical transmission apparatus and an optical reception apparatus according to a fifth preferred embodiment of the present invention. Referring to FIGS. 26 and 27, the optical transmission apparatus and the optical reception apparatus are generally denoted at 20 and 60, respectively, and are applied to such a very long haul transmission system wherein the optical transmission apparatus 20 and the optical reception apparatus 60 are connected to each other via a pair of transmission lines 13 and 14 each formed from optical fibers or the like extending, for example, across an ocean of up to several thousands kilometers such that they communicate signal light with each other as shown in FIGS. 26 and 27 similarly as in the fourth embodiment described above.

The transmission line 13 and the transmission line 14 are connected to each other via an optical phase conjugator 40. The optical phase conjugator 40 is formed from three first to third optical phase conjugation section-optical filter pairs 41-1 to 41-3, which are similar, for example, to those of the first embodiment described hereinabove with reference to FIG. 12, connected in tandem as seen in FIG. 27.

The optical reception apparatus 60 includes a frequency/wavelength measurement section 61 for measuring the frequency or wavelength of output signal light of the optical phase conjugator 40, and a control section 63 for outputting, based on the frequency or wavelength of the output signal light of the optical phase conjugator 40 measured by the frequency/wavelength measurement section 61, a monitor control signal (control signal) 71 to the optical transmission apparatus 20 disposed on the input side of the optical phase conjugator 40 so that the frequency or the wavelength of input signal light to the optical phase conjugator 40 may have a predetermined value.

Meanwhile, the optical transmission apparatus 20 includes a control section 21 for controlling, based on the frequency or wavelength of output signal light measured by the optical reception apparatus 60 disposed on the output side of the optical phase conjugator 40, the input signal light to the optical phase conjugator 40 so that the frequency or wavelength of the input signal light may have a predetermined value (for example, a value equal to the frequency fc3 or the wavelength of the output signal light of the optical phase conjugator 40).

In particular, the control section 21 of the optical transmission apparatus 20 receives the monitor control signal 71 from the control section 63 of the optical reception apparatus 60 as an input thereto and controls the input signal light to the optical phase conjugator 40 based on the frequency or wavelength information of the output signal light included in the monitor control signal 71 so that the frequency or wavelength of the input signal light may have a predetermined value.

The optical reception apparatus according to the fifth embodiment of the present invention having the construction described above communicates signal light with the optical transmission apparatus 20 to which it is connected via the transmission lines 13 and 14 formed from optical fibers or the like extending across an ocean of up to several thousands kilometers.

In the optical reception apparatus 60, the frequency/wavelength measurement section 61 measures the frequency or wavelength of output signal light of the optical phase conjugator 40, and the control section 63 outputs a monitor control signal (control signal) 71 to the optical phase conjugator 40 to cause the frequency or wavelength of the input signal light to the optical phase conjugator 40 to have a predetermined value based on the frequency or wavelength of the output signal light measured by the frequency/wavelength measurement section 61.

Further, in the optical transmission apparatus 20, the control section 21 receives the monitor control signal 71 from the control section 63 as an input thereto and controls the input signal light to the optical phase conjugator 40 based on the frequency or wavelength information of the output signal light included in the monitor control signal 71 so that the frequency or wavelength of the input signal light may have a predetermined value.

Consequently, the input signal light to the optical phase conjugator 40 can be formed with a frequency or wavelength of a predetermined value (for example, a value equal to the frequency fc3 or the wavelength of the output signal light of the optical phase conjugator 40) based on the output signal light outputted from the optical phase conjugator 40.

In this manner, in the fifth embodiment of the present invention, since input signal light of a frequency or wavelength of a predetermined value to the optical phase conjugator 40 can be outputted from the optical phase conjugator 40 to the transmission line 13 in response to the monitor control signal 71 from the control section 62 of the optical reception apparatus 60, the output signal light from the optical phase conjugator 40 can be made coincide with the input signal light to the optical phase conjugator 40. Consequently, optical amplifiers and transmission lines which have the same specifications with regard to the wavelength can be connected to the opposite front and rear ends of the optical phase conjugator similarly as in the first embodiment described hereinabove. Accordingly, the optical reception apparatus is advantageous in that very long haul high speed optical transmission over approximately 10,000 km can be realized while assuring a transmission rate of 20 to 40 Gb/s, for example, using existing transmission lines, optical amplifiers, optical transmission apparatus and optical reception apparatus each of one type.

Further, since control of the frequency or wavelength of signal light on the transmission lines 13 and 14 can be performed on the optical reception apparatus 60 side, the optical reception apparatus is advantageous in that the optical phase conjugator for interconnecting the transmission line 13 and the transmission line 14 can be formed in a simple construction and besides maintenance of the control system of the optical phase conjugator is facilitated.

g. Sixth Embodiment

Figure 28:
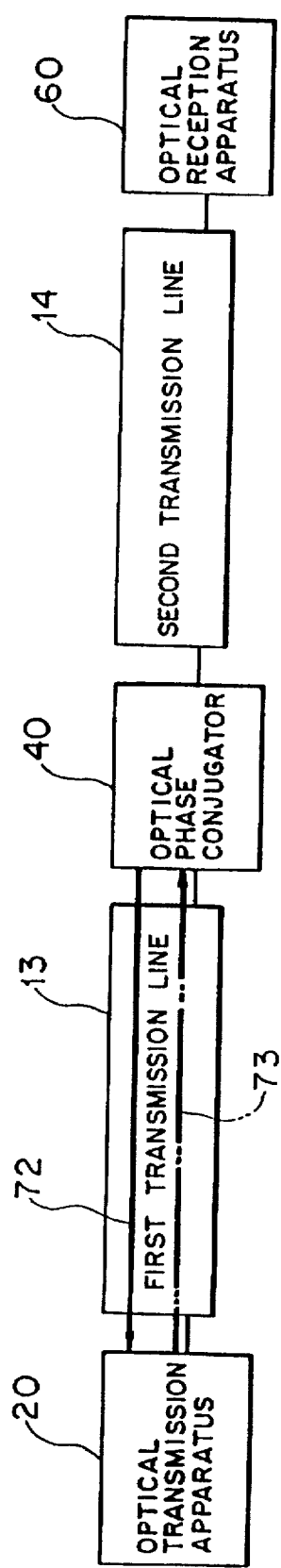
FIGS. 28 and 29 are block diagrams of an optical transmission system in which an optical transmission apparatus of the present invention is incorporated.
Figure 29:
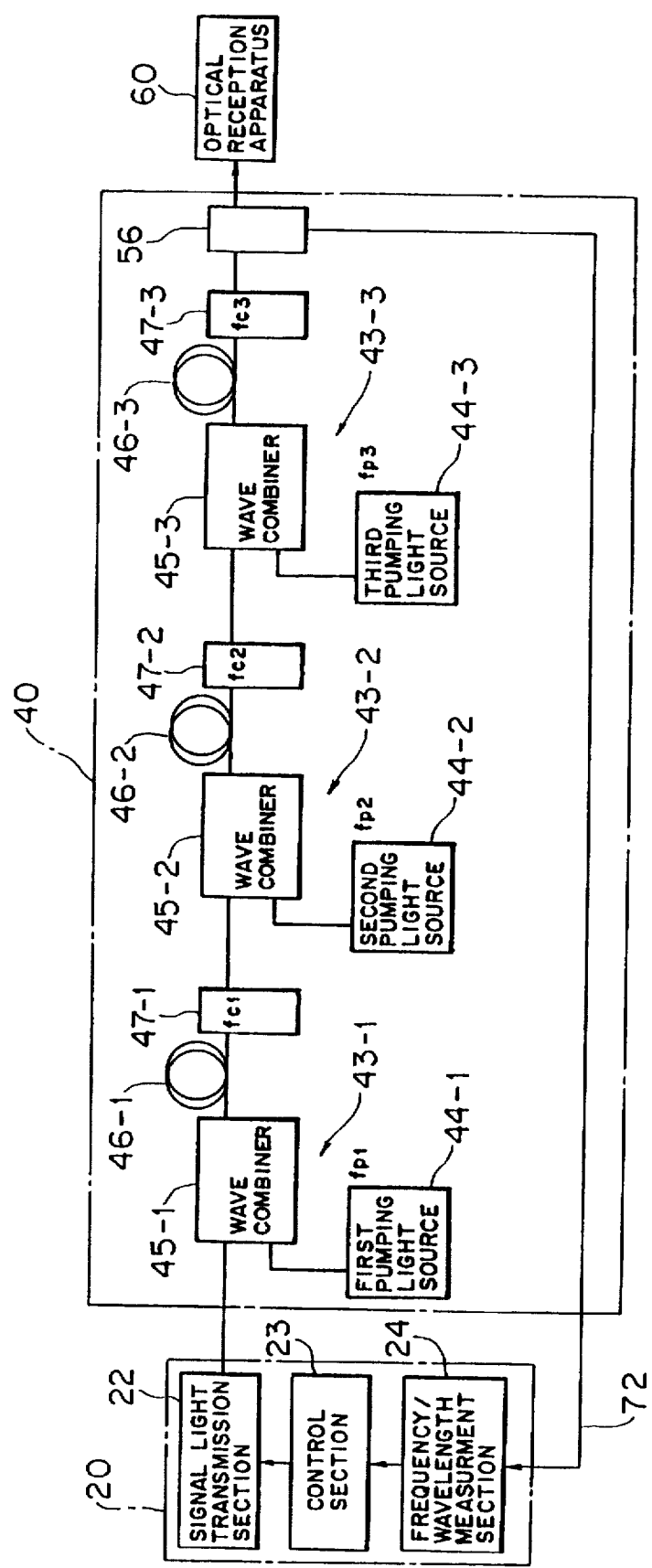

FIGS. 28 and 29 show in block diagrams an optical transmission apparatus according to a sixth preferred embodiment of the present invention. Referring to FIGS. 28 and 29, the optical transmission apparatus is generally denoted at 20 and can be applied to such a very long haul transmission system wherein the optical transmission apparatus 20 is connected to an optical reception apparatus 60 via a pair of transmission lines 13 and 14 each formed from optical fibers or the like extending, for example, across an ocean of up to several thousands kilometers such that they communicate signal light with each other as shown in FIGS. 24 and 25 similarly as in the fourth embodiment described above.

The transmission line 13 and the transmission line 14 are connected to each other via an optical phase conjugator 40. The optical phase conjugator 40 is formed from three first to third optical phase conjugation section-optical filter pairs 41-1 to 41-3, which are similar, for example, to those of the first embodiment described hereinabove with reference to FIG. 12, connected in tandem as seen in FIG. 29.

The optical phase conjugator 40 further includes a branching section 56 formed from, for example, an optical coupler for branching output signal light thereof. Output signal light fc3 branched by the branching section 56 is inputted to the optical transmission apparatus 20

The optical transmission apparatus 20 includes a signal light transmission section 22 for transmitting signal light, a frequency/wavelength measurement section 24 for measuring the frequency or wavelength of output signal light of the optical phase conjugator 40, and a control section 23 for controlling the signal light transmission section 22 based on the frequency or wavelength of output signal light fc3 measured by the frequency/wavelength measurement section 24 so that the frequency or wavelength of the input signal light to the optical phase conjugator 40 may have a predetermined value (for example, a value equal to the frequency fc3 or wavelength of the output signal light of the optical phase conjugator 40).

The optical transmission apparatus according to the sixth embodiment of the present invention having the construction described above communicates signal light with the optical reception apparatus 60 to which it is connected via the transmission lines 13 and 14 formed from optical fibers or the like extending across an ocean of up to several thousands kilometers.

In particular, in the optical transmission apparatus 20, the signal light transmission section 22 transmits, to the optical reception apparatus 60, input signal light to the optical phase conjugator 40 via the transmission line 13, the optical phase conjugator 40 and the transmission line 14. In this instance, the branching section 56 of the optical phase conjugator 40 outputs the output signal light of the optical phase conjugator 40 to the optical reception apparatus 60 as well as to the frequency/wavelength measurement section 24 of the optical transmission apparatus 20.

The frequency/wavelength measurement section 24 of the optical transmission apparatus 20 measures the frequency or wavelength of the received output signal light. In this instance, the control section 23 controls the signal light transmission section 22 based on the frequency or wavelength of the output signal light measured by the frequency/wavelength measurement section 24 so that the frequency or wavelength of the input signal light may have a fixed value.

Consequently, the frequency or wavelength of the input signal light to the optical phase conjugator 40 can be controlled to a frequency or wavelength of a predetermined value (for example, a value equal to the frequency fc3 or wavelength of the output signal light) based on the output signal light outputted from the optical phase conjugator 40.

In this manner, in the sixth embodiment of the present invention, since input signal light of a frequency or wavelength of a predetermined value to the optical phase conjugator 40 can be outputted from the optical transmission apparatus 20 to the transmission line 13 by the control section 23 of the optical transmission apparatus 20, the output signal light from the optical phase conjugator 40 can be made coincide with the input signal light to the optical phase conjugator 40. Consequently, optical amplifiers and transmission lines which have the same specifications with regard to the wavelength can be connected to the opposite front and rear ends of the optical phase conjugator similarly as in the first embodiment described hereinabove. Accordingly, the optical reception apparatus is advantageous in that very long haul high speed optical transmission over approximately 10,000 kilometer can be realized while assuring a transmission rate of 20 to 40 Gb/s, for example, using existing transmission lines, optical amplifiers, optical transmission apparatus and optical reception apparatus each of one type.

Further, since control of the frequency or wavelength of signal light on the transmission lines 13 and 14 can be performed on the optical transmission apparatus 20 side, the optical reception apparatus is advantageous in that the optical phase conjugator for interconnecting the transmission line 13 and the transmission line 14 can be formed in a simple construction and besides maintenance of the control system of the optical phase conjugator is facilitated.

Figure 30:
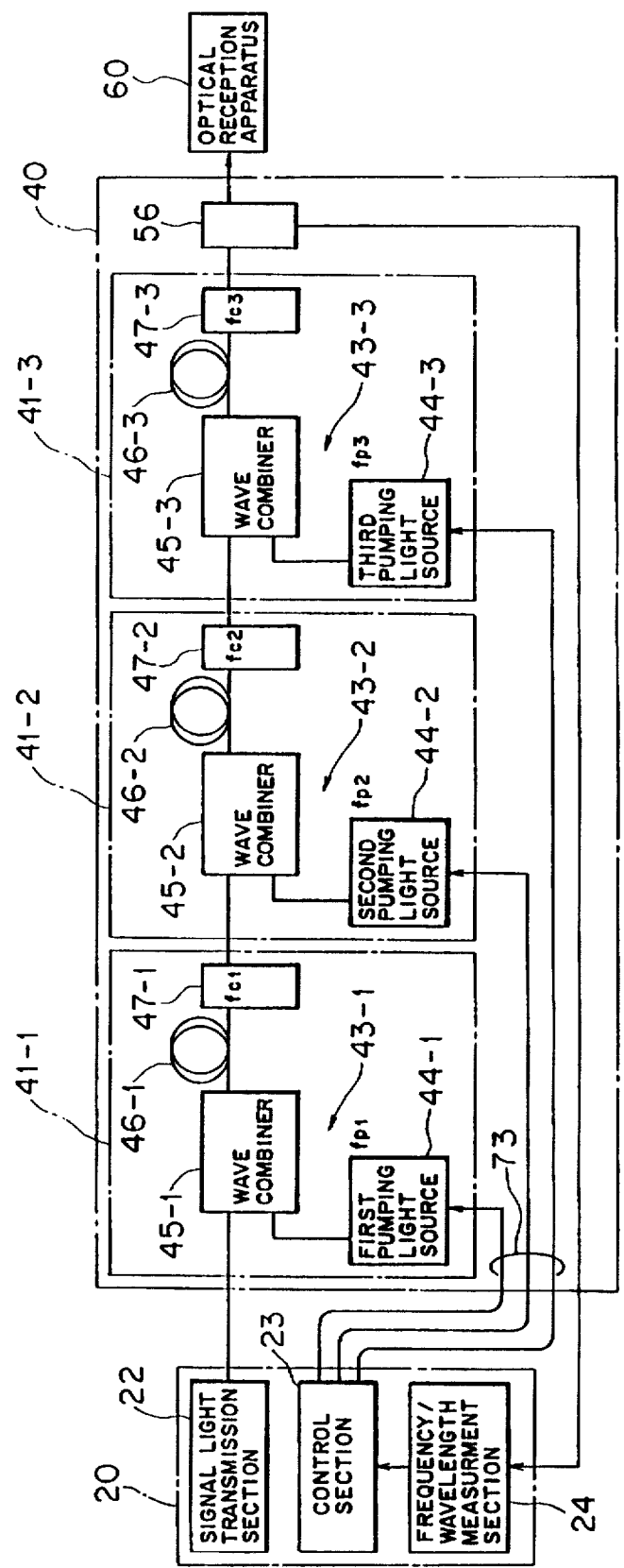
FIG. 30 is a block diagram showing a modification to the optical transmission apparatus of FIGS. 28 and 29.
Figure 31:
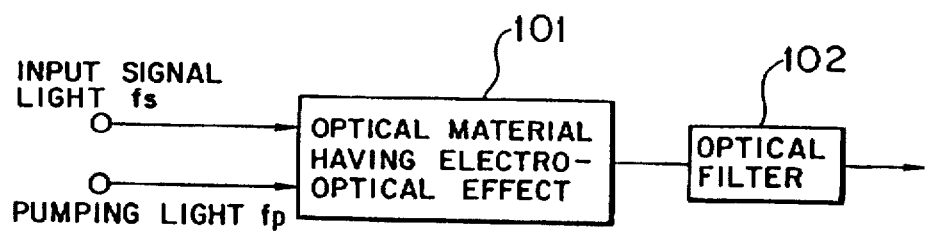
FIG. 31 is a block diagram showing an ordinary optical phase conjugator.
Figure 32:
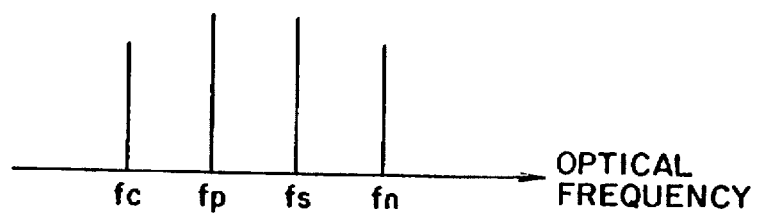
FIG. 32 is a diagram illustrating four wave mixing caused by an electro-optical effect.

It is to be noted that, while the control section 23 of the optical transmission apparatus 20 in the present embodiment described above controls the signal light transmission section 22 based on the frequency or wavelength of the output signal light fc3 measured by the frequency/wavelength measurement section 24 so that the frequency or wavelength of the input signal light to the optical phase conjugator 40 may have a predetermined value, the manner of the control is not limited to this, and the control section 23 may control the input signal light to the optical phase conjugator 40 so that the frequency or wavelength of the input signal light may have a predetermined value by outputting, based on the frequency or wavelength of the output signal light measured by the frequency/wavelength measurement section 24, a monitor control signal 73 to control the optical phase conjugator 40 so that the output signal light of the optical phase conjugator 40 may have a frequency or wavelength of a predetermined value as seen from FIG. 30.

In this instance, the ambient temperatures or the excitation powers of the first to third pumping light sources 44-1 to 44-3 are controlled by the monitor control signal 73 similarly as in the first embodiment described hereinabove.

h. Others

The frequency setting and controlling section of the optical phase conjugator in any of the second to sixth embodiments described above can have the form of any of the third to fifth modifications to the first embodiment described hereinabove with reference to FIGS. 17 to 19. Also in this instance, similar advantages to those obtained by the embodiment can be obtained.

Further, while, in the optical phase conjugators of the first to third embodiments described hereinabove, pumping lights are controlled by a plurality of optical phase conjugation section-optical filter pairs so that the frequency or wavelength of output signal light may coincide with the frequency or wavelength of input signal light, means for such control is not limited to this, and optical phase conjugation sections and optical filters may be combined suitably so that the frequency or wavelength of output signal light may be controlled so as to coincide with the frequency or wavelength of input signal light.

Furthermore, while the optical communication system in which the optical reception apparatus or the optical transmission apparatus according to any one of the fourth to sixth embodiments described above is incorporated includes an optical phase conjugator formed from three optical phase conjugation section-optical filter pairs similar to those in the first embodiment described above, the present invention is not limited to the specific construction. The optical reception apparatus or the optical transmission apparatus according to the present invention may be used with and incorporated in an optical communication system which includes an optical phase conjugator which in turn includes a combination of at least a plurality of optical phase conjugation sections each for outputting signal light of a frequency or a spectrum inverted to that of input signal light and a plurality of frequency or wavelength conversion sections each for converting the input signal light into signal light having a frequency or a wavelength converted from that of the input signal light so that the frequency or wavelength of the output signal light may coincide with the frequency or wavelength of the input signal light.

Further, while the optical phase conjugator applied in each of the first to sixth embodiments described above employs an optical fiber in order to cause four wave mixing by an electro-optical effect, according to the present invention, the element to be used for this object is not limited to the optical fiber. For example, an optical semiconductor may be used instead. Also in this instance, similar advantages to those of each embodiment described above can be obtained.

Further, while the optical phase conjugator applied in each of the first to sixth embodiments is connected between the transmission line 13 and the transmission line 14, the location connection of the optical phase conjugator is not limited to the specific location. For example, the optical phase conjugator may be provided at an arbitrary location on the transmission line between the optical transmission apparatus 20 and the optical reception apparatus 60 or may alternatively be provided in the optical transmission apparatus 20 or the optical reception apparatus 60.

The present invention is not limited to the specifically described embodiment, and variations and modifications may be made without departing from the scope of the present invention.

What is claimed is:

1. An optical phase conjugator, comprising:

an optical phase conjugation section for outputting signal light having a frequency or spectrum inverted from that of input signal light thereto; and a frequency or wavelength conversion section for outputting signal light having a frequency or wavelength converted from that of the signal light inputted thereto from said optical phase conjugation section;

said optical phase conjugation section and said frequency or wavelength conversion section being combined by a plural number so that a frequency or wavelength of output signal light of said optical phase conjugator coincides with a frequency or wavelength of input signal light to said optical phase conjugator.

2. An optical phase conjugator, comprising:

a plurality of optical phase conjugation section-optical filter pairs each including an optical phase conjugation section including a pumping light source for outputting a pumping light of a frequency and an electro-optical effect member for receiving signal light and the pumping light from said pumping light source and causing four wave mixing by an electro-optical effect thereof, and an optical filter for extracting phase conjugate light or non-phase conjugate light outputted from said optical phase conjugation section, said optical phase conjugation section-optical filter pairs being connected so that output signal light to be outputted from one of said optical phase conjugation section-optical filter pairs at the last stage is phase conjugate light with input signal light to one of said optical phase conjugation section-optical filter pairs at the first stage; and a frequency setting and controlling section for setting or controlling a frequency of the pumping light of each of the pumping light sources so that a frequency or wavelength of the output signal light to be outputted as the phase conjugate light from the optical phase conjugation section-optical filter pair at the last stage coincides with a frequency or wavelength of the input signal light inputted to the optical phase conjugation section-optical filter pair at the first stage.

3. An optical phase conjugator as claimed in claim 2, further comprising an optical frequency or wavelength measurement section for measuring frequencies or wavelengths of the pumping lights from all or some of the pumping light sources.

4. An optical phase conjugator as claimed in claim 2, further comprising a temperature control section for controlling temperatures of all or some of the pumping light sources.

5. An optical phase conjugator as claimed in claim 2, wherein said electro-optical effect materials are formed from an optical fiber or a semiconductor.

6. An optical phase conjugator as claimed in claim 2, further comprising an optical amplifier interposed between each adjacent ones of the optical phase conjugation section-optical filter pairs for correcting a power of light communicated between the adjacent optical phase conjugation section-optical filter pairs.

7. An optical phase conjugator, comprising:

a plurality of optical phase conjugation section-optical filter pairs each including an optical phase conjugation section including a pumping light source for outputting a pumping light of a frequency and an electro-optical effect member for receiving signal light and the pumping light from said pumping light source and causing four wave mixing by an electro-optical effect thereof, and an optical filter for extracting phase conjugate light or non-phase conjugate light outputted from said optical phase conjugation section, said optical phase conjugation section-optical filter pairs being connected so that output signal light to be outputted from one of said optical phase conjugation section-optical filter pairs at the last stage is non-phase conjugate light with input signal light to one of said optical phase conjugation section-optical filter pairs at the first stage; and a frequency setting and controlling section for setting or controlling a frequency of the pumping light of each of the pumping light sources so that a frequency or wavelength of the output signal light to be outputted as the non-phase conjugate light from the optical phase conjugation section-optical filter pair at the last stage coincides with a frequency or wavelength of the input signal light inputted to the optical phase conjugation section-optical filter pair at the first stage.

8. An optical phase conjugator as claimed in claim 7, further comprising an optical frequency or wavelength measurement section for measuring frequencies or wavelengths of the pumping lights from all or some of the pumping light sources.

9. An optical phase conjugator as claimed in claim 7, further comprising a temperature control section for controlling temperatures of all or some of the pumping light sources.

10. An optical phase conjugator as claimed in claim 7, wherein said electro-optical effect materials are formed from an optical fiber or a semiconductor.

11. An optical phase conjugator as claimed in claim 7, further comprising an optical amplifier interposed between each adjacent ones of the optical phase conjugation section-optical filter pairs for correcting a power of light communicated between the adjacent optical phase conjugation section-optical filter pairs.

12. An optical phase conjugator, comprising:

a first optical phase conjugation section-optical filter pair including a first optical phase conjugation section including a first pumping light source for outputting first pumping light of a frequency fp1 and a first electro-optical effect member for receiving signal light of another frequency fs and the first pumping light from said first pumping light source and causing four wave mixing by an electro-optical effect thereof, and a first optical filter for extracting phase conjugate light of a further frequency fc1, which is equal to 2fp1−fs, outputted from said first optical phase conjugation section;

a second optical phase conjugation section-optical filter pair including a second optical phase conjugation section including a second pumping light source for outputting second pumping light of a still further frequency fp2 and a second electro-optical effect member for receiving the signal light of the frequency fc1 from said first optical phase conjugation section-optical filter pair and the second pumping light from said second pumping light source and causing four wave mixing by an electro-optical effect thereof, and a second optical filter for extracting phase conjugate light of a yet further frequency fc2, which is equal to 2fp2−fc1, outputted from said second optical phase conjugation section;

a third optical phase conjugation section-optical filter pair including a third optical phase conjugation section including a third pumping light source for outputting third pumping light of a yet further frequency fp3 and a third electro-optical effect member for receiving the signal light of the frequency fc2 from said second optical phase conjugation section-optical filter pair and the third pumping light from said third pumping light source and causing four wave mixing by an electro-optical effect thereof, and a third optical filter for extracting phase conjugate light of a yet further frequency fc3, which is equal to 2fp3−fc2, outputted from said third optical phase conjugation section; and a frequency setting and controlling section for setting or controlling frequencies of output lights outputted from said first pumping light source, said second pumping light source and said third pumping light source so that a frequency or wavelength of output signal light outputted as phase conjugate light from said third optical phase conjugation section-optical filter pair coincides with a frequency or wavelength of input signal light inputted to said first optical phase conjugation section-optical filter pair.

13. An optical phase conjugator as claimed in claim 12, wherein said frequency setting and controlling section sets or controls the frequencies of the output lights of said first pumping light source, said second pumping light source and said third pumping light source so that a relationship of fs=fp3−fp2+fp1 is satisfied.

14. An optical phase conjugator as claimed in claim 12, wherein said frequency setting and controlling section controls said first pumping light source and said second pumping light source so that a frequency difference fp1−fp2 between the frequency fp1 of the first pumping light and the frequency fp2 of the second pumping light may be constant, and performs stabilization control for said third pumping light source.

15. An optical phase conjugator as claimed in claim 14, wherein said frequency setting and controlling section includes a Fabry-Perot resonator having an oscillation period which is set so that a multiple thereof is equal to the frequency difference fp1−fp2 between the frequency fp1 of the first pumping light and the frequency fp2 of the second pumping light.

16. An optical phase conjugator as claimed in claim 14, further comprising a temperature control section for performing temperature controls of said first pumping light source and said second pumping light source simultaneously.

17. An optical phase conjugator as claimed in claim 12, wherein said frequency setting and controlling section controls said second pumping light source and said third pumping light source so that a frequency difference fp3−fp2 between the frequency fp3 of the third pumping light and the frequency fp2 of the second pumping light may be constant, and performs stabilization control for said first pumping light source.

18. An optical phase conjugator as claimed in claim 17, wherein said frequency setting and controlling section includes a Fabry-Perot resonator having an oscillation period which is set so that a multiple thereof is equal to the frequency difference fp3−fp2 between the frequency fp3 of the third pumping light and the frequency fp2 of the second pumping light.

19. An optical phase conjugator as claimed in claim 17, further comprising a temperature control section for performing temperature controls of said second pumping light source and said third pumping light source simultaneously.

20. An optical phase conjugator as claimed in claim 12, further comprising an optical frequency or wavelength measurement section for measuring frequencies or wavelengths of the pumping lights from all or some of the pumping light sources.

21. An optical phase conjugator as claimed in claim 12, further comprising a temperature control section for controlling temperatures of all or some of the pumping light sources.

22. An optical phase conjugator as claimed in claim 12, wherein said electro-optical effect materials are formed from an optical fiber or a semiconductor.

23. An optical phase conjugator as claimed in claim 12, further comprising an optical amplifier interposed between each adjacent ones of the optical phase conjugation section-optical filter pairs for correcting a power of light communicated between the adjacent optical phase conjugation section-optical filter pairs.

24. An optical phase conjugator, comprising:

a first optical phase conjugation section-optical filter pair including a first optical phase conjugation section including a first pumping light source for outputting first pumping light of a frequency fp1 and a first electro-optical effect member for receiving signal light of another frequency fs and the first pumping light from said first pumping light source and causing four wave mixing by an electro-optical effect thereof, and a first optical filter for extracting phase conjugate light of a further frequency fc1, which is equal to 2fp1−fs, outputted from said first optical phase conjugation section:

a second optical phase conjugation section-optical filter pair including a second optical phase conjugation section including a second pumping light source for outputting second pumping light of a still further frequency fp2 and a second electro-optical effect member for receiving the signal light of the frequency fc1 from said first optical phase conjugation section-optical filter pair and the second pumping light from said second pumping light source and causing four wave mixing by an electro-optical effect thereof, and a second optical filter for extracting non-phase conjugate light of a yet further frequency fn2, which is equal to 2fc1−fp2, outputted from said second optical phase conjugation section; and a frequency setting and controlling section for setting or controlling frequencies of output lights outputted from said first pumping light source and said second pumping light source so that a frequency or wavelength of output signal light outputted as non-phase conjugate light from said second optical phase conjugation section-optical filter pair coincides with a frequency or wavelength of input signal light inputted to said first optical phase conjugation section-optical filter pair.

25. An optical phase conjugator as claimed in claim 24, wherein said frequency setting and controlling section sets or controls the frequencies of the output lights of said first pumping light source and said second pumping light source so that a relationship of fs =(4fp1−fp2)/3 is satisfied.

26. An optical phase conjugator as claimed in claim 24, further comprising an optical frequency or wavelength measurement section for measuring frequencies or wavelengths of the pumping lights from all or some of the pumping light sources.

27. An optical phase conjugator as claimed in claim 24, further comprising a temperature control section for controlling temperatures of all or some of the pumping light sources.

28. An optical phase conjugator as claimed in claim 24, wherein said electro-optical effect materials are formed from an optical fiber or a semiconductor.

29. An optical phase conjugator as claimed in claim 24, further comprising an optical amplifier interposed between each adjacent ones of the optical phase conjugation section-optical filter pairs for correcting a power of light communicated between the adjacent optical phase conjugation section-optical filter pairs.

30. An optical phase conjugator, comprising:

a first optical phase conjugation section-optical filter pair including a first optical phase conjugation section including a first pumping light source for outputting first pumping light of a frequency fp1 and a first electro-optical effect member for receiving signal light of another frequency fs and the first pumping light from said first pumping light source and causing four wave mixing by an electro-optical effect thereof, and a first optical filter for extracting non-phase conjugate light of a further frequency fn1, which is equal to 2fs−fp1, outputted from said first optical phase conjugation section;

a second optical phase conjugation section-optical filter pair including a second optical phase conjugation section including a second pumping light source for outputting second pumping light of a still further frequency fp2 and a second electro-optical effect member for receiving the signal light of the frequency fn1 from said first optical phase conjugation section-optical filter pair and the second pumping light from said second pumping light source and causing four wave mixing by an electro-optical effect thereof, and a second optical filter for extracting phase conjugate light of a yet further frequency fc2, which is equal to 2fp2−fc1, outputted from said second optical phase conjugation section; and a frequency setting and controlling section for setting or controlling frequencies of output lights outputted from said first pumping light source and said second pumping light source so that a frequency or wavelength of output signal light outputted as phase conjugate light from said second optical phase conjugation section-optical filter pair coincides with a frequency or wavelength of input signal light inputted to said first optical phase conjugation section-optical filter pair.

31. An optical phase conjugator as claimed in claim 30, wherein said frequency setting and controlling section sets or controls the frequencies of the output lights of said first pumping light source and said second pumping light source so that a relationship of fs (2fp1+fp2)/3 is satisfied.

32. An optical phase conjugator as claimed in claim 30, further comprising an optical frequency or wavelength measurement section for measuring frequencies or wavelengths of the pumping lights from all or some of the pumping light sources.

33. An optical phase conjugator as claimed in claim 30, further comprising a temperature control section for controlling temperatures of all or some of the pumping light sources.

34. An optical phase conjugator as claimed in claim 30, wherein said electro-optical effect materials are formed from an optical fiber or a semiconductor.

35. An optical phase conjugator as claimed in claim 30, further comprising an optical amplifier interposed between each adjacent ones of the optical phase conjugation section-optical filter pairs for correcting a power of light communicated between the adjacent optical phase conjugation section-optical filter pairs.

36. An optical reception apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from said optical phase conjugation section and wherein said optical phase conjugation section and said frequency or wavelength conversion section are combined by a plural number so that a frequency or wavelength of output signal light of said optical phase conjugator coincides with a frequency or wavelength of input signal light to said optical phase conjugator, said optical reception apparatus being disposed on an output side of said optical phase conjugator, said optical reception apparatus comprising:

a frequency or wavelength measurement section for measuring a frequency or wavelength of the output signal light of said optical phase conjugator; and a control section for outputting a control signal to said optical phase conjugator so that the frequency or wavelength of the output signal light measured by said frequency or wavelength measurement section may have a fixed value.

37. An optical reception apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from said optical phase conjugation section and wherein said optical phase conjugation section and said frequency or wavelength conversion section are combined by a plural number so that a frequency or wavelength of output signal light of said optical phase conjugator coincides with a frequency or wavelength of input signal light to said optical phase conjugator, said optical reception apparatus being disposed on an output side of said optical phase conjugator, said optical reception apparatus comprising:

a frequency or wavelength measurement section for measuring a frequency or wavelength of the output signal light of said optical phase conjugator; and a control section for outputting a control signal to an optical transmission apparatus disposed on an input side of said optical phase conjugator based on the frequency or wavelength of the output signal light measured by said frequency or wavelength measurement section so that the frequency or wavelength of the input signal light to said optical phase conjugator may have a fixed value.

38. An optical transmission apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from said optical phase conjugation section and wherein said optical phase conjugation section and said frequency or wavelength conversion section are combined by a plural number so that a frequency or wavelength of output signal light of said optical phase conjugator coincides with a frequency or wavelength of input signal light to said optical phase conjugator, said optical transmission apparatus being disposed on an input side of said optical phase conjugator, said optical transmission apparatus comprising:

a control section for controlling the input signal light to said optical phase conjugator based on a frequency or wavelength of the output signal light measured by an optical reception apparatus side disposed on an output side of said optical phase conjugator so that a frequency or wavelength of the input signal light may have a fixed value.

39. An optical transmission apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from said optical phase conjugation section and wherein said optical phase conjugation section and said frequency or wavelength conversion section are combined by a plural number so that a frequency or wavelength of output signal light of said optical phase conjugator coincides with a frequency or wavelength of input signal light to said optical phase conjugator, said optical transmission apparatus being disposed on an input side of said optical phase conjugator, said optical transmission apparatus comprising:

a frequency or wavelength measurement section for measuring a frequency or wavelength of the output signal light of said optical phase conjugator; and a control section for controlling the input signal light to said optical phase conjugator based on the frequency or wavelength of the output signal light measured by said frequency or wavelength measurement section so that a frequency or wavelength of the input signal light may have a fixed value.

40. An optical transmission apparatus for use with an optical communication system which includes an optical phase conjugator which includes an optical phase conjugation section for outputting signal light having a frequency or spectrum inverted from that of input signal light thereto, and a frequency or wavelength conversion section for outputting signal light having a frequency or wavelength converted from that of the signal light inputted thereto from said optical phase conjugation section and wherein said optical phase conjugation section and said frequency or wavelength conversion section are combined by a plural number so that a frequency or wavelength of output signal light of said optical phase conjugator coincides with a frequency or wavelength of input signal light to said optical phase conjugator, said optical transmission apparatus being disposed on an input side of said optical phase conjugator, said optical transmission apparatus comprising:

a frequency or wavelength measurement section for measuring a frequency or wavelength of the output signal light of said optical phase conjugator; and a control section for controlling the output signal light from said optical phase conjugator based on the frequency or wavelength of the output signal light measured by said frequency or wavelength measurement section so that a frequency or wavelength of the output signal light may have a fixed value.

* * * * *